(12) United States Patent
Lee et al.

(10) Patent No.: US 12,451,524 B2
(45) Date of Patent: Oct. 21, 2025

(54) ELECTRODE ASSEMBLY, SECONDARY BATTERY, BATTERY PACK AND VEHICLE INCLUDING THE SAME

(71) Applicant: LG ENERGY SOLUTION, LTD., Seoul (KR)

(72) Inventors: Kwan-Hee Lee, Daejeon (KR); Duk-Hyun Ryu, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/281,260

(22) PCT Filed: Aug. 1, 2022

(86) PCT No.: PCT/KR2022/011313
§ 371 (c)(1),
(2) Date: Sep. 8, 2023

(87) PCT Pub. No.: WO2023/014018
PCT Pub. Date: Feb. 9, 2023

(65) Prior Publication Data

US 2024/0145783 A1  May 2, 2024

(30) Foreign Application Priority Data

Aug. 5, 2021 (KR) .................. 10-2021-0103378
Jul. 19, 2022 (KR) .................. 10-2022-0089230

(51) Int. Cl.
*H01M 10/0587* (2010.01)
*H01M 50/531* (2021.01)
*H01M 50/566* (2021.01)

(52) U.S. Cl.
CPC ..... *H01M 10/0587* (2013.01); *H01M 50/531* (2021.01); *H01M 50/566* (2021.01); *H01M 2220/20* (2013.01)

(58) Field of Classification Search
CPC .......... H01M 10/0587; H01M 50/531; H01M 50/566; H01M 2220/20
(Continued)

(56) References Cited

U.S. PATENT DOCUMENTS

2004/0023107 A1* 2/2004 Nakanishi ........... H01M 50/566
429/211
2005/0142436 A1* 6/2005 Arai ...................... H01G 11/22
429/211
(Continued)

FOREIGN PATENT DOCUMENTS

CN 1309105 C † 4/2007
CN 201781028 U † 3/2011
(Continued)

OTHER PUBLICATIONS

International Search Report for PCT/KR2022/011313 (PCT/ISA/210) mailed on Nov. 18, 2022.

*Primary Examiner* — Niki Bakhtiari
*Assistant Examiner* — Omar M Kekia
(74) *Attorney, Agent, or Firm* — Birch, Stewart, Kolasch & Birch, LLP

(57) ABSTRACT

Discussed is an electrode assembly having a positive electrode, a negative electrode, and a separator wound around a winding axis, wherein the positive electrode or the negative electrode includes a current collector that has sheet-shape and having a long side and a short side and has an uncoated portion at an end of the long side, wherein the uncoated portion includes an electrode tab defined section used as an electrode tab by itself and at least one electrode tab undefined section not used as an electrode tab, wherein a maximum current path includes a widthwise direction current path along the short side of the current collector and a lengthwise direction current path along the long side of the current collector, and a current path ratio L2/L1 is approxi-
(Continued)

mately 11 or less when lengths of the lengthwise direction current path and the widthwise direction current path are L1 and L2, respectively.

43 Claims, 24 Drawing Sheets

(58) Field of Classification Search
USPC .......................................................... 429/94
See application file for complete search history.

(56) References Cited

U.S. PATENT DOCUMENTS

| | | |
|---|---|---|
| 2005/0287428 A1 | 12/2005 | Cheon et al. |
| 2005/0287432 A1 | 12/2005 | Cheon et al. |
| 2011/0318620 A1 | 12/2011 | Choi et al. |
| 2014/0342194 A1 | 11/2014 | Wang et al. |
| 2018/0026295 A1 | 1/2018 | Lim et al. |
| 2018/0076442 A1 | 3/2018 | Choi et al. |
| 2021/0351472 A1* | 11/2021 | Terauchi ............. H01M 50/264 |
| 2024/0145883 A1* | 5/2024 | Haraguchi .......... H01M 50/548 |

FOREIGN PATENT DOCUMENTS

| | | | |
|---|---|---|---|
| CN | 205863251 U | † | 1/2017 |
| CN | 206461019 U | † | 9/2017 |
| CN | 113193165 A | † | 7/2021 |
| JP | 2001148238 A | † | 5/2001 |
| JP | 3403678 B2 | † | 5/2003 |
| JP | 2006-12834 A | | 1/2006 |
| JP | 4401634 B2 | † | 1/2010 |
| JP | 5172138 B2 | † | 3/2013 |
| JP | 2014-63645 A | | 4/2014 |
| JP | 2018-511144 A | | 4/2018 |
| KR | 10-2005-0121904 A | | 12/2005 |
| KR | 10-2015-0083633 A | | 7/2015 |
| KR | 10-1743136 B1 | | 6/2017 |
| KR | 10-2179415 B1 | | 11/2020 |
| KR | 10-2264701 B1 | | 6/2021 |
| KR | 10-2021-0082455 A | | 7/2021 |
| WO | WO 2020/096973 A1 | | 5/2020 |
| WO | WO2021020237 A1 | † | 2/2021 |
| WO | WO2021024940 A1 | † | 2/2021 |

\* cited by examiner
† cited by third party

FIG. 1
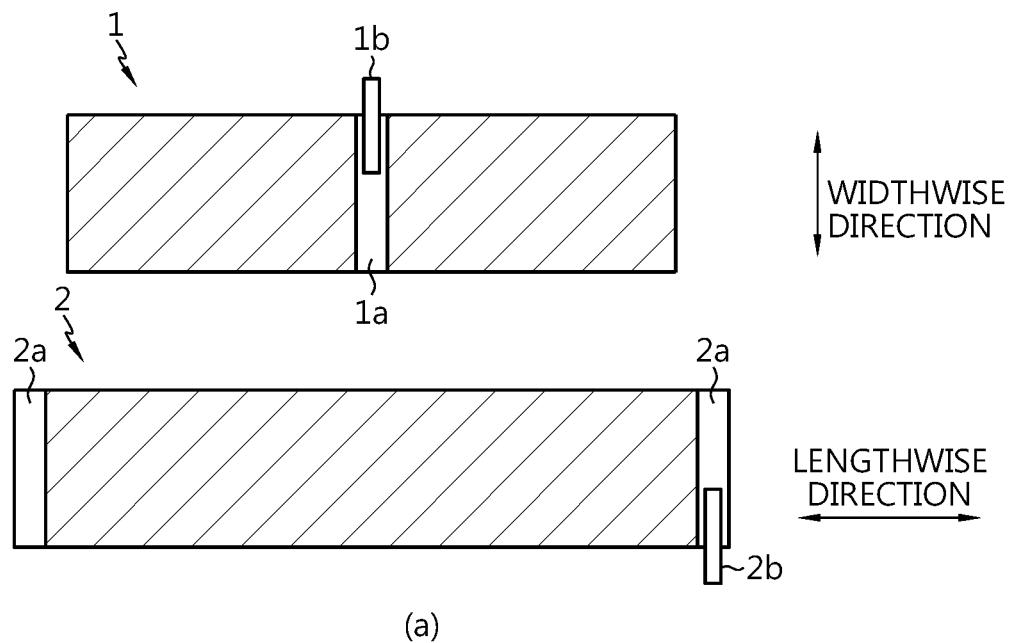
(a)
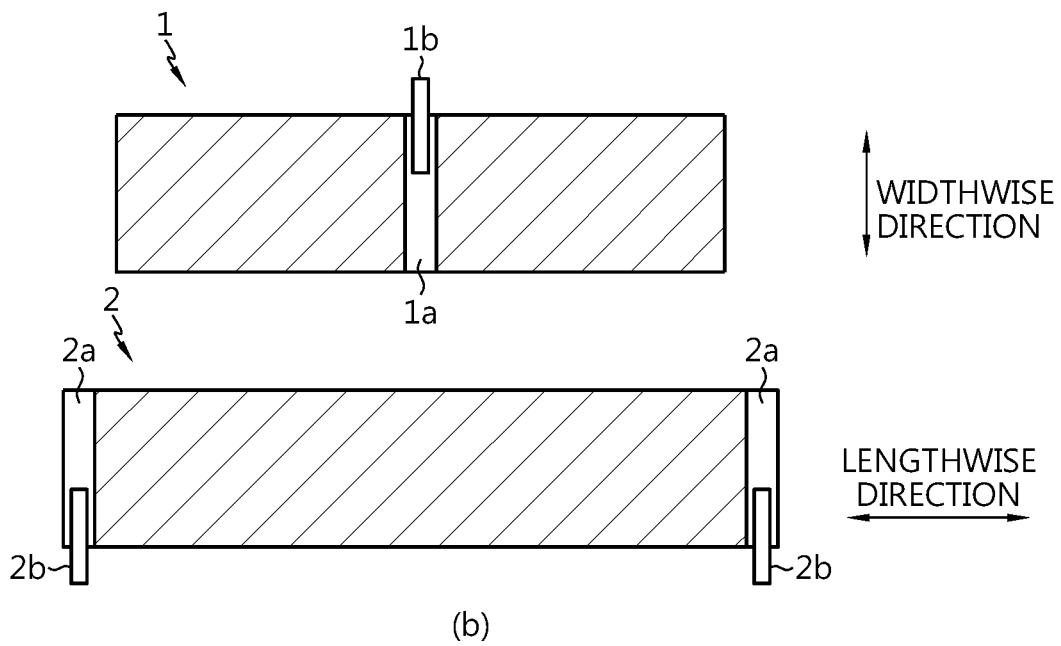
(b)

FIG. 3
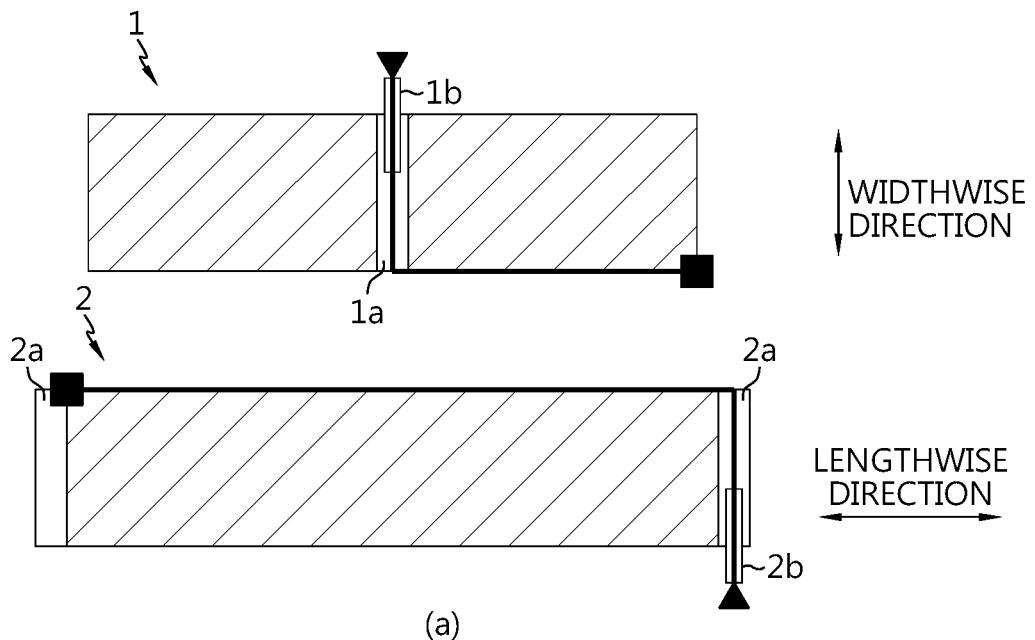
(a)
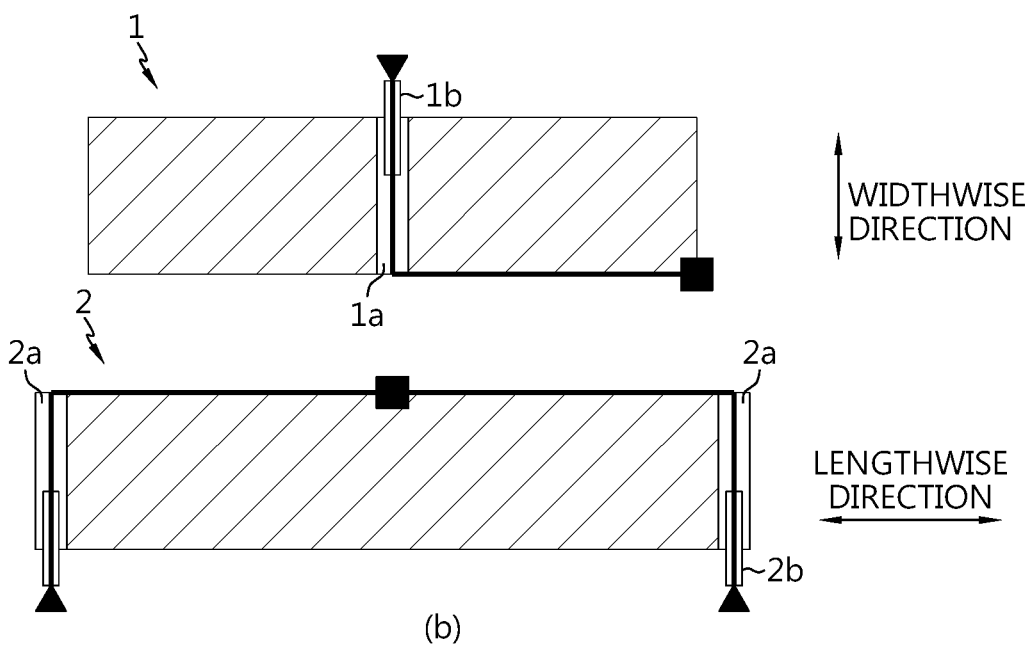
(b)

ELECTRODE ASSEMBLY, SECONDARY BATTERY, BATTERY PACK AND VEHICLE INCLUDING THE SAME

TECHNICAL FIELD

The present disclosure relates to an electrode assembly, a secondary battery, a battery pack and a vehicle including the same, and more specifically, to a jelly-roll type electrode assembly capable of implementing low resistance, a cylindrical secondary battery including the same, a battery pack and a vehicle including the same. The present application claims priority to Korean Patent Application Nos. 10-2021-0103378 and 10-2022-0089230 filed on Aug. 5, 2021 and Jul. 19, 2022, respectively, in the Republic of Korea, the disclosures of which are incorporated herein by reference.

BACKGROUND ART

Secondary batteries have high applicability according to product groups and electrical characteristics such as high energy density, and thus are commonly applied not only to portable devices but also to electric vehicles (EVs) or hybrid electric vehicles (HEVs) driven by electric power sources. Such a secondary battery is attracting attention as a new energy source to improve eco-friendliness and energy efficiency in that it has not only a primary advantage of dramatically reducing the use of fossil fuels, but also no by-products generated from the use of energy.

As types of secondary batteries, cylindrical, prismatic, and pouch-type second batteries are known. In the case of a cylindrical second battery, a separator that is an insulator is disposed between a positive electrode and a negative electrode and wound to form a jelly-roll type electrode assembly, and a battery is formed by inserting the resultant electrode assembly into a battery can. In addition, an electrode tab having a strip shape may be connected to an uncoated portion of each of the positive electrode and the negative electrode, and the electrode tab electrically connects the electrode assembly and an electrode terminal exposed to the outside.

In a cylindrical secondary battery, the capacity may be increased by increasing cell size. At this time, there is a need for designing a low resistance cell capable of exhibiting excellent quality in terms of energy loss and heat generation, even at high current density. In the end, it is important to minimize the current path in the design of the low resistance cell.

FIG. 1 is a view illustrating a state in which a positive electrode and a negative electrode applied to a conventional cylindrical secondary battery are spread out.

Referring to FIG. 1, as electrodes applied to a conventional cylindrical secondary battery, a positive electrode 1 and a negative electrode 2 are illustrated. A strip-shaped positive electrode tab 1b is connected to an uncoated portion 1a formed in the middle portion of the positive electrode 1 in the lengthwise direction to protrude upward along the widthwise direction, and a strip-shaped negative electrode tab 2b is connected to an uncoated portion 2a formed at both ends of the negative electrode 2 in the lengthwise direction to protrude downward along the widthwise direction. In FIG. 1(a), there are one positive electrode tab 1b and one negative electrode tab 2b, respectively, and in FIG. 1(b), there are one positive electrode tab 1b and two negative electrode tabs 2b.

FIG. 2 is a view schematically illustrating the flow of current or electrons outside a secondary battery in a conventional cylindrical secondary battery. FIG. 3 is a view schematically illustrating the flow of current or electrons in a positive electrode and a negative electrode constituting an electrode assembly in a conventional cylindrical secondary battery.

Referring to FIGS. 2 and 3, the current path may be largely divided into two paths, that is, a path from the module bus bar welding position to the electrode tabs 1b, 2b of each electrode 1, 2 (hereinafter, a first path), and the other path from the electrode tabs 1b, 2b of each electrode 1, 2 to the end point of the electrode.

A first path is illustrated in FIG. 2, in which current starting points (marked with a circle) are located at a positive electrode terminal 1c and a negative electrode terminal 2c. The positive electrode terminal 1c is a cap of a sealing body that seals an opening of the battery can 3, and the negative electrode terminal 2c is the battery can 3. A case where the module bus bar welding position is located at the top of the cylindrical secondary battery is taken as an example. A current path starting from the positive electrode terminal 1c and connected to the positive electrode tab 1b is formed, and a current path starting from the negative electrode terminal 2c and connected to the negative electrode tab 2b is formed (a connection position is marked with a triangle). In this way, the first path is determined by the cell appearance.

When an electrochemical oxidation reaction occurs in the active material layer of the electrode, metal atoms (Li) are converted into metal cations (Li$^+$) in the entire region of the active material layer to generate electrons. Electrons move to the electrode tab through the current collector (foil) constituting the electrode, and then flow to the outside through the first path. At this time, the current flows in the opposite direction to the flow of electrons. On the other hand, when an electrochemical reduction reaction occurs in the electrode, electrons are introduced into the current collector (foil) constituting the electrode from the first path through the electrode tab, and then move to the entire region of the active material layer of the electrode to bind to cations (for example, Li$^+$), whereby the metal cation is converted to a metal. At this time, the current flows in the opposite direction to the flow of electrons.

Meanwhile, when an oxidation or reduction reaction occurs in the electrode, the path through which electrons move corresponds to the current path. The maximum current path of the electrode is determined depending on the geometry of the current collector (foil) constituting the electrode and the position and number of electrode tabs. The maximum current path of the electrode may be defined as the longest distance between an electrode point farthest from the electrode tab and the electrode tab. When an electrochemical redox reaction occurs at an electrode point farthest from the electrode tab, electrons move through a plurality of paths connecting the electrode point and the electrode tab, and some of the electrons also move through the maximum current path.

Therefore, when the maximum current path of the electrode is lengthened, the average moving distance of electrons increases from the viewpoint of the entire electrode, and thus the resistance of the electrode also increases.

Hereinafter, for convenience of description, the maximum current path uniquely determined according to the geometry of the electrode and the number and position of electrode tabs is referred to as a second path of the electrode. In FIG. 3, the second path that is the maximum current path of the electrode is illustrated, wherein the length of the second path varies according to the formation position and number of the electrode tabs 1b, 2b.

Referring to FIG. 3(a), the second path (maximum current path) of the positive electrode 1 includes a widthwise direction current path starting from the positive electrode terminal 1c of FIG. 2 and extending along the positive electrode tab 1b inside the cylindrical secondary battery, and a lengthwise direction current path traversing in the lengthwise direction of the positive electrode 1 and ending at the lower right of the positive electrode 1 (an electrode point farthest from the electrode tab is marked with a square). The second path (maximum current path) of the negative electrode 2 includes a widthwise direction current path starting from the negative electrode terminal 2c of FIG. 2 and extending along the negative electrode tab 2b inside the cylindrical secondary battery, and a lengthwise direction current path traversing in the lengthwise direction of the negative electrode 2 and ending at the upper left of the negative electrode 2.

Referring to FIG. 3(b), the second path of the positive electrode 1 is the same as that of FIG. 3(a). In the case of the negative electrode 2, since it includes two negative electrode tabs 2b, the second path (maximum current path) of the negative electrode 2 is reduced by ½ in the lengthwise direction current path, and thus is shorter than that of FIG. 3(a). As described above, when the number of electrode tabs is increased, the second path decreases by that amount due to a decrease in the lengthwise direction current path.

In the case of a small cylindrical secondary battery having a form factor of 1865 (diameter: 18 mm, height: 65 mm) and/or 2170 (diameter: 21 mm, height: 70 mm) currently used, resistance according to the second path is very large. Here, the form factor means a value indicating the diameter and height of the cylindrical secondary battery. In the numerical value representing the form factor, the first two numbers represent the diameter of the cell, and the remaining numbers represent the height of the cell.

As shown in FIG. 3, in the conventional cylindrical secondary battery, the lengthwise direction current path is very long compared to the widthwise direction current path. The resistance of the battery increases as the current path lengthens. As compared to FIG. 3(a), the increase in the number of negative electrode tabs 2b shown in FIG. 3(b) is also to decrease the resistance of the negative electrode by reducing the lengthwise direction current path thereof.

The resistance of the cylindrical secondary battery is affected by the resistance according to the first path outside the cell and the resistance according to the second path inside the cell, and particularly, it is predominantly affected by the resistance according to the second path. This is related to the length of the flow path of the current (or electrons) due to the structure of the electrode assembly. Therefore, in consideration of the main cause of the increase in resistance, it is required to find a method capable of implementing low resistance in a cylindrical secondary battery. As the resistance is smaller, the less heat is generated in the actual use environment, and it is advantageous for fast charge or high-rate discharge.

Meanwhile, a conventional cylindrical secondary battery has problems in that, because current is concentrated on strip-shaped electrode tabs 1b, 2b coupled to uncoated portions 1a, 2a, resistance is high, a large amount of heat is generated, and current collecting efficiency is poor. For a small cylindrical secondary battery, resistance and heat generation are not a big issue. However, when the form factor is increased to apply a cylindrical secondary battery to an electric vehicle, resistance and heat generation may cause an ignition accident, which is a big problem. In order to solve this problem, a cylindrical secondary battery (a so-called tab-less cylindrical secondary battery) having a structure in which a positive electrode uncoated portion and a negative electrode uncoated portion are designed to be located at the top and bottom of a jelly-roll type electrode assembly, respectively, and a current collector plate is welded to these uncoated portions to improve current collecting efficiency has been presented.

FIGS. 4 to 6 are views illustrating a process of manufacturing a tab-less cylindrical secondary battery. FIG. 4 illustrates a structure of an electrode, FIG. 5 illustrates a winding process of an electrode, and FIG. 6 illustrates a process in which a current collector plate is welded to a bent surface region of an uncoated portion.

Referring to FIGS. 4 to 6, the positive electrode 10 and the negative electrode 11 have a structure in which an active material 21 is coated on a sheet-shaped current collector 20, and include an uncoated portion 22 at one long side along the winding direction X. The long side means a side that is parallel to the X-axis direction and is relatively long.

The electrode assembly A is manufactured by sequentially stacking the positive electrode 10 and the negative electrode 11 together with two separators 12 as shown in FIG. and then winding them in one direction X. In this case, the uncoated portions of the positive electrode 10 and the negative electrode 11 are disposed in opposite directions. The positive electrode uncoated portion 10a is formed entirely on the upper portion of the electrode assembly A, and the negative electrode uncoated portion 11a is formed entirely on the lower portion of the electrode assembly A.

After the winding process, the uncoated portion 10a of the positive electrode 10 and the uncoated portion 11a of the negative electrode 11 are bent toward the core. Following that, current collector plates 30, 31 are welded and coupled to the uncoated portions 10a, 11a, respectively.

Since a separate electrode tab is not coupled to the positive electrode uncoated portion 10a and the negative electrode uncoated portion 11a, the current collector plates 30, 31 are connected to external electrode terminals, and a current path is formed in a large cross-sectional area along the winding axis direction (refer to an arrow) of the electrode assembly A, there is an advantage in that the resistance of the secondary battery may be lowered. This is because resistance is inversely proportional to the cross-sectional area of the path through which the current flows.

In the tab-less cylindrical secondary battery, in order to improve welding characteristics of the uncoated portions 10a, 11a and the current collector plates 30, 31, the uncoated portions 10a, 11a should be bent as flat as possible by applying strong pressure to welding regions of the uncoated portions 10a, 11a. However, when the welding regions of the uncoated portions 10a, 11a are bent, the shapes of the uncoated portions 10a, 11a may be irregularly distorted and deformed. In this case, the deformed portion may be in contact with the electrode having the opposite polarity to cause an internal short circuit or may cause a minute crack in the uncoated portions 10a, 11a. In addition, the uncoated portion 32 adjacent to the core 33 of the electrode assembly A is bent to block the cavity completely or substantially in the core of the electrode assembly A. In this case, a problem arises in the electrolyte injection process. That is, the cavity in the core 33 of the electrode assembly A is used as a passage through which the electrolyte is injected. However, when the corresponding passage is blocked, it is difficult to inject the electrolyte. In addition, while the electrolyte injector is inserted into the cavity in the core 33, it may interfere with the uncoated portion 32 near the core 33, whereby the uncoated portion 32 is torn.

In addition, the bent portions of the uncoated portions 10a, 11a to which the current collector plates 30, 31 are welded should be overlapped in multiple layers, and there should be no empty space (gap). Only then, sufficient welding strength may be obtained, and even when the latest technology such as laser welding is used, it is possible to prevent the problem that the laser may penetrate the electrode assembly A to melt the separator 12 or the active material 21.

In addition, in the conventional tab-less cylindrical secondary battery, the positive electrode uncoated portion 10a is formed entirely on top of the electrode assembly A, and thus, when the outer circumferential surface of the upper end of the battery can is pressed inward to form a beading portion, the upper edge portion 34 of the electrode assembly A is pressed by the battery can. Such pressure may cause partial deformation of the electrode assembly A, and at this time, the separator 12 may be torn, resulting in an internal short circuit. If a short circuit occurs inside the secondary battery, heat generation or explosion may occur.

In consideration of these points, the uncoated portions 10a, 11a should not be entirely formed at the top and bottom of the electrode assembly A as they are now, and need to be omitted in some sections. When the uncoated portions 10a, 11a are omitted in some sections, the resistance according to the lengthwise direction current path inside the aforementioned electrode assembly is increased, and thus it should also be considered to design a low-resistance cell minimizing the current path in a tap-less cylindrical secondary battery. In particular, when the form factor is increased to apply the cylindrical secondary battery to an electric vehicle, a large amount of heat may be generated during the fast charge process to cause a problem of ignition of the cylindrical secondary battery, thereby making it more important to design a low-resistance cell minimizing the current path.

DISCLOSURE

Technical Problem

The present disclosure has been devised under the background of the prior art as described above and is designed to solve the problems of the related art, and therefore the present disclosure is directed to providing an electrode assembly that minimizes a current path, particularly a lengthwise direction current path to implement low resistance in a cylindrical secondary battery, and thus, in which a cylindrical secondary battery may exhibit excellent quality in terms of a degree of heat generation due to a high current density while having a large capacity and/or high output.

The present disclosure is also directed to providing a secondary battery including the electrode assembly having an improved structure to minimize a current path, a battery pack including the same, and a vehicle including the battery pack.

Technical problems to be solved by the present disclosure are not limited to the above-described problems, and other problems not mentioned herein may be clearly understood by those skilled in the art from the following description of the present disclosure.

Technical Solution

The electrode assembly of the present disclosure for solving the above-described problem is an electrode assembly defining a core and an outer circumferential surface by winding a positive electrode, a negative electrode, and a separator interposed therebetween around a winding axis, wherein the positive electrode or the negative electrode includes a current collector having a sheet-shape that has a long side and a short side, the current collector further having an uncoated portion at an end of the long side, wherein the uncoated portion includes an electrode tab defined section used as an electrode tab by itself and at least one electrode tab undefined section not used as an electrode tab, wherein a maximum current path for the at least one electrode tab undefined section includes a widthwise direction current path along the short side of the current collector and a lengthwise direction current path along the long side of the current collector, and a current path ratio $L2/L1$ is 11 or less when lengths of the widthwise direction current path and the lengthwise direction current path are $L1$ and $L2$, respectively.

Preferably, the current path ratio $L2/L1$ may be approximately 10.15 or less.

The current path ratio $L2/L1$ may be approximately 8.5 or less, or approximately 2 to 5.

A height of the at least one electrode tab undefined section may be smaller than that of the electrode tab defined section.

A maximum value of a length of the at least one electrode tab undefined section may be approximately 4% to 23% of lengths of the positive electrode and the negative electrode.

A maximum value of a length of the at least one electrode tab undefined section may be approximately 2.5 to 11 times of widths of the positive electrode and the negative electrode.

According to an aspect of the present disclosure, the uncoated portion may include a first portion adjacent to the core, a second portion adjacent to the outer circumferential surface, and a third portion between the first portion and the second portion, and the first portion may have a height smaller than that of the third portion in a winding axis direction.

Also, the third portion may be defined as an electrode tab in a bent state along a radial direction of the electrode assembly.

The second portion may have a height equal to or smaller than that of the third portion in the winding axis direction.

The second portion and the third portion may be defined as electrode tabs in a bent state along a radial direction of the electrode assembly.

A length along the side of the current collector may be approximately 60 mm to 85 mm, and a length along the long side of the current collector may be approximately 3 m to 5 m.

Herein, a maximum value of the length along the long side of the current collector in the first portion may be approximately 4% to 23% of the length along the long side of the current collector.

The length along the long side of the current collector in the first portion may be approximately 660 mm or less.

The first portion may correspond to the at least one electrode tab undefined section.

The first portion may not be bent along a radial direction of the electrode assembly.

The second portion may not be bent along a radial direction of the electrode assembly.

A length of the third portion may be longer than that of the first portion and that of the second portion in a winding direction of the electrode assembly.

The first portion may start from a short side of the core of the current collector, the height of the first portion may be constant along a winding direction, and the first portion may not be bent along a radial direction of the electrode assembly.

According to another aspect of the present disclosure, at least a partial region of the third portion may be divided into a plurality of segment pieces that are independently bendable.

Herein, the plurality of segment pieces are bent and overlapped in the winding axis direction.

Preferably, a length along the short side of the current collector is approximately 60 mm to 85 mm, a length along the long side of the current collector is approximately 3 m to 5 m, a thickness of the current collector is approximately 5 μm to 25 μm, a width of the plurality of segment pieces is approximately 3 mm-10 mm, and a height of the plurality of segment pieces is approximately 10 mm or less.

Herein, the length along the long side of the current collector in the first portion is approximately 660 mm or less.

The electrode assembly includes sequentially along a radial direction of the electrode assembly based on a cross section along the winding axis direction, a segment pieces omission section in which the plurality of segment pieces are not present, and a height uniform section in which a height of the plurality of segment pieces is uniform, wherein the plurality of segment pieces are disposed in the height uniform section and are bent along a radial direction of the electrode assembly to form a bent surface region.

As another example, the electrode assembly further includes a height variable section in which the height of the plurality of segment pieces is variable between the segment pieces omission section and the height uniform section, wherein the plurality of segment pieces are disposed in the height variable section and the height uniform section and may be bent along the radial direction of the electrode assembly to form a bent surface region.

The segment pieces omission section may correspond to the at least one electrode tab undefined section.

The second portion is not divided into the plurality of segment pieces, and the heights of the first portion and the second portion may be the same.

The third portion may include at least one segment pieces omission section in which there are no segment pieces along a winding direction of the electrode assembly among the plurality of segment pieces.

Herein, a height of the uncoated portion in the segment pieces omission section may be the same as that of the first portion.

The plurality of segment pieces may be positioned in at least two sectoral or polygonal regions arranged in a circumferential direction based on the core.

Even in this case, the segment pieces omission section may correspond to the at least one electrode tab undefined section.

A cavity may be provided in the core, the third portion may be defined as an electrode tab in a bent state along a radial direction of the electrode assembly, the third portion may be divided into a plurality of independently bendable segment pieces, and the bent plurality of independently bendable segment pieces may not block the cavity.

In such a case, a maximum value of a length along the long side of the current collector in the first portion may be approximately 4% to 23% of a length of the long side of the current collector.

A secondary battery of the present disclosure for solving the above other problem includes an electrode assembly according to the present disclosure; a cylindrical battery housing accommodating the electrode assembly through an opening formed on one side and connected to the uncoated portion of the negative electrode; a sealing body that seals the opening of the cylindrical battery housing to be insulated from the cylindrical battery housing; and a positive electrode terminal that is riveted through a through hole formed at a bottom of the cylindrical battery housing located on an opposite side of the opening of the cylindrical battery housing, and is connected to the uncoated portion of the positive electrode.

Preferably, in the secondary battery according to the present disclosure, the uncoated portion of the positive electrode is exposed to an outside of the separator, and the uncoated portion of the negative electrode is exposed to the outside of the separator in a direction opposite to the uncoated portion of the positive electrode, and the secondary battery further includes a positive electrode current collector plate electrically connected to the uncoated portion of the positive electrode and a negative electrode current collector plate electrically connected to the uncoated portion of the negative electrode.

The secondary battery may have a direct current (DC) resistance of approximately 4 mΩ or less, and an alternating current (AC) resistance of approximately 3 mΩ or less.

Preferably, the secondary battery may have an alternating current (AC) resistance of approximately 2 mΩ or less.

The secondary battery may have a ratio of a diameter to a height greater than approximately 0.4.

The sealing body may include a cap plate having no polarity and a sealing gasket interposed between an edge of the cap plate and the opening of the cylindrical battery housing.

The positive electrode terminal may include a body portion inserted into the through hole; an outer flange portion extending along an outer surface from a circumference of one side of the body portion exposed through an outer surface of the bottom of the cylindrical battery housing; an inner flange portion extending toward an inner surface from a circumference of another side of the body portion exposed through an inner surface of the bottom of the cylindrical battery housing; and a flat portion provided inside the inner flange portion.

The secondary battery may further include a positive electrode current collector plate electrically connected to the uncoated portion of the positive electrode and a negative electrode current collector plate electrically connected to the uncoated portion of the negative electrode, wherein the positive electrode terminal may be coupled to the positive electrode current collector plate by laser welding in the flat portion.

The at least one electrode tab undefined section may not be connected to the negative electrode current collector plate and the positive electrode current collector plate, and thus it may not be a portion forming a current path.

Another object of the present disclosure may be achieved by a battery pack including a plurality of the above-described secondary batteries including the secondary battery.

Preferably, the plurality of secondary batteries are arranged in a predetermined number of rows, and the positive electrode terminal and an outer surface of the bottom of the battery housing of each secondary battery are disposed to face upward.

Another object of the present disclosure may also be achieved by a vehicle including at least one of the battery.

Advantageous Effects

According to one aspect of the present disclosure, an upper limit of the current path ratio L2/L1 in the maximum current path is presented. The range of the current path ratio L2/L1 corresponds to a range in which the electrode assembly may minimize internal resistance while having a large capacity. Therefore, a secondary battery including such an electrode assembly may exhibit excellent quality in terms of the degree of heat generation due to the high current density, while having a large capacity and/or high output.

According to another aspect of the present disclosure, since the uncoated portions themselves protruding from the upper and lower portions of the electrode assembly are used as electrode tabs, the internal resistance of the secondary battery may be reduced and the energy density may be increased.

According to still another aspect of the present disclosure, by improving the structure of the uncoated portion of the electrode assembly, it is possible to prevent the uncoated portion from being torn when the uncoated portion is bent, and by sufficiently increasing the number of overlapping layers in the uncoated portion, it is possible to improve the welding strength of the current collector plate.

According to still another aspect of the present disclosure, by applying a segment pieces structure to the uncoated portion of the electrode and optimizing dimensions (width, height, and spacing pitch) of the segment pieces to sufficiently increase the number of segment pieces stacks in a region used as the welding target region, it is possible to improve the physical properties of the region to which the current collector plate is welded.

According to still another aspect of the present disclosure, there is provided an electrode assembly having improved energy density and reduced resistance by applying a structure in which a current collector plate is welded in a wide area to a bent surface region formed by bending the segment pieces.

According to still another aspect of the present disclosure, a cylindrical secondary battery having an improved design may be provided to perform electrical wiring at the top.

According to still another aspect of the present disclosure, by improving the structure of a positive electrode terminal of a cylindrical secondary battery to enlarge the cross-sectional area of a current path, it is possible to improve the problem of internal heat generation that occurs during fast charge.

According to still another aspect of the present disclosure, the structure of the uncoated portion adjacent to the core of the electrode assembly is improved to prevent a cavity in the core of the electrode assembly from being blocked when the uncoated portion is bent, so that an electrolyte injection process, and a welding process of the battery housing (or positive electrode terminal) and the current collector plate may be easily performed.

According to still another aspect of the present disclosure, it is possible to provide a cylindrical secondary battery having a low internal resistance, preventing an internal short circuit, and having an improved welding strength between a current collector plate and an uncoated portion, a battery pack and a vehicle including the same.

In particular, the present disclosure may provide a cylindrical secondary battery having a DC resistance of 4 mΩ or less, an AC resistance of 3 mΩ or less, and a ratio of diameter to height of 0.4 or more, a battery pack and a vehicle including the same. In addition, the present disclosure may have various other effects, which will be described in each embodiment, or the corresponding description will be omitted for effects that may be easily inferred by those skilled in the art.

DESCRIPTION OF DRAWINGS

The accompanying drawings illustrate a preferred embodiment of the present disclosure and together with the foregoing disclosure, serve to provide further understanding of the technical features of the present disclosure, and thus the present disclosure should not be construed as being limited to the drawings.

FIG. 1 is a view illustrating a state in which a positive electrode and a negative electrode applied to a conventional cylindrical secondary battery are spread out.

FIG. 3 is a view schematically illustrating the flow of current or electrons in a positive electrode and a negative electrode constituting an electrode assembly in a conventional cylindrical secondary battery.

BEST MODE

Figure 2:
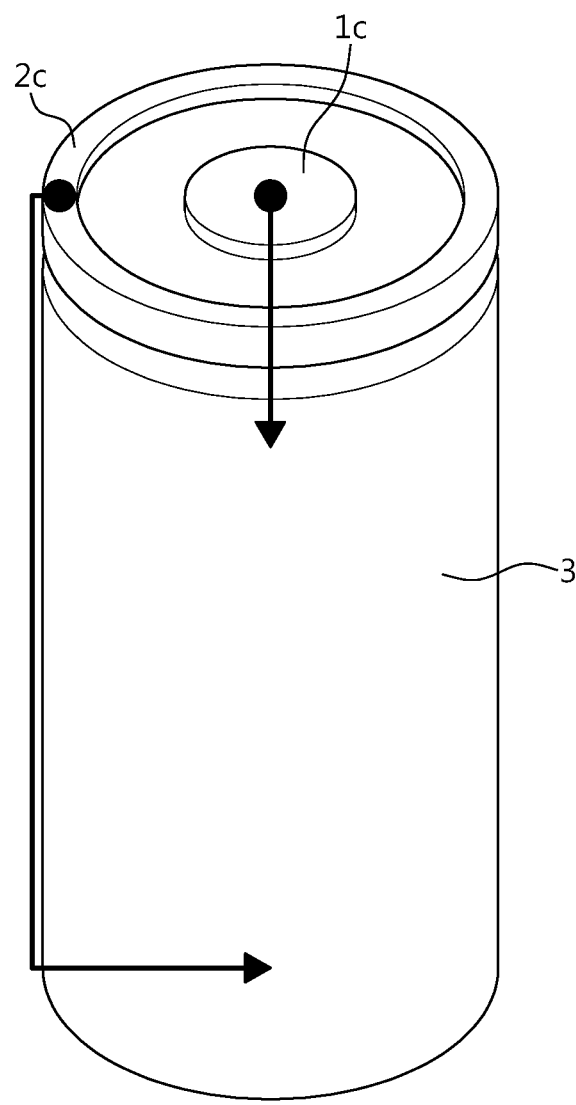
FIG. 2 is a view schematically illustrating the flow of current or electrons outside a secondary battery in a conventional cylindrical secondary battery.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the present disclosure, so it should be understood that other equivalents and modifications could be made thereto without departing from the scope of the present disclosure.

In addition, in order to help understanding of the present disclosure, the accompanying drawings are not drawn to scale, but dimensions of some components may be exaggerated. Also, the same reference number may be assigned to the same component in different embodiments.

A statement that two objects of comparison are 'identical' means 'substantially identical'. Therefore, 'substantially identical' may include deviations considered to be low in the art, for example, deviations within 5%. Also, uniformity of a certain parameter in a predetermined region may mean that it is uniform in terms of an average.

As used herein, unless otherwise stated, each component may be singular or plural.

Placing any component on the "upper (or lower)" of a component or "top (or below)" of a component may mean that any component is disposed in contact with the top (or bottom) surface of the component, and also may mean that other components may be interposed between the component and any component disposed on (or under) the component.

In addition, when it is described that a component is "linked", "coupled", or "connected" to another component, the components may be directly linked or connected to each other, but it should be understood that still another component may be "interposed" between each component, or each component may be "linked", "coupled", or "connected" through still another component. Also, the connection may include an electrical connection or a physical connection.

For convenience of description, in the present specification, a direction along the lengthwise direction of the winding axis of the electrode assembly wound in a jelly-roll shape is referred to as a winding axis direction (Y-axis direction). Also, a direction surrounding the winding axis is referred to as a circumferential direction or a perimeter direction (X-axis direction). And, a direction closer to or away from the winding axis is referred to as a radial direction.

One of the features of the present disclosure is to set a maximum current path in a positive electrode and/or a negative electrode constituting a jelly-roll type electrode assembly in order to minimize resistance in a cylindrical secondary battery. In particular, the present disclosure presents an upper limit of the current path ratio L2/L1 with respect to the length L1 of the widthwise direction current path along the short side of the current collector and the length L2 of the lengthwise direction current path along the long side of the current collector in the maximum current path. The range of this current path ratio corresponds to a range in which the electrode assembly may minimize internal resistance while having a large capacity, and when the upper limit of the current path ratio L2/L1 is exceeded, it is not possible to satisfy the minimum resistance requirement of the secondary battery (e.g., DC resistance of 4 mΩ or less, and AC resistance of 3 mΩ or less).

Figure 7:
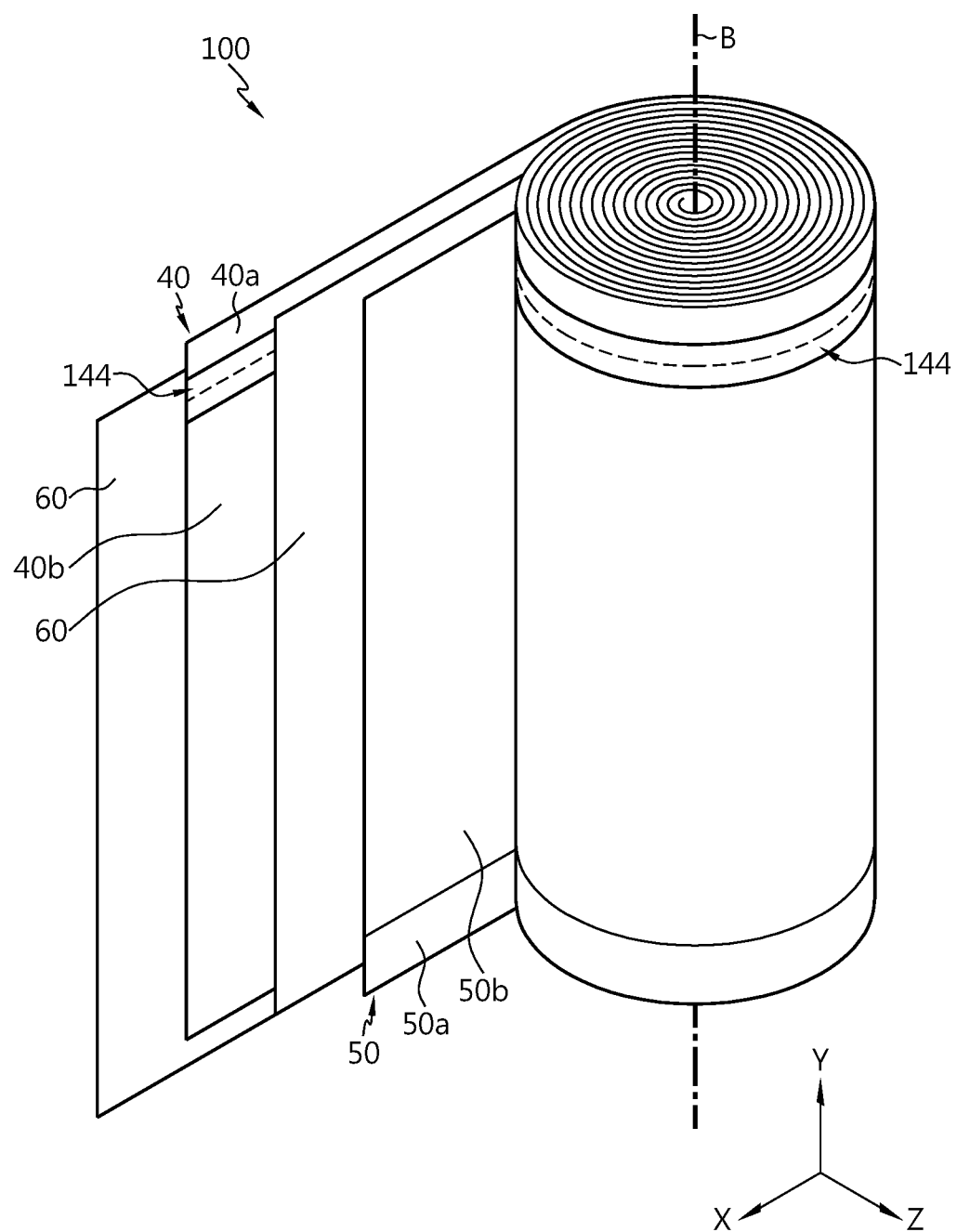
FIG. 7 is a view for describing an electrode assembly according to an embodiment of the present disclosure.

First, the electrode assembly of the present disclosure will be described. FIG. 7 is a view for describing an electrode assembly according to an embodiment of the present disclosure.

Referring to FIG. 7, the electrode assembly 100 includes a positive electrode 40, a negative electrode 50, and a separator 60 interposed therebetween. The electrode assembly 100 may be a jelly-roll type electrode assembly having a structure in which the positive electrode 40, the negative electrode 50, and the separator 60 are wound in one direction. The electrode assembly 100 may be manufactured by winding a stack, which is formed by sequentially stacking the positive electrode 40, the separator 60, the negative electrode 50, and the separator 60 at least once, in one direction (X-axis direction in the drawing) with respect to the winding axis B. An innermost side of the electrode assembly 100 is defined as a core, and an outermost side is defined as an outer circumferential surface. The X-axis direction is the winding direction.

The core may be provided with a cavity. The diameter of the cavity may be, for example, 2 mm to 8 mm. The cavity may be a position from which a winding core serving as the winding axis is subtracted. The smaller the cavity diameter is, the more advantageous it is to utilize the inner space of the battery housing including the electrode assembly 100, but since the electrode assembly 100 may be manufactured only by using a winding core, the cavity diameter may not be 0. In addition, the cavity is a moving passage of the electrolyte when the electrolyte is injected, and thus it should have a predetermined size or more in order to smoothly achieve the electrolyte impregnation. Therefore, it is preferable that the cavity diameter is 2 mm or more as far as possible at the level of the allowable winding process, and when the cavity diameter exceeds 8 mm, the use of the internal space is inefficient, which is not preferable in terms of energy density.

The positive electrode 40 has a structure in which a positive electrode active material layer 40b is coated on one or both surfaces of a sheet-shaped positive electrode current collector having a long side and a short side, and includes a positive electrode uncoated portion 40a in which an active material is not coated on one end of the long side along the winding direction. Here, the long side is in a direction parallel to the X-axis direction and means a side having a relatively long length. The X-axis direction may be referred to as a lengthwise direction. The short side is in a direction parallel to the Y-axis direction in the drawing and means a side having a shorter length than the long side. The Y-axis direction may be referred to as a widthwise direction.

The positive electrode uncoated portion 40a is defined as an electrode tab by itself, and is distinguished from the prior art in which a strip-shaped electrode tab is separately attached. Here, what is defined as an electrode tab means that it becomes a portion forming a current path by being coupled to a current collector when manufactured as a secondary battery. In addition, only a part of the positive electrode uncoated portion 40a is defined as an electrode tab. This means that a part of the positive electrode uncoated portion 40a is not used as an electrode tab. The part not used as the electrode tab is not connected to the current collector plate due to a lower height in the winding axis direction (Y-axis direction) compared to other parts of the positive electrode uncoated portion 40a or omission in some sections, and thus may refer to a part that does not form a current path. As such, it is further distinguished from the prior art in that only a part of the positive electrode uncoated portion 40a is defined as an electrode tab. As described above, the positive electrode uncoated portion 40a may include an electrode tab defined section used as an electrode tab by itself and at least one electrode tab undefined section not used as an electrode tab.

The negative electrode 50 also has a structure in which a negative electrode active material layer 50b is coated on one or both surfaces of a sheet-shaped negative electrode current collector having a long side and a short side, and includes a negative electrode uncoated portion 50a in which an active material is not coated on one end of the long side along the winding direction. The negative electrode uncoated portion 50a is also defined as an electrode tab by itself. In addition, only a part of the negative electrode uncoated portion 50a is defined as an electrode tab. As described above, the negative electrode uncoated portion 50a may include an electrode tab defined section used as an electrode tab by itself and at least one electrode tab undefined section not used as an electrode tab.

The positive electrode uncoated portion 40a and the negative electrode uncoated portion 50a are disposed in opposite directions, and the electrode assembly 100 after winding is completed has a substantially cylindrical shape. The positive electrode uncoated portion 40a is positioned at the upper end of the electrode assembly 100, and the negative electrode uncoated portion 50a is positioned at the lower end of the electrode assembly 100. In the electrode assembly 100, a part of the positive electrode uncoated portion 40a protruding upward and a part of the negative electrode uncoated portion 50a protruding downward are used as electrode tabs, and each current collector plate is welded and connected thereto, so that a tab-less cylindrical secondary battery with improved current collecting efficiency may be manufactured. By using the uncoated portions 40a, 50a protruding on the upper and lower portions of the electrode assembly 100 themselves as electrode tabs, internal resistance of the secondary battery may be reduced and energy density may be increased.

The electrode assembly 100 according to an embodiment of the present disclosure is further distinguished from the prior art in that the ratio (L2/L1, "current path ratio") of a length L2 of the lengthwise direction current path along the long side of the current collector constituting the second path of the electrode to a length L1 of the widthwise direction current path along the short side of the current collector constituting the second path (maximum current path) of the electrode is 11 or less in the positive electrode 40 or the negative electrode 50, which is an electrode included in the electrode assembly 100.

The short side and the long side of the electrode current collector correspond to the width and length of the electrode, respectively. Therefore, in the maximum current path of the positive electrode 40 or the negative electrode 50, the ratio L2/L1 of the length L2 of the lengthwise direction current path to the length L1 of the widthwise direction current path is 11 or less.

Figure 8:
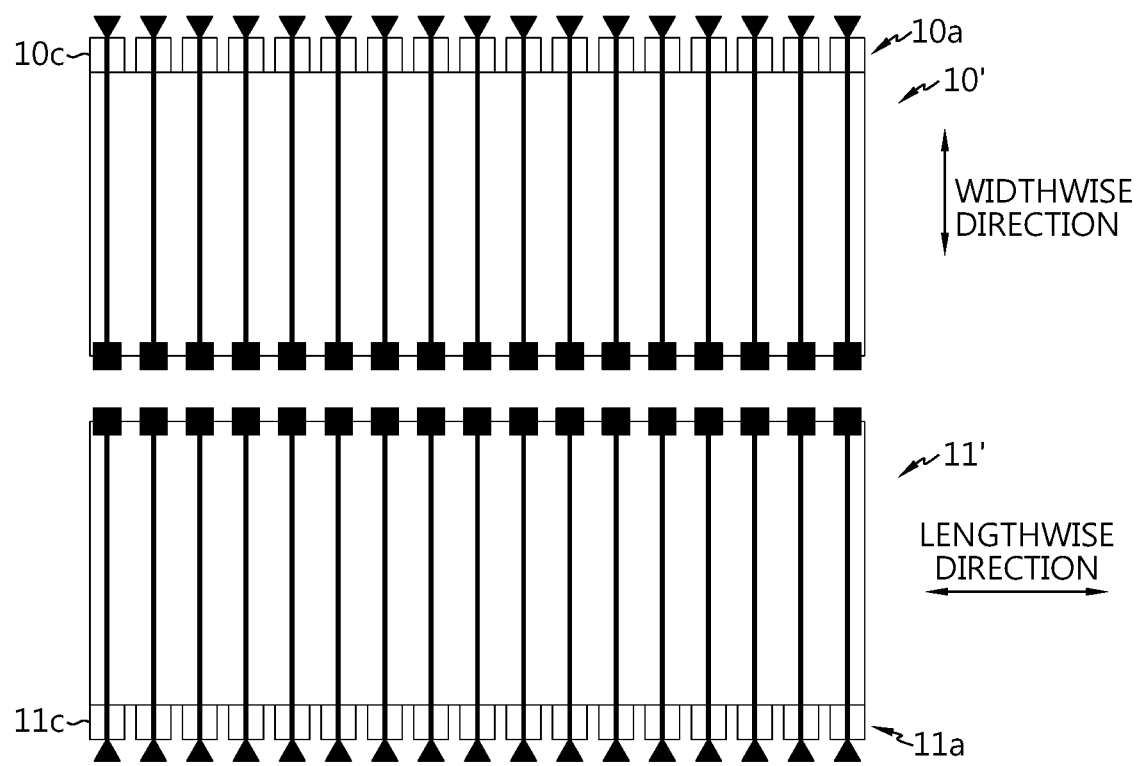
FIG. 8 is for describing the background of setting a ratio of the current path to the maximum current path in the electrode included in the electrode assembly of FIG. 7 within a predetermined range, and is a view schematically illustrating the flow of current or electrons in a positive electrode and a negative electrode constituting a virtual electrode assembly.

The background of setting the current path ratio in the maximum current path in the electrode included in the electrode assembly within the predetermined range as described above in the present disclosure will be described with reference to FIG. 8. FIG. 8 schematically illustrates the flow of current or electrons in the positive electrode or the negative electrode constituting the virtual electrode assembly (the connection positions of the first path and the second path are marked with a triangle, and an end point of the electrode is marked with a square).

Figure 4:
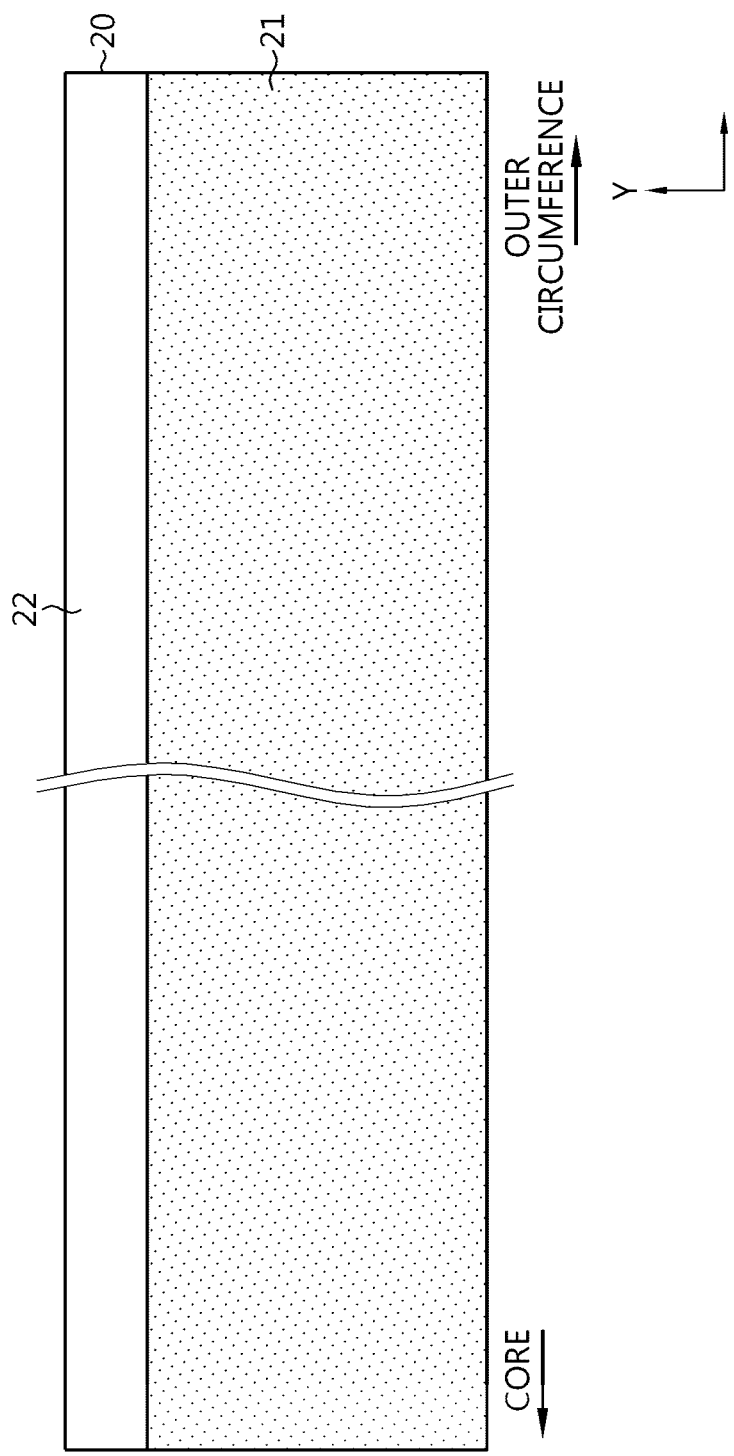
FIG. 4 is a plan view illustrating the structure of an electrode used for manufacturing a conventional tab-less cylindrical secondary battery.
Figure 5:
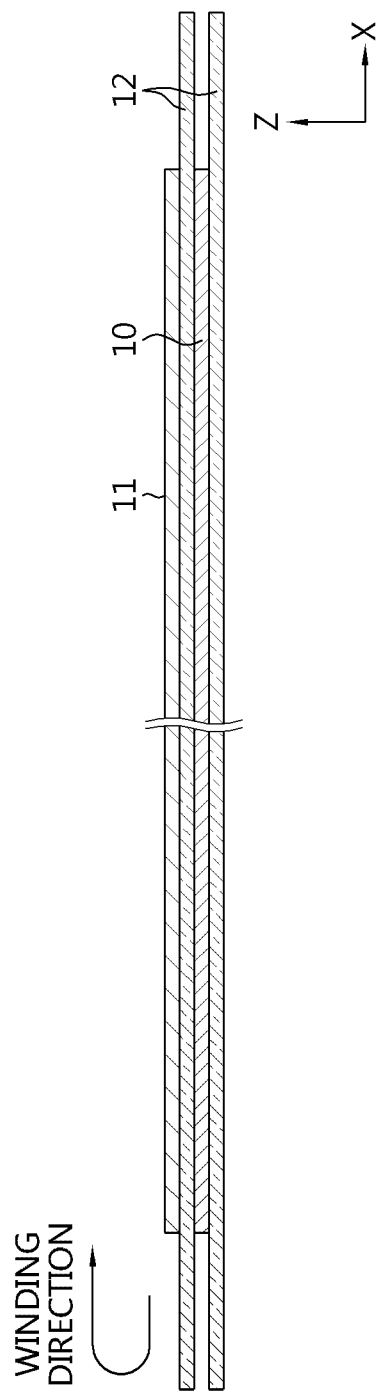
FIG. 5 is a view illustrating an electrode winding process of a conventional tab-less cylindrical secondary battery.
Figure 6:
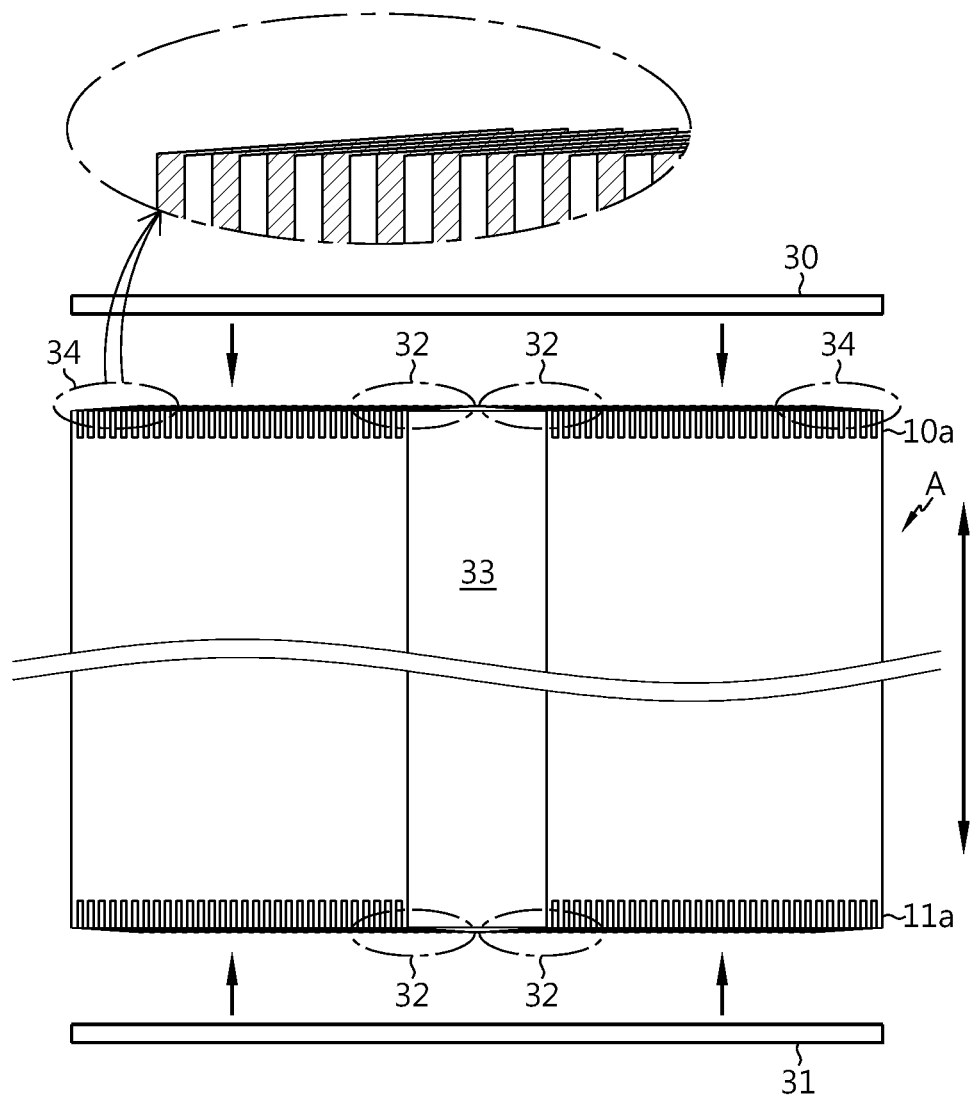
FIG. 6 illustrates a process in which a current collector plate is welded to a bent surface of an uncoated portion in a conventional tab-less cylindrical secondary battery.

For example, the positive electrode 10' and the negative electrode 11' shown in FIG. 8 have a structure in which a plurality of positive electrode tabs 10c and a plurality of negative electrode tabs 11c are formed by notching the uncoated portion 10a of the positive electrode 10 and the uncoated portion 11a of the negative electrode 11 in the widthwise direction in the prior art described with reference to FIGS. 4 to 6.

If the electrode assembly including the positive electrode 10' and the negative electrode 11' shown in FIG. 8 is manufactured as a cylindrical secondary battery, and the module bus bar welding position is the same as that of the secondary battery described with reference to FIG. 2, the first path, which is a path leading to the electrode tabs 10c, 11c of each electrode 10', 11', will also be the same as in the secondary battery described with reference to FIG. 2. However, the second path (maximum current path) of the electrodes 10', 11' is clearly different from that of FIG. 3 as shown in FIG. 8.

In FIG. 8, the length of the current path in the widthwise direction of both the positive electrode 10' and the negative electrode 11' is short at the level of the length in the widthwise direction, and the movement in the lengthwise direction is shorter than the conventional second path shown in FIG. 3 due to the uncoated portions 10a, 11a that exist almost continuously. In particular, when the positive electrode tab 10c of the positive electrode 10' and the negative electrode tab 11c of the negative electrode 11' are placed at positions corresponding to each other in the upper and lower portions of the electrode assembly, the movement in the lengthwise direction is little or very short as illustrated. Therefore, the maximum current path of the electrodes 10', 11' becomes substantially the same as the widthwise direction current path of the electrodes.

That is, if the positive electrode 10' and the negative electrode 11' have the electrode structure as shown in FIG. 8, the length of the widthwise direction current path of the maximum current path is actually short at the level of the distance in the widthwise direction of the electrode, and the lengthwise direction current path of the electrode is very short. Therefore, the current path ratio will be close to zero.

However, the length of the lengthwise direction current path in the maximum current path of the electrode may vary depending on the structure of the electrode tab (uncoated portion) as described with reference to FIG. 3. FIG. 8 shows a structure in which the electrode tabs 10c, 11c are formed approximately continuously along the lengthwise direction of the electrodes 10', 11', but preferably, a region from which the electrode tabs are removed may exist.

For example, the electrode assembly according to an embodiment of the present disclosure may have a shape in which the uncoated portion is bent toward the core. In this case, in order to prevent the bent uncoated portion from blocking the cavity provided in the core, the uncoated portion close to the core may not be bent, a height in the winding direction may be lowered, or a significant portion may be removed and left as the electrode tab undefined section as described above. The electrode tab undefined section may be formed close to the core side of the electrode assembly after the electrode is wound. In addition, the electrode tab undefined section may be provided at a plurality of locations between one end and the other end in the lengthwise direction based on the time before the electrode is wound. Also, the length in the winding direction of the electrode tab defined section may be variously set according to the position and length of the electrode tab undefined section. When the electrode includes a plurality of electrode tab undefined sections, the maximum current path of the electrode may be defined in the electrode tab undefined section having the longest length in the winding direction. Since electrons should move toward the electrode tab defined section in the electrode tab undefined section, the maximum current path is defined in the electrode tab undefined section having the longest length. Therefore, as the length in the winding direction of the electrode tab undefined section increases, the current path ratio inevitably becomes longer than in the case shown in FIG. 8. Also, the current path ratio may vary depending on the position of the electrode tab defined section.

The maximum current path varies depending on how the position of the electrode tab defined section is set, and as the maximum current path becomes smaller, the resistance of the electrode decreases. However, when designing an electrode assembly, it is necessary to include the electrode tab undefined section in a partial section of the uncoated portion, and thus there is a factor of increasing resistance. Therefore, in the present disclosure, the upper limit of the current path ratio L2/L1 in the maximum current path for the electrode tap undefined section is limited to satisfy the low resistance condition. That is, the range of the current path ratio L2/L1 may be limited so that the resistance of the secondary battery does not increase beyond a predetermined range.

As described above, in the present disclosure, the upper limit of the current path ratio L2/L1 in the maximum current path for the electrode tap undefined section is limited to a predetermined range while including the electrode tap undefined section in at least a partial section of the uncoated portion. In other words, the present disclosure provides a guide on how long the electrode tab undefined section may be set while minimizing the increase in resistance of the secondary battery.

Figure 9:
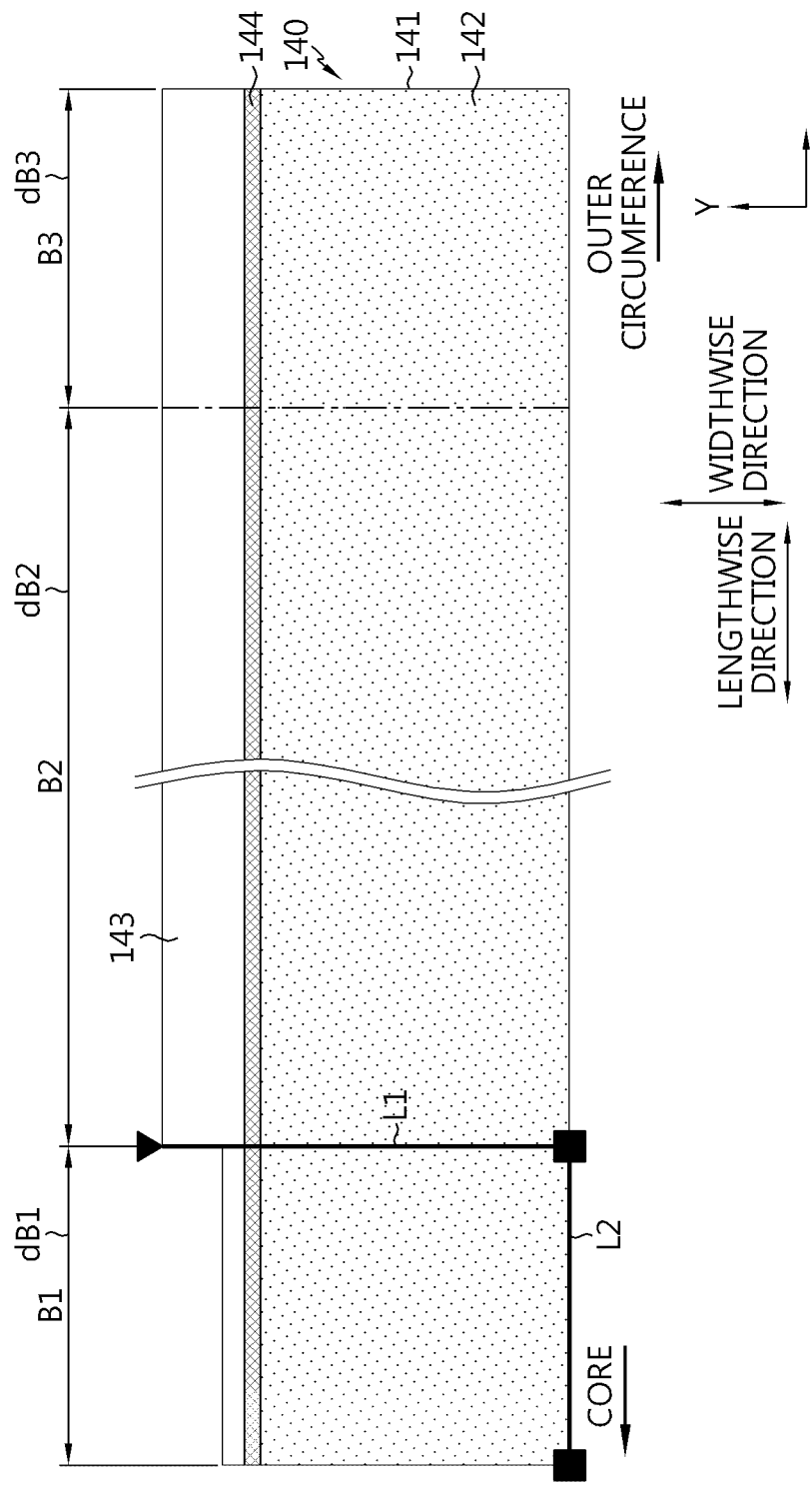
FIG. 9 is a plan view illustrating an electrode structure of a first embodiment that may be included in the electrode assembly of FIG. 7.

FIG. 9 is a plan view illustrating an electrode structure of a first embodiment that may be included in the electrode assembly of FIG. 7.

Referring to FIG. 9, the electrode 140, which may be the positive electrode 40 or the negative electrode 50 shown in FIG. 7, includes an electrode current collector 141 made of a metal foil and an active material layer 142. The metal foil may be a conductive metal, such as aluminum or copper, and is appropriately selected according to the polarity of the electrode 140. The thickness of the positive electrode current collector (foil) may be 10 μm to 20 μm, and the thickness of the negative electrode current collector (foil) may be 5 μm to 15 μm.

The short side length of the current collector 141 may be 60 mm to 85 mm, and the long side length of the current collector 141 may be 3 m to 5 m. In this case, the ratio of the short side to the long side of the current collector 141 may be 1.2% to 2.8%, which is significantly smaller than the level of 6% to 11% in a cylindrical secondary battery having a form factor of 1865 or 2170. That is, the current collector 141 is very long in the lengthwise direction and has a very large number of winding turns when wound. The winding turn may be counted based on the core-side end of the electrode assembly 100.

An active material layer 142 is formed on at least one surface of the current collector 141. The active material layer 142 is formed along the winding direction (X-axis direction). The electrode 140 includes an uncoated portion 143 at the long side end in the winding direction. The uncoated portion 143 is a partial region of the current collector 141 that is not coated with an active material. A part of the uncoated portion 143 in the winding direction is set as an electrode tab undefined section, and the rest is set as an electrode tab defined section.

The electrode 140 is manufactured by forming the active material layer 142 on the current collector 141 and then pressing it. Preferably, an insulating coating layer 144 may be formed at a boundary between the active material layer 142 and the uncoated portion 143. At least a portion of the insulating coating layer 144 is formed to overlap the boundary between the active material layer 142 and the uncoated portion 143. The insulating coating layer 144 prevents a short circuit between two electrodes 140 having different polarities facing each other with a separator (refer to 60 in FIG. 7) interposed therebetween, that is, the positive electrode 40 and the negative electrode 50. The insulating coating layer 144 may have a width of 0.3 mm to 5 mm to cover the boundary between the active material layer 142 and the uncoated portion 143. The width of the insulating coating layer 144 may vary along the winding direction of the electrode 140. The insulating coating layer 144 may include a polymer resin and an inorganic filler such as $Al_2O_3$. Since the portion of the current collector 141 covered by the insulating coating layer 144 is not a region coated with the active material layer, it may be regarded as an uncoated portion.

The uncoated portion 143 includes a first portion B1 adjacent to the core of the electrode assembly 100, a second portion B3 adjacent to the outer circumferential surface of the electrode assembly 100, and a third portion B2 between the first portion B1 and the second portion B3.

The boundary of B1/B2 may be appropriately defined as a point at which the height (or change pattern) of the uncoated portion substantially changes from the core side of the electrode assembly to the outer circumferential side, or a point at a predetermined percentage based on the radius of the electrode assembly (e.g., 5%, 10%, 15% of the radius, etc.). The boundary of B2/B3 may also be appropriately defined as a point at which the height (or change pattern) of the uncoated portion substantially changes from the outer circumferential side of the electrode assembly to the core side, or a point at a predetermined percentage based on the radius of the electrode assembly (e.g., 85%, 90%, 95% of the radius, etc.). When the boundary of B1/B2 and the boundary of B2/B3 are specified, the third portion B2 may be automatically specified.

It is not excluded that another structure is interposed between the first portion B1 and the third portion B2. Also, it is not excluded that another structure is interposed between the third portion B2 and the second portion B3.

In the present disclosure, the height of the uncoated portion 143 is not constant and there is a relative difference in the winding direction. That is, the first portion B1 has a smaller height in the winding axis direction than the third portion B2. After the uncoated portion 143 is formed with a constant height, the uncoated portion of the first portion B1 may be cut larger than the uncoated portion of the third portion B2 to have such a height difference. Here, the height of each portion may be an average height or a maximum height, and is the same hereafter.

The heights of the first portion B1 and the second portion B3 in the winding axis direction may be 0 or more, and the heights of the first portion B1 and the second portion B3 may be the same or different from each other. In this embodiment, the case in which the heights of the first portion B1 and the second portion B3 are different, and the height of the second portion B3 is equal to the height of the third portion B2 is taken as an example.

In the present embodiment, the first portion B1 corresponds to the electrode tab undefined section, and the third portion B2 corresponds to the electrode tab defined section. The second portion B3 may also be set as the electrode tab defined section. The third portion B2 may be defined as an electrode tab in a bent state along the radial direction of the electrode assembly 100. Likewise, the second portion B3 may also be defined as an electrode tab in a bent state along the radial direction. Since the first portion B1 is not bent along the radial direction and does not make electrical contact with a current collector plate to be described later, the current (electrons) flows in a detour through the adjacent third portion B2 during the occurrence of the redox reaction in the first portion B1.

In the electrode 140 having this structure, the second portion B3 may be bent to become a welding region. In the winding direction, the length $d_{B2}$ of the third portion B2 may be longer than the length $d_{B1}$ of the first portion B1. The length $d_{B2}$ of the third portion B2 may be longer than the length $d_{B3}$ of the second portion B3. By increasing the length $d_{B2}$ of the third portion B2, the bent portions may be overlapped in multiple layers during bending. By increasing the length $d_{B2}$ of the third portion B2, a sufficient welding region may be ensured.

Preferably, the first portion B1 corresponding to the electrode tab undefined section is close to the core. After the first portion B1 is wound first, the third portion B2 is wound. Since the third portion B2 is located farther than the core by the first portion B1, the third portion B2 is not deformed when the third portion B2 is bent.

The height of the first portion B1 is small and is not bent, so that the cavity in the core of the electrode assembly 100 is not blocked. If the cavity of the core is not blocked, there is no difficulty in the electrolyte injection process, and the electrolyte injection efficiency is improved. In addition, a welding jig may be inserted through the core to easily perform a welding process between the current collector plate on the negative electrode (or positive electrode) side and the battery housing (or electrode terminal).

After the uncoated portion 143 is formed with a constant height, the uncoated portion of the first portion B1 may be cut larger than the uncoated portion of the third portion B2 to have a height difference, and thus the first portion B1 is not used as an electrode tab. As described above, when the uncoated portion 143 includes the electrode tab undefined section, the resistance increases as the maximum current path increases, compared to the case in which the entire uncoated portion is designed as the electrode tab defined section.

Preferably, the first portion B1 is required in order not to block the cavity of the core while the electrode tab defined section is bent. Even if the length $d_{B1}$ of the first portion B1 is increased, when the length $d_{B2}$ of the third portion B2 and the length $d_{B3}$ of the second portion B3 are relatively longer or the welding area ensured by the third portion B2 is sufficient, the resistance (AC resistance and DC resistance) of the entire cell may not be significantly changed, but the resistance in the first portion B1 is increased. Therefore, it is necessary to limit the length $d_{B1}$ of the first portion B1 in consideration of an increase in resistance in the first portion B1.

In the current path ratio L2/L1 of the maximum current path, the denominator is constant as the width of the electrode. Therefore, the length $d_{B1}$ of the first portion B1 is a factor that determines the current path ratio L2/L1 of the maximum current path. In the present disclosure, the current path ratio L2/L1 of the maximum current path is set to 11 or less by adjusting the length $d_{B1}$ of the first portion B1, thereby preventing the cavity of the core from being blocked and minimizing the increase in resistance. Preferably, the current path ratio L2/L1 of the maximum current path may be 10.15 or less. More preferably, the current path ratio L2/L1 of the maximum current path may be 8.5 or less. More preferably, the current path ratio L2/L1 of the maximum current path may be 2 to 5. Each numerical value may be a value optimized to have a critical effect in consideration of the electrical, physical, and chemical property conditions of the current collector 141 and the active material layer 142, the resistance conditions of the secondary battery, the length $d_{B1}$ of the first portion B1 required not to block the cavity of the core, the length $d_{B3}$ of the second portion B3 required to secure an effective welding area while having the appropriate number of overlapping layers, and the length $d_{B2}$ of the third portion B2. As described above, in the present disclosure, the number and length of the electrode tab undefined sections are adjusted while limiting the current path ratio L2/L1 of the maximum current path to a predetermined range, and the rest are designed as the electrode tab defined sections.

FIG. 9 shows a maximum current path according to an embodiment (the connection positions of the first path and the second path are marked with a triangle, and an end point of the electrode is marked with a square). The maximum current path is included in the first portion B1, which is an electrode tab undefined section. The maximum current path corresponds to a path having the maximum length of a path through which current (electrons) flows when an electrochemical redox reaction occurs in the first portion B1.

The length L1 of the widthwise direction current path of the maximum current path is as short as the short side length of the current collector 141 or the electrode 140. Specifically, the length L1 of the widthwise direction current path is the minimum length from one end of long side of the uncoated portion 143 to the other end of long side of the current collector 141. Since the heights of the second portion B3 and the third portion B2 are the same, the length of the widthwise direction current path of the electrode 140 is the same as the short side length (width) of the electrode 140, and since the uncoated portion of the second portion B3 is not cut, it is the same as the short side length of the current collector 141.

In this embodiment, the current path ratio of the maximum current path is L2/L1 and L1 corresponds to the width of the electrode 140, so the current path ratio may be adjusted by using the length $d_{B1}$ of the first portion B1.

The upper limit of the current path ratio L2/L1 may be a value such that the DC resistance of the secondary battery including the electrode assembly 100 is 4 mΩ or less and the AC resistance is 3 mΩ or less. More preferably, the upper limit of the current path ratio L2/L1 may be a value such that the AC resistance of the secondary battery including the electrode assembly 100 is 2 mΩ or less.

The resistance of the secondary battery may vary depending on the electrical, physical, and chemical property conditions of the current collector 141 and the active material layer 142, for example, when the short side length of the current collector 141 is 60 mm to 85 mm, the long side length of the current collector 141 is 3 m to 5 m, and the thickness of the current collector 141 is 5 μm to 20 μm, the length $d_{B1}$ of the first portion B1 may be 660 mm or less. In this case, the maximum value of the length $d_{B1}$ of the first portion B1 is 660 mm, and in consideration of the long side length of the current collector 141, the maximum value of the length $d_{B1}$ of the first portion B1 may be 13.2% to 22% of the long side length of the current collector 141. When the length or thickness of the long side of the current collector 141 is changed, the maximum value of the length $d_{B1}$ of the first portion B1 may be 4% to 23%. That is, the maximum value of the length of a portion that is not defined as an electrode tab in the electrode 140, that is, the electrode tab undefined section is 660 mm, and in consideration of the point that the long side length of the current collector 141 becomes the long side length of the electrode 140 as it is, it may be seen as 4% to 23% of the length of the electrode 140. In addition, when the short side length of the current collector 141 becomes the short side length of the electrode 140 as it is, it may be seen that 660 mm, which is the maximum value of the length of a portion not defined as an electrode tab in the electrode 140, is 9.4 times to 11 times the width of the electrode 140. When the length or thickness of short side of the current collector 141 is changed, the maximum value of the length $d_{B1}$ of the first portion B1 may be 2.5 times to 11 times.

In addition, when the length $d_{B1}$ of the first portion B1 is 660 mm and the long side length of the current collector 141 is 4 mm, the current path ratio L2/L1 may be 10.15. The current path ratio L2/L1 may be further reduced by making the length $d_{B1}$ of the first portion B1 smaller than 660 mm.

The upper limit of the current path ratio L2/L1 may be such that a minimum resistance requirement of the secondary battery is satisfied. That is, the secondary battery resistance may be determined to be smaller than the maximum value of the secondary battery resistance. The maximum value of DC resistance of 4 mΩ and the maximum value of AC resistance of 3 mΩ, which are applied in this embodiment, may vary depending on the specification of the secondary battery.

The inventors of the present disclosure confirmed through simulation that the resistance of the secondary battery increases as the length of the electrode tab undefined section increases as in the first portion B1. However, it was confirmed that the resistance no longer increases and converges when the length of the electrode tab undefined section is increased to a certain level or higher. By examining the correlation between the length of the electrode tab undefined section and the resistance of the secondary battery, it was possible to determine the length of the electrode tab undefined section that satisfies the minimum resistance requirement of the secondary battery.

Figure 10:
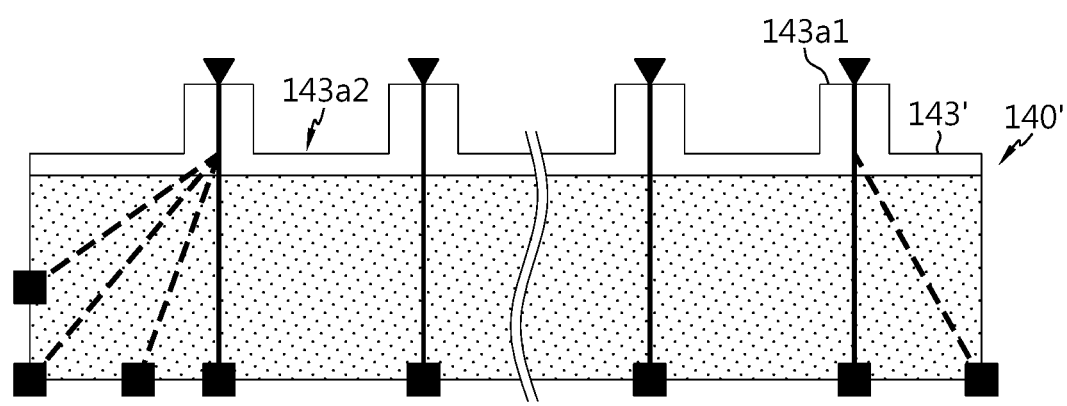
FIG. 10 is a schematic diagram of an electrode including an electrode tab undefined section used for simulation.
Figure 11:
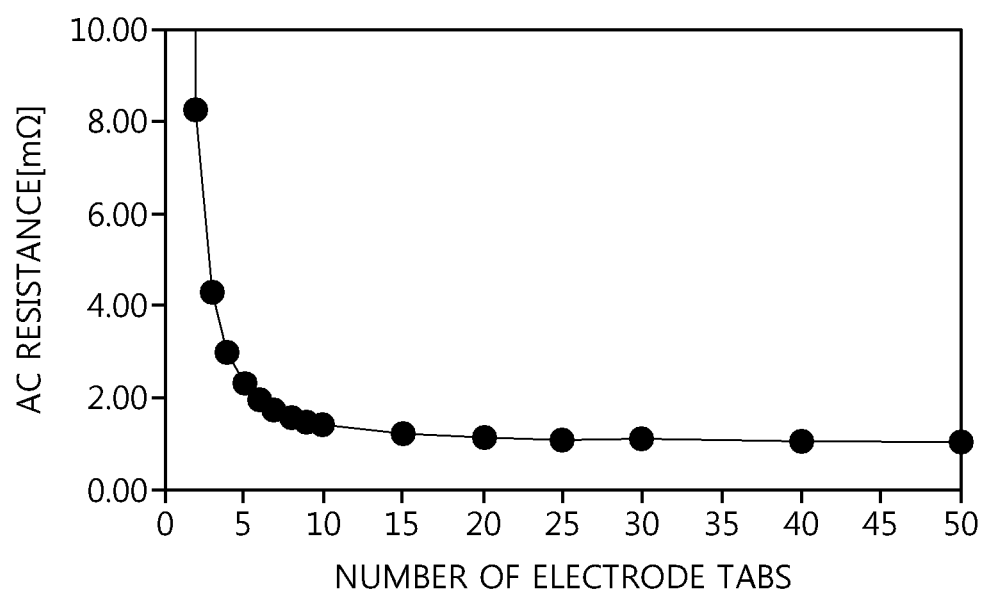
FIG. 11 is a graph of resistance according to the number of welding points confirmed through simulation.

FIG. 10 is a schematic diagram of an electrode including an electrode tab undefined section used for simulation, and FIG. 11 is a graph of resistance according to the number of welding points confirmed through simulation.

FIG. 10 illustrates a case in which the electrode tabs 143a1 are present at equal intervals, the connection positions of the first path and the second path are marked with a triangle, and an end point of the electrode is marked with a square. For example, if the number of electrode tabs 143a1 is 6, the number of electrode tab undefined sections 143a2 is 7, and if the number of electrode tabs 143a1 is 7, the number of electrode tab undefined sections 143a2 is 8. As in the case of the above, when the number of electrode tabs 143a1 is Q, the equal interval condition in which the number of electrode tab undefined sections 143a2 is Q+1 is assumed. Since each electrode tab 143a1 is welded to the current collector plate, the number of welding points is the same as the number of electrode tabs 143a1.

In the simulation, it was assumed that the short side length of the current collector 141' included in the electrode 140' is 60 mm to 85 mm, the long side length of the current collector 141' is 3 m to 5 m, and the thickness of the current collector 141' is 5 μm to 20 μm.

The AC resistance of the secondary battery including an electrode assembly in which the electrode 140' includes a positive electrode and a negative electrode was simulated while increasing the number of electrode tabs 143a1 from 1 to 50. Referring to FIG. 11 corresponding to the result, it can be seen that the resistance converges as the number of electrode tabs 143a1 increases, and the number of electrode tabs 143a1 in which the AC resistance of the secondary battery is 2 mΩ or less under the simulation condition is six.

The number of electrode tabs 143a1 may be converted into the length of the electrode tab undefined section 143a2. When the width of the electrode tab 143a1 is 10 mm, when there are six electrode tabs 143a1 present at equal intervals in the current collector 141' having a long side length of 3 m to 5 m, the length of one electrode tab undefined section 143a2 is 660 mm. When there are seven electrode tabs 143a1, the length of one electrode tab undefined section 143a2 is 564 mm. When there are seven electrode tabs 143a1, the AC resistance of the secondary battery was simulated as 1.7 mΩ.

Through this simulation, it was concluded that the length of the electrode tab undefined section 143a2 is preferably set to 660 mm or less. Considering that the short side length of the current collector 141' is 60 mm to 85 mm, the ratio of the length of the electrode tab undefined section 143a2 corresponding to the lengthwise direction current path to the short side length of the current collector 141' corresponding to the widthwise direction current path is 11 or less. Therefore, when the electrode tab undefined section is included, it was concluded that the low resistance condition in which the AC resistance of the secondary battery is 2 mΩ or less can be satisfied as long as the current path ratio L2/L1 is set to 11 or less.

Based on the simulation results, it is preferable that the length $d_{B1}$ of the first portion B1 is set to 660 mm or less, as proposed in this embodiment. In other words, by managing the length of the electrode tab undefined section 143a2 not to exceed 660 mm, it is possible that the cell resistance may satisfy the minimum resistance requirement of the secondary battery.

When the length $d_{B1}$ of the first portion B1 increases, the current path ratio L2/L1 increases, and when the length $d_{B1}$ of the first portion B1 decreases, the current path ratio L2/L1 decreases. The length $d_{B1}$ of the first portion B1 may be designed under the condition satisfying the current path ratio (L2/L1) by applying a condition that the cavity provided in the core of the electrode assembly 100 is not blocked when the uncoated portion of the third portion B2 is bent toward the core, That is, the length $d_{B1}$ of the first portion B1 may be determined according to a necessary condition in 660 mm or less, and when the length $d_{B1}$ of the first portion B1 is 660 mm and the short side length of the current collector 141 is 65 mm, the current path ratio L2/L1 may be 10.15, whereby the current path ratio L2/L1 may satisfy the range of 10.15 or less according to the length $d_{B1}$ of the first portion B1. In other words, when the electrode 140 including the first portion B1 is designed, the current path ratio increases compared to the case in which all uncoated portions such as the third portion B2 are included without the first portion B1, but the length $d_{B1}$ of the first portion B1 may be increased until the current path ratio L2/L1 becomes 10.15 or less as a guide satisfying the minimum resistance, whereby it is possible not to block the cavity provided in the core of the electrode assembly 100 when the uncoated portion of the third portion B2 is bent toward the core.

Figure 12:
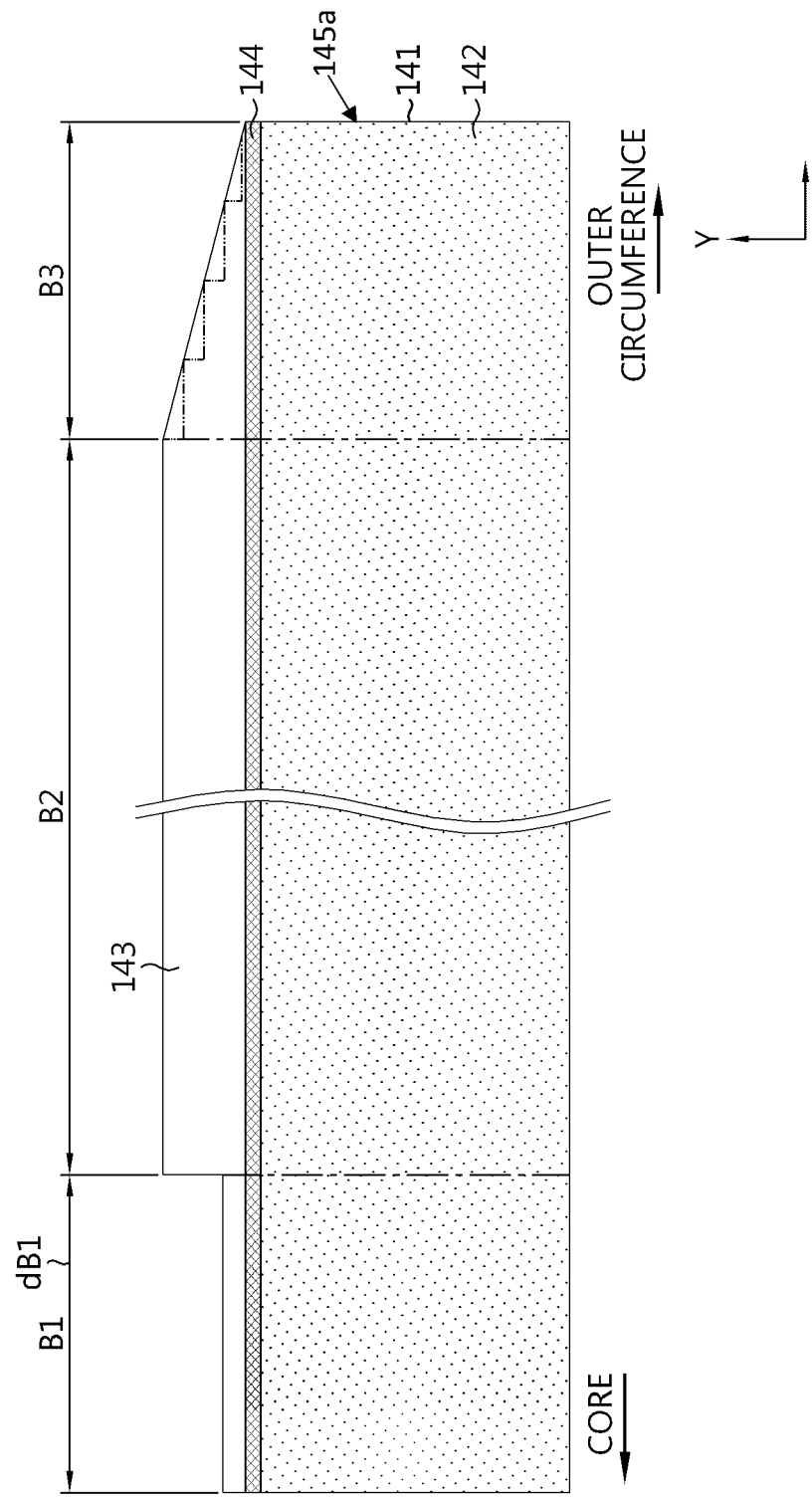
FIG. 12 is a plan view illustrating an electrode structure of a second embodiment that may be included in an electrode assembly according to another embodiment of the present disclosure.

FIG. 12 is a plan view illustrating an electrode structure of a second embodiment that may be included in an electrode assembly according to another embodiment of the present disclosure.

When compared with the first embodiment, the electrode 145a shown in FIG. 12 is different in that the height of the second portion B3 is gradually decreased toward the outer periphery, and the remaining configurations are substantially the same. In one modified example, the second portion B3 may be deformed into a step shape (refer to dotted line) in which the height is gradually decreased. In these, the second portion B3 has a smaller height than the third portion B2. By setting the second portion B3 to a height smaller than that of the third portion B2, the deformation of the third portion B2 may be further suppressed when bending the second portion B3 over the bent third portion B2.

Figure 13:
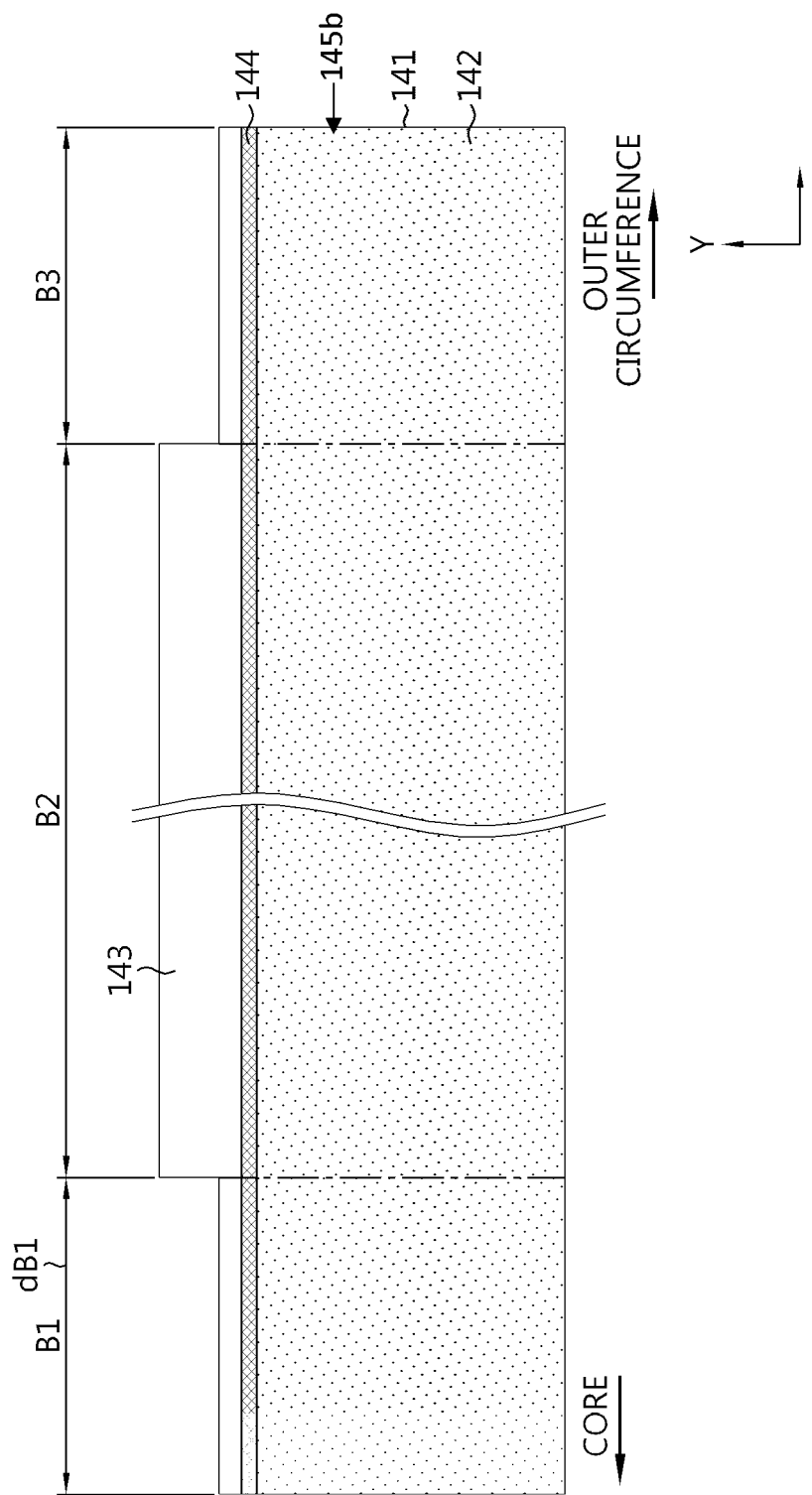
FIG. 13 is a plan view illustrating an electrode structure of a third embodiment that may be included in an electrode assembly according to another embodiment of the present disclosure.

FIG. 13 is a plan view illustrating an electrode structure of a third embodiment that may be included in an electrode assembly according to another embodiment of the present disclosure.

In the electrode 145b according to the third embodiment, the heights of the first portion B1 and the second portion B3 are 0 or more, but are relatively smaller than that of the third portion B2. In addition, the heights of the first portion B1 and the second portion B3 are the same. Like the first portion B1, the second portion B3 corresponds to the electrode tab undefined section, so that the uncoated portion of the second portion B3 is not defined as an electrode tab, and the third portion B2 is defined as an electrode tab. In the winding direction, the length of the second portion B3 is shorter than the length $d_{B1}$ of the first portion B1. The second portion B3 may be an uncoated portion of the electrode region including the outermost winding turn. The third portion B2 may be defined as an electrode tab in a bent state along the radial direction of the electrode assembly 100. The first portion B1 and the second portion B3 are not bent along the radial direction. According to this embodiment, when the electrode assembly is inserted into the battery housing and the outer circumferential surface of the battery housing is press-fitted to form a beading portion, it is possible to prevent the occurrence of an internal short circuit while the beading portion and the second portion B3 are in contact with each other in the process where the beading portion is pressed near the second portion B3.

Figure 14:
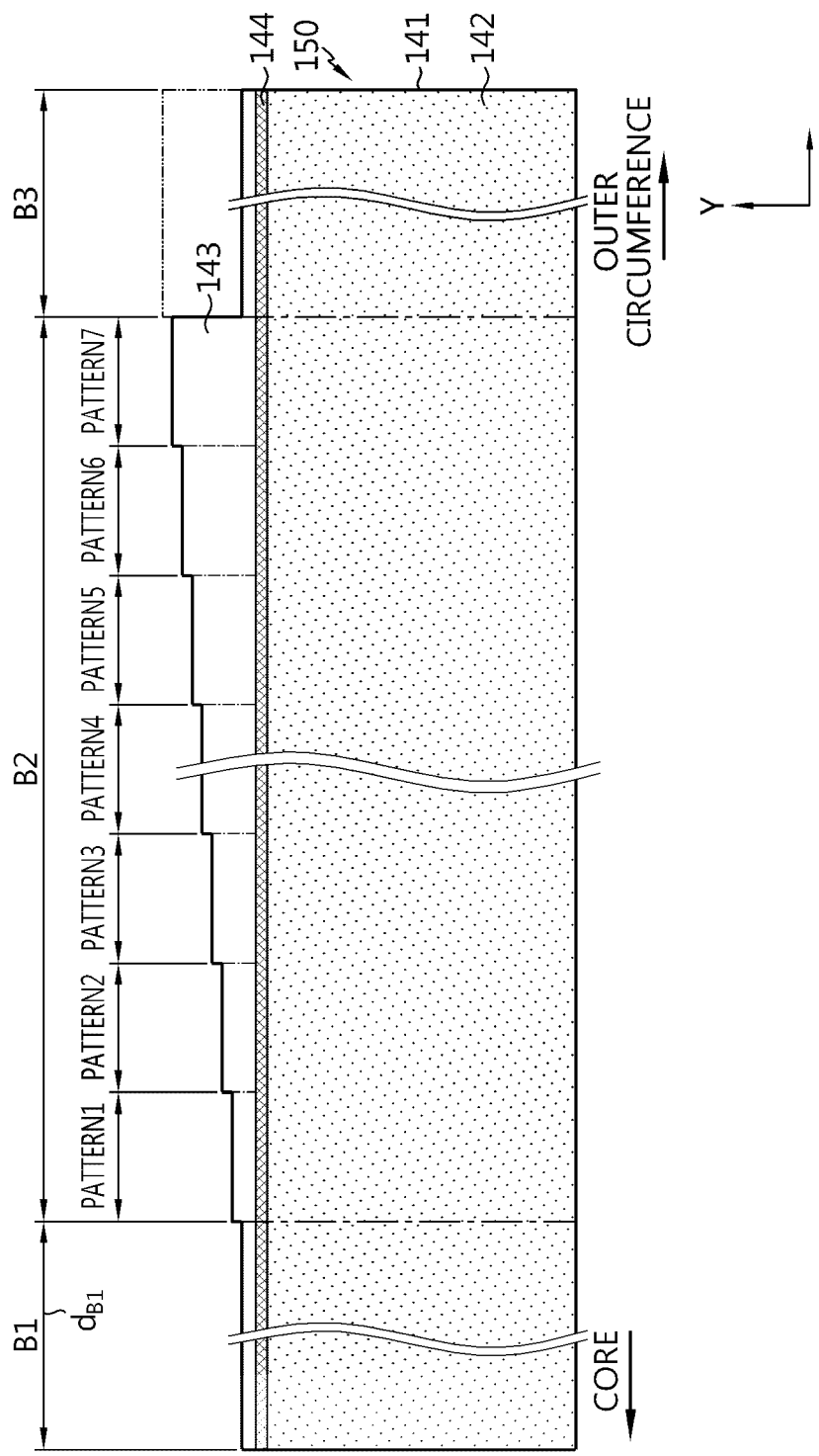
FIG. 14 is a plan view illustrating an electrode structure of a fourth embodiment that may be included in an electrode assembly according to another embodiment of the present disclosure.

FIG. 14 is a plan view illustrating an electrode structure of a fourth embodiment that may be included in an electrode assembly according to another embodiment of the present disclosure.

In the electrode 150 according to the fourth embodiment, the heights of the first portion B1 and the second portion B3 are 0 or more, but are relatively smaller than that of the third portion B2. In addition, the heights of the first portion B1 and the second portion B3 may be the same or different from each other.

Preferably, the height of the third portion B2 may have a step shape that gradually increases from the core side to the outer circumferential side.

Patterns 1 to 7 are obtained by dividing the third portion B2 based on the position where the height of the uncoated portion 143 changes. Preferably, the number of patterns and the height (length in the Y-axis direction) and width (length in the X-axis direction) of each pattern may be adjusted to maximize the stress distribution during the bending process of the uncoated portion 143. The stress distribution is to prevent the uncoated portion 143 from being torn when the uncoated portion 143 is bent toward the core of the electrode assembly.

The length dui of the first portion B1 is designed by applying a condition that does not block the cavity provided in the core when the patterns of the third portion B2 are bent toward the core, but in one example, the length dui of the first portion B1 may increase in proportion to the bending length of the pattern 1. The bending length corresponds to the height of the pattern based on the bending point of the pattern.

Preferably, the length dui of the first portion B1 may be set such that the radial width of the winding turns formed by the first portion B1 is equal to or greater than the bending length of the pattern 1. In a modified example, the length $d_{B1}$ of the first portion B1 may be set such that a value obtained by subtracting the radial width of the winding turns formed by the first portion B1 from the bending length of the pattern 1 is less than 0 or 10% of the core radius or less.

In a specific example, when the electrode 150 is used to manufacture an electrode assembly of a cylindrical secondary battery having a form factor of 4680, the length $d_{B1}$ of the first portion B1 may be set to 180 mm to 350 mm depending on the diameter of the core and the bending length of the pattern 1. In this case, the current path ratio L2/L1 may be 2.57 to 5.83. If the length $d_{B1}$ of the first portion B1 is further adjusted, the current path ratio L2/L1 may be 2 to 5.

In one embodiment, the width of each pattern may be designed to constitute one or at least two winding turns of the electrode assembly.

In one modification, the height of the third portion B2 may have a step shape that increases and then decreases from the core side to the outer circumferential side.

In another modification, the second portion B3 may be deformed to have the same structure as that of the second embodiment.

In still another modification, the pattern structure applied to the third portion B2 may extend to the second portion B3 (refer to dotted line).

Figure 15:
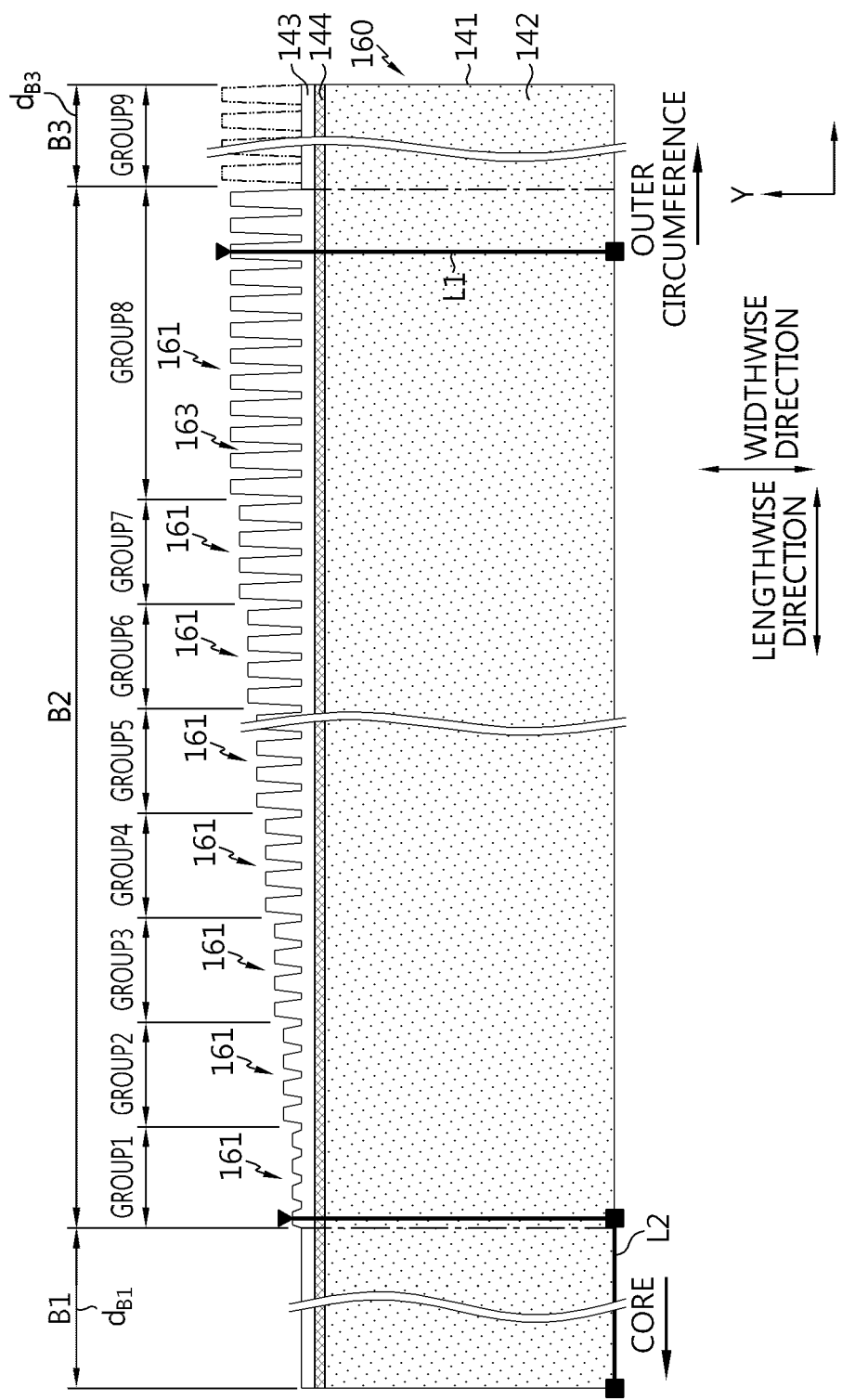
FIG. 15 is a plan view illustrating an electrode structure of a fifth embodiment that may be included in an electrode assembly according to another embodiment of the present disclosure.

FIG. 15 is a plan view illustrating an electrode structure of a fifth embodiment that may be included in an electrode assembly according to another embodiment of the present disclosure.

Preferably, in the electrode 160, the third portion B2 may include a plurality of segment pieces 161. In other words, at least a partial region of the third portion B2 may be divided into a plurality of independently bendable segment pieces 161.

The height of the plurality of segment pieces 161 may be increased step by step from the core side to the outer circumferential side. The plurality of segment pieces 161 have a geometrical figure shape in which the width decreases from the bottom to the top. Preferably, the geometrical figure is trapezoid. As will be described later, the shape of the geometrical figure may be modified in various ways.

The segment pieces 161 may be notched with a laser. The segment pieces 161 may be formed by a known metal foil cutting process such as ultrasonic cutting or punching. The segment pieces 161 are bent and overlapped in the winding axis direction. Since the segment pieces 161 are independently bendable, deformation of the uncoated portion 143 may be further suppressed when the segment pieces 161 are bent, which is preferable. In addition, there is an advantage in that it is possible to control so that an empty space (gap) does not exist while bending the segment pieces 161 and overlapping them in multiple layers. By having the segment pieces 161 structure, it is possible to prevent the uncoated portion 143 from being torn when the uncoated portion 143 is bent.

The first portion B1 starts from the core short side of the current collector 141, and the height of the first portion B1 is constant along the winding direction and is not bent along the radial direction. Only the segment pieces 161 of the third portion B2 are defined as an electrode tab. Therefore, in the electrode 160, in order that the current path ratio L2/L1, which is a ratio of the length L2 of the lengthwise direction current path along the long side of the current collector 141 to the length L1 of the widthwise direction current path along the short side of the current collector 141, is set to 11 or less, the length from the core end of the electrode 160 to the lower end of the segment pieces 161 first located in the lengthwise direction, here, which is a length equal to the length $d_{B1}$ of the first portion B1 may be adjusted.

Preferably, the thickness of the current collector 141 may be 5 μm to 25 μm, the width (refer to D in FIG. 16) of the segment pieces 161 may be 3 mm to 10 mm, and the height (refer to H in FIG. 16) of the segment pieces 161 may be 10 mm or less.

In one aspect, the plurality of segment pieces 161 may form a plurality of segment pieces group from the core side to the outer circumferential side. At least one of a width, a height, and a spacing pitch of segment pieces belonging to the same segment pieces group may be substantially the same. Preferably, the width, height, and spacing pitch of segment pieces belonging to the same segment pieces group may be equal to each other.

Dimensions (width, height, spacing pitch) of the segment pieces 161 may be adjusted in consideration of resistance, ease of processing (e.g., whether laser notching can be applied without cracks), ease of bending, degree of overlapping between several segment pieces 161, and the like.

Preferably, the width and height of segment pieces belonging to the same segment pieces group may be substantially the same.

Figure 16:
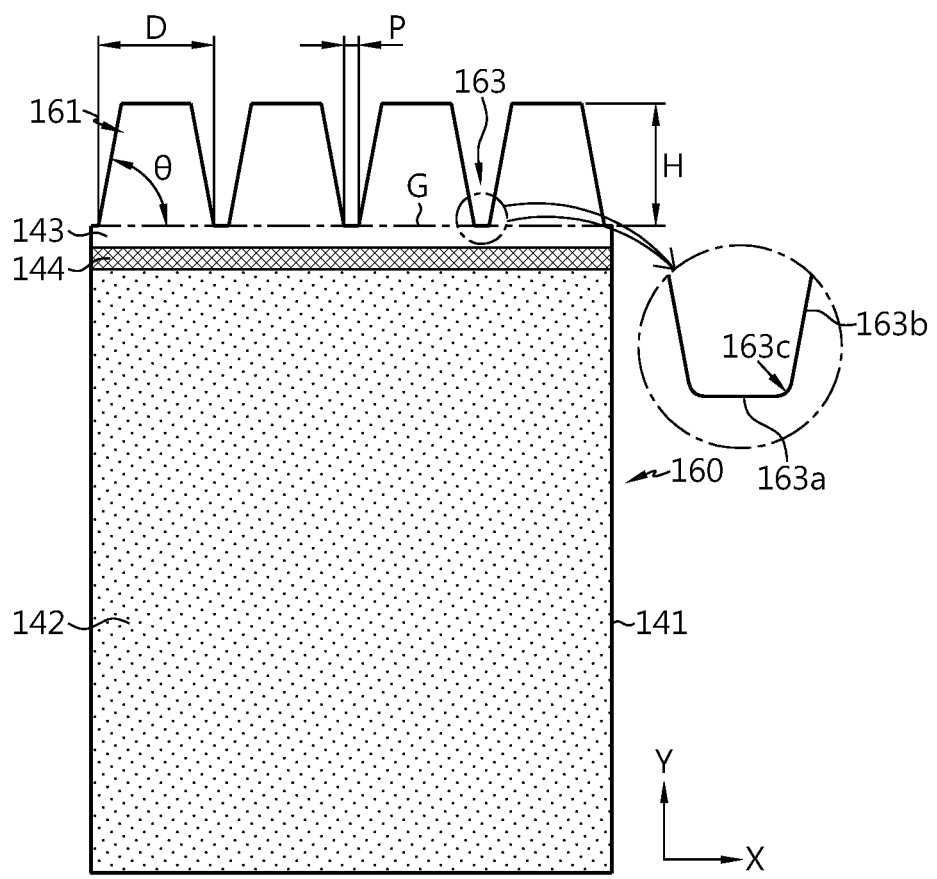
FIG. 16 is a view showing definitions of a width, a height, and a spacing pitch of segment pieces according to an embodiment of the present disclosure.

FIG. 16 shows definitions of a width D, a height H, and a spacing pitch P of the trapezoidal segment pieces 161.

Referring to FIG. 16, the width D, the height H, and the spacing pitch P of the segment pieces 161 are designed to prevent abnormal deformation of the uncoated portion 143 while sufficiently increasing the number of overlapping layers of the uncoated portion 143 in order to prevent the uncoated portion 143 near the bending point from being torn and ensure sufficient welding strength during the bending processing of the uncoated portion 143.

The bending of the segment pieces 161 is performed on the line G passing through the lower end of the cutting groove 163 or the upper portion thereof. The cutting groove 163 enables smooth and easy bending of the segment pieces 161 in the radial direction of the electrode assembly.

The width D of the segment pieces 161 is defined as a length between two points where two straight lines extending from both sides 163b of the segment pieces 161 and a straight line extending from the bottom 163a of the cutting groove 163 meet. The height H of the segment pieces 161 is defined as the shortest distance between the uppermost side of the segment pieces 161 and a straight line extending from the bottom 163a of the cutting groove 163. The spacing pitch P of the segment pieces 161 is defined as a length between two points where a straight line extending from the bottom 163a of the cutting groove 163 and two straight lines extending from two sides 163b connected to the bottom 163a meet. When the side 163b and/or the bottom 163a are curved, the straight line may be replaced with a tangent line extending from the side 163b and/or the bottom 163a at the intersection where the side 163b and the bottom 163a meet.

Preferably, the width D of the segment pieces 161 is 1 mm or more. If D is less than 1 mm, a region or an empty space (gap) in which the segment pieces 161 does not overlap enough to ensure welding strength when the segment pieces 161 is bent toward the core may occur.

Preferably, the width D of the segment pieces 161 may be adaptively adjusted according to the radius of the winding turn where the segment pieces 161 are positioned so that the overlapping of the segment pieces 161 are well made in the radial direction when the segment pieces 161 are bent toward the core.

The height H of the segment pieces 161 may be 2 mm or more. If the height H of the segment pieces 161 is less than 2 mm, a region or an empty space (gap) in which the segment pieces 161 do not overlap enough to ensure welding strength when the segment pieces 161 are bent toward the core may occur.

The height H of the segment pieces 161 may be determined by applying a condition that does not block the cavity of the core when the segment pieces 161 are bent toward the core. Preferably, the height H of the segment pieces 161 may be adjusted so that 90% or more of the diameter of the core may be opened to the outside.

Preferably, the height H of the segment pieces 161 may increase from the core to the outer periphery side depending on the radius of the winding turn at which the segment pieces 161 are located and the radius of the core.

In one embodiment, the height H of the segment pieces 161 may be increased in stages over N steps from h1 to $h_N$ as the radius of the winding turn increases.

In one example, the total winding turn radius of the electrode 160 is 22 mm, and the height of the segment pieces 161 starts from 3 mm. Whenever the radius of the winding turn including the segment pieces 161 is increased by 1 mm, the height of the segment pieces 161 is sequentially increased to 3 mm, 4 mm, 5 mm, 6 mm, and the height may be maintained substantially the same as 6 mm in the remaining winding turns. That is, among the radii of the entire winding turns, the radial width of the height variable section of the segment pieces 161 is 3 mm, and the remaining radial section corresponds to the height uniform section.

For another example, when the core radius $r_c$ is 3 m, the starting radii $r_1$, $r_2$, $r_3$, and $r_4$ of the winding turn including the segment pieces 161 having heights of 3 mm ($h_1$), 4 mm ($h_2$), 5 mm ($h_3$) and 6 mm ($h_4$) may be 6 mm, 7 mm, 8 mm, and 9 mm, respectively, and the height of the segment pieces 161 may be maintained at 6 mm from the radius 9 mm to the last winding turn. In addition, the segment pieces 161 may not be included in the winding turn having a radius smaller than 6 mm $r_1$. In this example, since the segment pieces 161 with a height of 3 mm $h_1$ closest to the core C is located from the winding turn having a radius of 6 mm, even if the segment pieces 161 is bent toward the core C, it covers only a radial section of 3 mm to 6 mm, and thus does not substantially block the cavity of the core.

In the height variable section of the segment pieces 161, the height H of the segment pieces 161 may be 10 mm or less. For electrical insulation, an end of the separator 60 may further extend outwardly from an end of the electrode 160 to a length corresponding to the insulation gap. In addition, when the electrode 160 and the separator 60 are wound, a section corresponding to the minimum meandering margin of the separator 60 should be allocated to the uncoated portion 143 in consideration of the fact that the end of the separator 60 causes meandering. Also, in order to cut the segment pieces 161, a minimum cutting scrap margin should be allocated to the end of the current collector foil.

Preferably, the insulation gap may be 0.2 mm to 6 mm when the electrode 160 is a positive electrode. Also, the insulation gap may be 0.1 mm to 2 mm when the electrode 160 is a negative electrode. Preferably, the minimum meandering margin of the separator 60 may be 0 to 1 mm. Preferably, the cutting scrap margin may be 1.5 mm to 8 mm. The cutting scrap margin may not be allocated according to the process of forming the segment pieces 161. For example, the cutting groove 163 may be formed so that the upper side of the segment pieces 161 and the upper side of the current collector foil coincide with each other, and in this case, the cutting scrap margin may be zero.

Considering the above conditions, the maximum height of the segment pieces 161 in the height variable section of the segment pieces 161 may be set to 10 mm. Therefore, the height of the segment pieces 161 in the height variable section of the segment pieces 161 may be increased in stages or gradually along the radial direction of the electrode assembly in the section of 2 mm to 10 mm.

Referring to FIG. 16, the spacing pitch P of the segment pieces 161 may be adjusted in the range of 0.05 mm to 1 mm. If the spacing pitch P is less than 0.05 mm, cracks may occur in the uncoated portion 143 near the lower end of the cutting groove 163 due to stress when the electrode 160 is driven in a winding process or the like. On the other hand, if the spacing pitch P exceeds 1 mm, a region or an empty space (gap) in which the segment pieces 161 do not overlap each other enough to ensure welding strength when the segment pieces 161 are bent may occur.

Meanwhile, when the current collector 141 of the electrode 160 is made of aluminum, it is more preferable that the spacing pitch P is set to 0.5 mm or more. When the spacing pitch P is 0.5 mm or more, even if the electrode 160 is driven at a speed of 100 mm/sec or more under a tension of 300 gf or more in a winding process, or the like, it is possible to prevent cracks from occurring in the lower portion of the cutting groove 163.

As shown in FIG. 16, the cutting groove 163 is interposed between two segment pieces 161 adjacent to each other in the winding direction. The cutting groove 163 corresponds to a space created when the uncoated portion 143 is removed. Preferably, the corner portions of both ends of the lower portion of the cutting groove 163 have a round shape. That is, the cutting groove 163 includes a substantially flat bottom 163a and a round portion 163c. The round portion 163c connects the bottom 163a thereof and the side portion 163b of the segment pieces 161. In a modified example, the bottom 163a of the cutting groove 163 may be replaced with an arc shape. In this case, the side portions 163b of the segment piece 161 may be smoothly connected by the arc shape of the bottom 163a.

The lower inner angle θ of the plurality of segment pieces 161 may increase from the core to the outer circumferential side. In an example, the lower inner angle θ of the plurality of segment pieces 161 may increase gradually or in stages from the core to the outer circumferential side. The lower inner angle θ is an angle between a straight line extending from the bottom 163a of the cutting groove 163 and a straight line extending from the side portion 163b of the segment pieces 161. When the segment pieces 161 is symmetrical, the left and right lower inner angles θ are substantially the same.

As the radius of the electrode assembly increases, the radius of curvature increases. If the lower inner angle θ of the segment pieces 161 increases together according to the increase of the radius of the electrode assembly, stress generated in the radial and circumferential directions when the segment pieces 161 is bent may be relieved. In addition, if the lower inner angle θ increases, the area overlapping with the inner segment pieces 161 and the number of overlapping layers also increase when the segment pieces 161 are bent, thereby ensuring uniform welding strength in the radial and circumferential directions and forming a flat bent surface region.

Preferably, the lower inner angle θ may be determined by the radius of the winding turn where the segment pieces 161 are positioned and the width D of the segment pieces 161. In one example, when the electrode 160 forms a wound structure having a diameter of 22 mm and a radius of the core of 4 mm, the lower inner angle of the segment pieces 161 may gradually or in stages increase in a range of 60 degrees to 85 degrees in the height variable section.

Referring to FIG. 15 again, the length $d_{B1}$ of the first portion B1 is designed such that the core is opened to the outside by 90% or more based on its diameter when the segment pieces 161 of the third portion B2 are bent toward the core. The length $d_{B1}$ of the first portion B1 may increase in proportion to the bending length of the segment pieces 161 of the group 1. The bending length corresponds to the length from the bending point to the upper end of the segment pieces 161.

The bending point of the segment pieces 161 may be set at a line passing through the lower end of the cutting groove 163 or at a point spaced apart from the line by a predetermined distance upward. When the segment pieces 161 are bent toward the core at a point spaced apart from the lower end of the cutting groove 163 by a predetermined distance, overlapping of the segment pieces in the radial direction is better performed. When the segment pieces 161 are bent, the segment pieces on the outside press the segment pieces on the inside based on the center of the core. At this time, if the bending point is spaced apart from the lower end of the cutting groove 163 by a predetermined distance, the inner segment pieces are pressed in the winding axis direction by the outer segment pieces, and thus overlapping of the segment pieces is better performed. The separation distance of the bending point may be preferably 1 mm or less. Since the minimum height of the segment pieces is 2 mm, the ratio of the separation distance of the bending point to the minimum height may be 50% or less.

In an embodiment, the width of each segment pieces group may be designed to constitute the same winding turn of the electrode assembly. Here, the winding turn may be counted based on the end of the first portion B1 when the electrode 160 is wound.

In another modification, the width of each segment pieces group may be designed to constitute at least one winding turn of the electrode assembly.

Groups 1 to 8 are only examples of the segment pieces group included in the third portion B2. The number of groups, the number of segment pieces 161 included in each group, and the width of the group may be preferably adjusted so that the segment pieces 161 are overlapped in multiple layers so as to distribute stress to the maximum during the bending process of the uncoated portion 143 and ensure sufficient welding strength with the current collector.

In the third portion B2, a section (groups 1 to 7) in which the height of the segment pieces 161 is increased step by step based on the winding direction of the electrode 160 may be defined as a height variable section of the segment pieces, and the last segment pieces group (group 8) may be defined as a height uniform section in which the height of the segment pieces is maintained uniformly.

That is, in the third portion B2, when the height of the segment pieces 161 is increased in stages from $h_1$ to $h_N$, a section in which the segment pieces 161 having a height of $h_1$ to $h_{N-1}$ (N is a height index, and a natural number of 2 or more) are disposed corresponds to the height variable section, and a section in which the segment pieces 161 having a height of $h_N$ are disposed corresponds to the height uniform section.

The width of group 1 may be 35-40% of the width of the first portion B1. The width of group 2 may be 130-150% of the width of group 1. The width of group 3 may be 120-135% of the width of group 2. The width of group 4 may be 85-90% of the width of group 3. The width of group 5 may be 120-130% of the width of group 4. The width of group 6 may be 100-120% of the width of group 5. The width of group 7 may be 90-120% of the width of group 6. The width of group 8 may be 115-130% of the width of group 7. The length $d_{B3}$ of the second portion B3 may be 180 mm to 350 mm, similar to the width of the first portion B1.

The reason why the widths of groups 1 to 8 do not show a constant increase or decrease pattern is that the width of the segment pieces gradually increases from group 1 to group 8, but the number of the segment pieces included in the group is limited to an integer number, and the thickness of the electrode has a slight deviation in the winding direction. Therefore, the number of segment pieces may be reduced in a particular segment pieces group. Thus, the width of the group may exhibit an irregular change pattern as in the above example while going from the core side to the outer circumferential side.

Through the above embodiments, the welding strength of the current collector plate may be improved by sufficiently increasing the number of overlapping layers of the segment pieces 161. Since the number of stacks of the segment pieces 161 in the region used as the welding target region is sufficiently increased by optimizing the dimensions (width, height, and spacing pitch) of the segment pieces 161, the physical properties of the region where the current collector plate is welded may be improved.

A representative current path is also shown in FIG. 15. The connection position of the first path and the second path is marked with a triangle, and the end point of the electrode is marked with a square. The connection position of the first path and the second path may be any position of the second portion B3 and the third portion B2, but one place in group 1 and one place in group 8 are indicated in the drawings for convenience of illustration. The electrode end point may also be any position, but one place to show the length L1 of the widthwise direction current path and one place located on the maximum current path are indicated.

Here again, L2, which determines an upper limit of the current path ratio L2/L1, is the distance from the third portion B2 defined as an electrode tab to the electrode end point, and corresponds to the length $d_{B1}$ of the first portion B1. By adjusting the length $d_{B1}$ of the first portion B1, the current path ratio L2/L1 may be adjusted. This current path ratio L2/L1 satisfies the minimum resistance requirement of the secondary battery even though the resistance is slightly increased, and thus it may be lowered to 11 or less, 10.15 or less, 8.5 or less, or in the range of 2 to 5 when further considering the overlapping degree of the segment pieces 161 and securement of welding strength, and the like. For example, if it is necessary to increase the overlapping degree of the segment pieces 161 by making the length $d_{B2}$ of the third portion B2 sufficiently long to form the segment pieces 161 larger or more, the current path ratio L2/L1 may be lower to 8.5 or less, or in the range of 2 to 5. The present disclosure is meaningful in that the upper limit of the current path ratio L2/L1 is set from the viewpoint of designing a low-resistance cell that minimizes the current path. When the current path ratio L2/L1 exceeds the upper limit, the minimum resistance requirement of the secondary battery may not be satisfied.

In the electrode 160 having this structure, the third portion B2 may be bent to become a welding region. In the winding direction, the length $d_{B2}$ of the third portion B2 may be longer than the length $d_{B1}$ of the first portion B1. The length $d_{B2}$ of the third portion B2 may be longer than the length $d_{B3}$ of the second portion B3. By increasing the length $d_{B2}$ of the third portion B2, the bent portion may be overlapped in multiple layers during bending. A sufficient welding region may be ensured by increasing the length $d_{B2}$ of the third portion B2.

Figure 17:
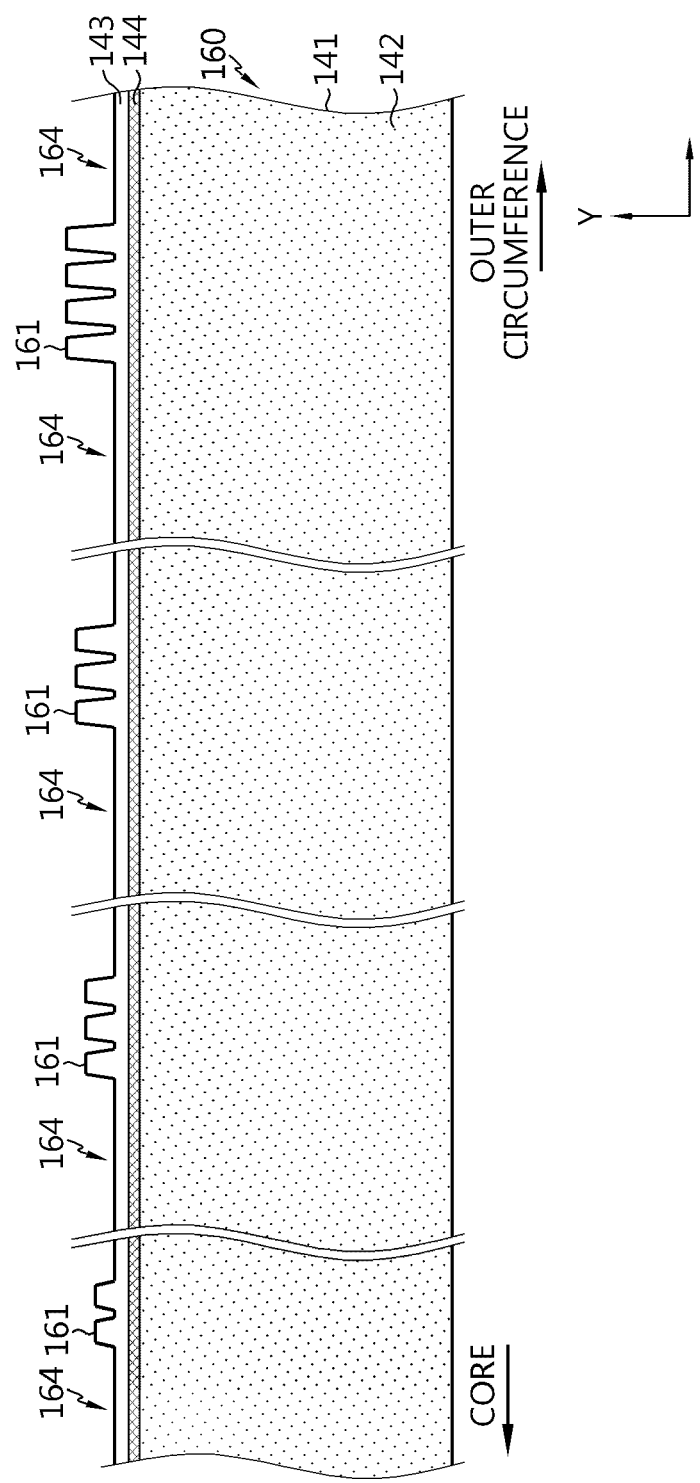
FIG. 17 is a plan view illustrating a deformed structure of an electrode according to a fifth embodiment of the present disclosure.

According to still another modification, when the uncoated portion 143 of the electrode 160 has a segment pieces structure, the electrode 160 may include a segment pieces omission section 164 in which some of the plurality of segment pieces are regularly or irregularly omitted as shown in FIG. 17. FIG. 17 is a plan view illustrating a deformed structure of an electrode according to a fifth embodiment of the present disclosure.

Referring to FIG. 17, preferably, the segment pieces omission section 164 may be in plural. In one example, the width of the segment pieces omission section 164 may be constant from the core to the outer circumferential side. In another example, the width of the segment pieces omission section 164 may increase or decrease regularly or irregularly from the core to the outer circumferential side. Preferably, the height of the uncoated portion present in the segment pieces omission section 164 may correspond to the height of the first portion B1 and/or the second portion B3.

The number of segment pieces 161 present between the segment pieces omission sections 164 may be at least one. As shown in FIG. 17, the electrode 160 may include an uncoated portion in which the number of segment pieces 161 present between the segment pieces omission sections 164 increases from the core side toward the outer circumferential side.

Even when the segment pieces omission section 164 is placed in the middle of the uncoated portion 143 as described above, the segment pieces omission section 164 corresponds to the electrode tab undefined section, and thus the length of the segment pieces omission section 164 may be determined in consideration of a condition that the current path ratio L2/L1 in the electrode tab undefined section should be 11 or less.

Figure 18:
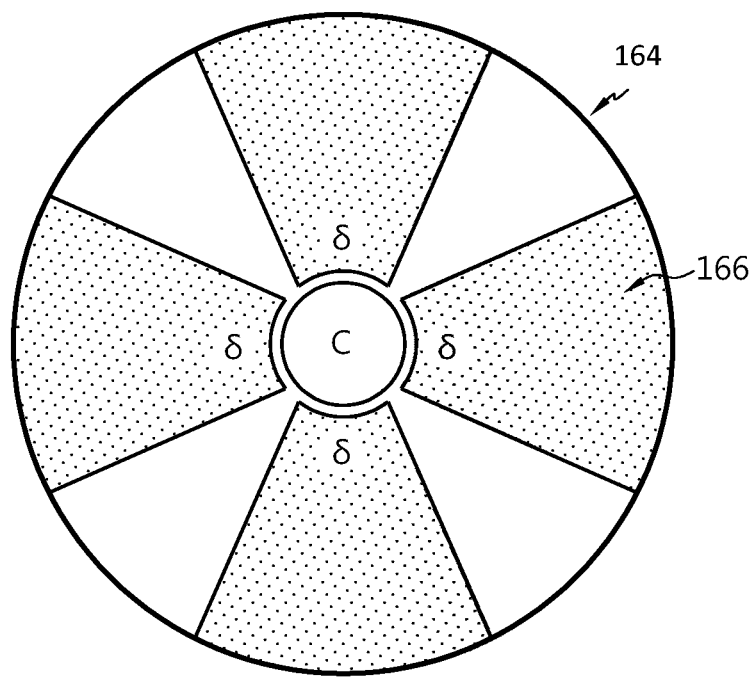
FIG. 18 is a top plan view illustrating an independent region in which a plurality of segment pieces may be positioned when an electrode according to a modified example of the present disclosure is wound into an electrode assembly.

FIG. 18 is a top plan view illustrating an independent region in which a plurality of segment pieces may be positioned when an electrode according to a modified example of the present disclosure is wound into an electrode assembly.

Preferably, the width of the segment pieces omission section 164 may be set so that the segment pieces located at each winding turn may be positioned in a preset independent region 166 based on the core C of the electrode assembly 200 when the electrode 160 is wound as shown in FIG. 18.

That is, the plurality of segment pieces 161 may be positioned in a plurality of independent regions 166 based on the core C when the electrode assembly 200 is viewed from the winding axis direction. The number of independent regions 166 may be changed to 2, 3, 4, 5, or the like.

Preferably, the independent region 166 may have a sectoral shape. In this case, the angles between the independent regions 166 may be substantially the same. In addition, the circumferential angle δ of the independent region 166 may be 20 degrees or more, optionally 25 degrees or more, optionally 30 degrees or more, optionally 35 degrees or more, or optionally 40 degrees or more.

In a modification, the independent region 166 may have the shape of a geometrical figure such as a square, a rectangle, a parallelogram, a trapezoid, or the like.

In this case, a welding portion with the current collector plate may be formed only in the independent region 166, and the current collector plate may be designed to have a leg structure corresponding to the independent region 166, thereby having advantages in terms of current collecting efficiency.

Figure 19:
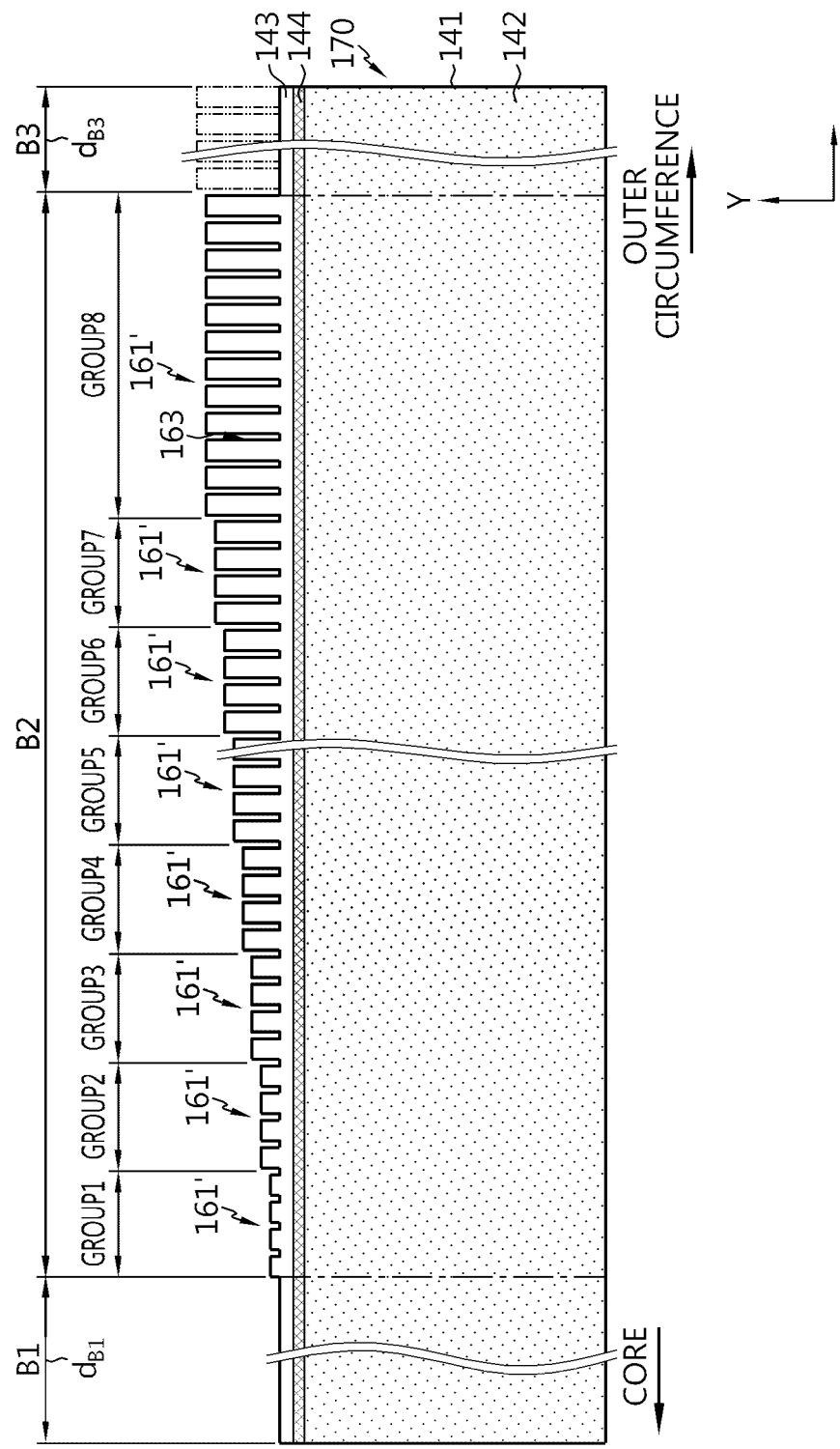
FIG. 19 is a plan view illustrating the structure of an electrode according to a sixth embodiment of the present disclosure.

FIG. 19 is a plan view illustrating the structure of an electrode according to a sixth embodiment of the present disclosure.

Referring to FIG. 19, the electrode 170 of the sixth embodiment has substantially the same configuration except that the shape of the segment piece 161' is different from that of the above-described embodiment. Therefore, unless otherwise stated, the configuration of the fifth embodiment may be equally applied to the sixth embodiment.

The segment pieces 161' has a shape of a geometrical figure in which the widths of the upper and lower portions are substantially the same. Preferably, the segment pieces 161' may have a rectangular shape.

Figure 20:
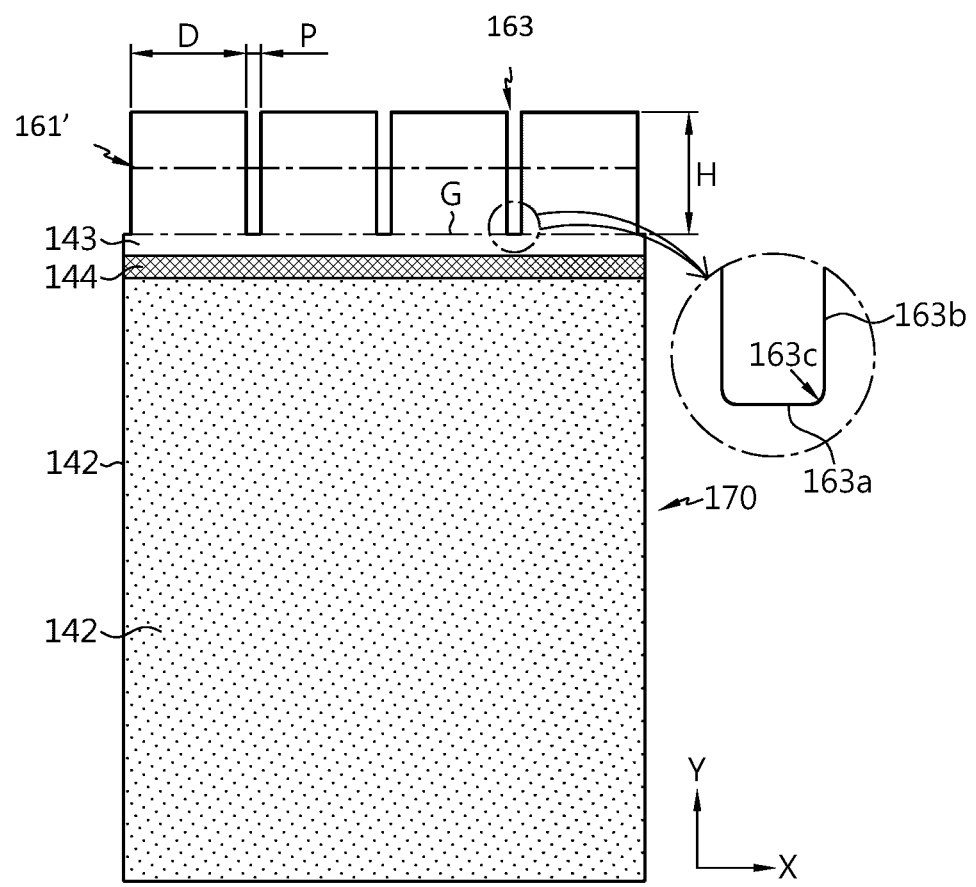
FIG. 20 is a view showing definitions of a width, a height, and a spacing pitch of segment pieces included in an electrode according to a sixth embodiment of the present disclosure.

FIG. 20 is a view showing definitions of a width, a height, and a spacing pitch of a segment included in an electrode according to a sixth embodiment of the present disclosure.

Referring to FIG. 20, the width D, the height H, and the spacing pitch P of the segment pieces 161' may be set to prevent abnormal deformation of the uncoated portion 143 while sufficiently increasing the number of overlapping layers of the uncoated portion 143 in order to prevent the uncoated portion 143 from being torn and improve welding strength with the electrode assembly during the bending processing of the uncoated portion 143. Abnormal deformation means that the uncoated portion at the bottom of the bending point does not maintain a straight state and is deformed irregularly without hesitation.

The width D of the segment pieces 161' is defined as a length between two points where two straight lines extending from both sides of the segment pieces 161 ' and a straight line extending from the bottom 163a of the cutting groove 163 meet. The height H of the segment pieces 161' is defined as the shortest distance between the uppermost side of the segment pieces 161' and a straight line extending from the bottom 163a of the cutting groove 163. The spacing pitch P of the segment pieces 161' is defined as a length between two points where a straight line extending from the bottom 163a of the cutting groove 163 and two straight lines extending from two sides 163b connected to the bottom 163a meet. When the side 163b and/or the bottom 163a are curved, the straight line may be replaced with a tangent line extending from the side 163b and/or the bottom 163a at the intersection where the side 163b and the bottom 163a meet.

Preferably, the conditions regarding the width D, the height H, and the spacing pitch P of the segment pieces 161' are substantially the same as those of the above-described fifth embodiment, and thus a repetitive description will be omitted. However, since the segment pieces 161' have a rectangular shape, the lower inner angle of the segment pieces 161' may be constant at 90 degrees.

Similar to the electrode 160 of the fifth embodiment, the electrode 170 according to the sixth embodiment may also include a segment pieces omission section 164 in which some of the plurality of segment pieces are regularly or irregularly omitted.

As in the fifth and sixth embodiments, when the third portion B2 includes a plurality of segment pieces 161, 161', the shapes of each segment pieces 161, 161' may be variously modified.

According to another aspect of the present disclosure, after the electrodes 160, 170 are wound into the electrode assembly, the segment pieces exposed to the upper and lower portions of the electrode assembly may be overlapped in multiple layers along the radial direction of the electrode assembly to form a bent surface region.

Figure 21:
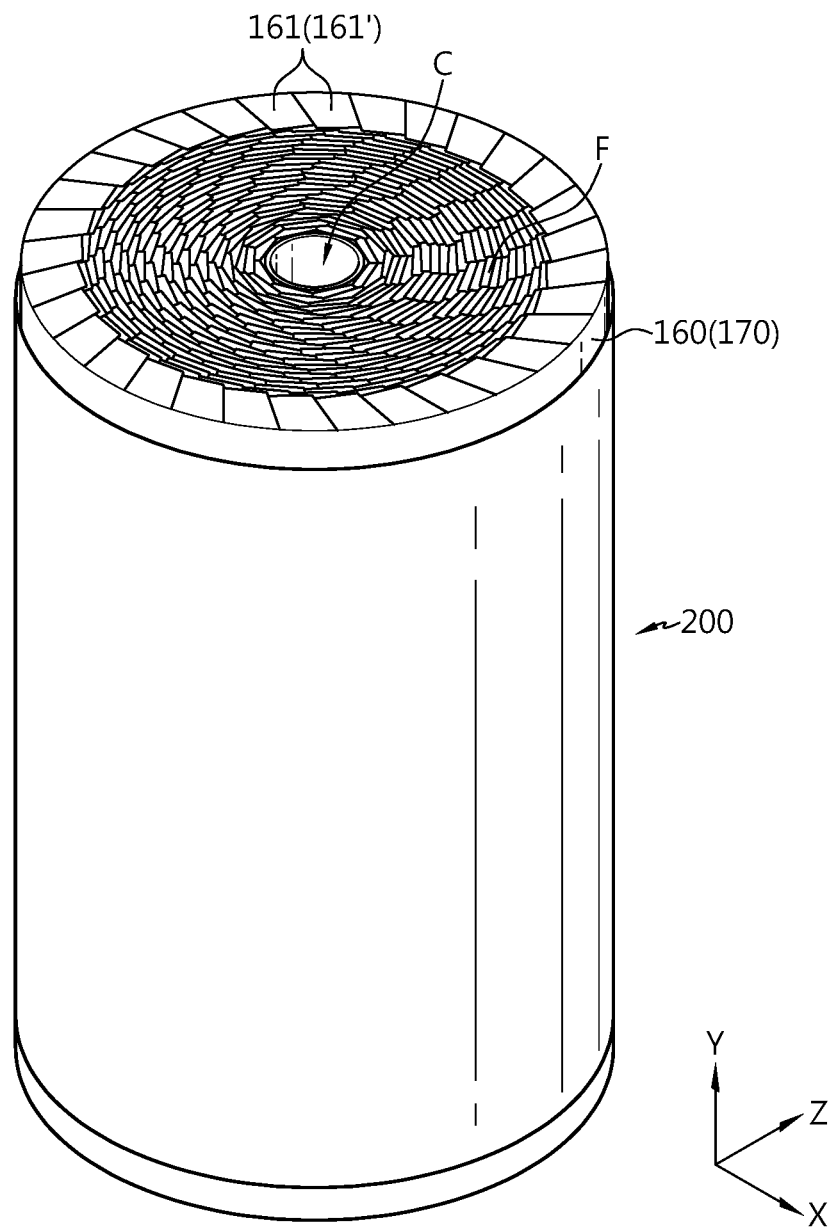
FIG. 21 is an upper perspective view schematically illustrating an electrode assembly in which a bent surface region is formed.

The bent surface region F formed while the segment piece 161 is bent toward the core C of the electrode assembly 200 may be formed in both upper and lower portions of the electrode assembly 200. FIG. 21 is an upper perspective view schematically illustrating an electrode assembly in which a bent surface region is formed.

Referring to FIG. 21, the bent surface region F has a structure in which segment pieces 161 are overlapped in a plurality of layers in the winding axis direction. The overlapping direction is the winding axis direction.

The height, width, and spacing pitch of the segment pieces 161 may be adjusted according to the radius of the winding turn including the segment pieces 161 to optimize the number of stacks of the segment pieces 161 at each position of the bent surface region F to meet the required welding strength of the current collector plate.

The electrode structure of the above-described embodiments (modified examples) may be applied to the positive electrode and the negative electrode included in jelly-roll type or other types of electrode assembly known in the art.

In the present disclosure, the positive electrode active material coated on the positive electrode and the negative electrode active material coated on the negative electrode may be used without limitation as long as the active material is known in the art.

In one example, the positive active material may include an alkali metal compound represented by the general formula $A[A_xMy]O_{2+z}$ (A includes at least one element of Li, Na, and K; M includes at least one element selected from Ni, Co, Mn, Ca, Mg, Al, Ti, Si, Fe, Mo, V, Zr, Zn, Cu, Mo, Sc, Zr, Ru, and Cr; $x \geq 0$, $1 \leq x+y \leq 2$, $-0.1 \leq z \leq 2$; The stoichiometric coefficients x, y, and z are selected for the compound to remain electrically neutral).

In another example, the positive electrode active material may be an alkali metal compound $_xLiM^1O_2\text{-}(1-x)Li_2M_2O_3$ ($M^1$ includes at least one element having an average oxidation state 3; $M^2$ includes at least one element having an average oxidation state 4; $0 \leq x \leq 1$) disclosed in U.S. Pat. Nos. 6,677,082, 6,680,143, and the like.

In still another example, the positive electrode active material may be lithium metal phosphate represented by the general formula $Li_aM^1{}_xFe_{1-x}M^2{}_yP_{1-y}M^3{}_zO_{4-z}$ ($M^1$ includes at least one element selected from Ti, Si, Mn, Co, Fe, V, Cr, Mo, Ni, Nd, Al, and Mg; $M^2$ includes at least one element selected from Ti, Si, Mn, Co, Fe, V, Cr, Mo, Ni, Nd, Al, Mg, As, Sb, Si, Ge, V, and S; $M^3$ includes a halogen element optionally including F; $0 \leq a \leq 2$, $0 \leq x \leq 1$, $0 \leq y \leq 1$, $0 \leq z \leq 1$; The stoichiometric coefficients a, x, y, and z are selected for the compound to remain electrically neutral), or $Li_3M_2(PO_4)_3$ (M includes at least one element selected from Ti, Si, Mn, Fe, Co, V, Cr, Mo, Ni, Al, and Mg).

Preferably, the positive electrode active material may include primary particles and/or secondary particles in which the primary particles are aggregated.

In one example, a carbon material, lithium metal or lithium metal compound, silicon or a silicon compound, tin or a tin compound, or the like may be used as the negative electrode active material. A metal oxide such as $TiO_2$ or $SnO_2$ having a potential of less than 2 V may also be used as the negative electrode active material. All of low-crystalline carbon, high-crystalline carbon, and the like may be used as the carbon material.

As the separator, a porous polymer film, for example, a porous polymer film made of polyolefin-based polymer such as ethylene homopolymer, propylene homopolymer, ethylene/butene copolymer, ethylene/hexene copolymer, ethylene/methacrylate copolymer, or the like may be used alone or by stacking them. As another example, a conventional porous non-woven web, for example, a non-woven web made of high melting point glass fiber, polyethylene terephthalate fiber, or the like, may be used as the separator.

At least one surface of the separator may include a coated layer of inorganic particles. Also, it is possible that the separator itself is made of a coated layer of inorganic particles. The particles constituting the coated layer may have a structure coupled to a binder so that an interstitial volume is present between adjacent particles.

The inorganic particles may be formed of an inorganic material having a dielectric constant of 5 or more. Non-limiting examples of the inorganic particles may include at least one material selected from the group consisting of $Pb(Zr,Ti)O_3(PZT)$, $Pb_{1-x}La_xZr_{1-y}Ti_yO_3(PLZT)$, $PB(Mg_3Nb_{2/3})O_3\text{—}PbTiO_3(PMN\text{-}PT)$, $BaTiO_3$, hafnia ($HfO_2$), $SrTiO_3$, $TiO_2$, $Al_2O_3$, $ZrO_2$, $SnO_2$, $CeO_2$, MgO, CaO, ZnO, and $Y_2O_3$.

Figure 22:
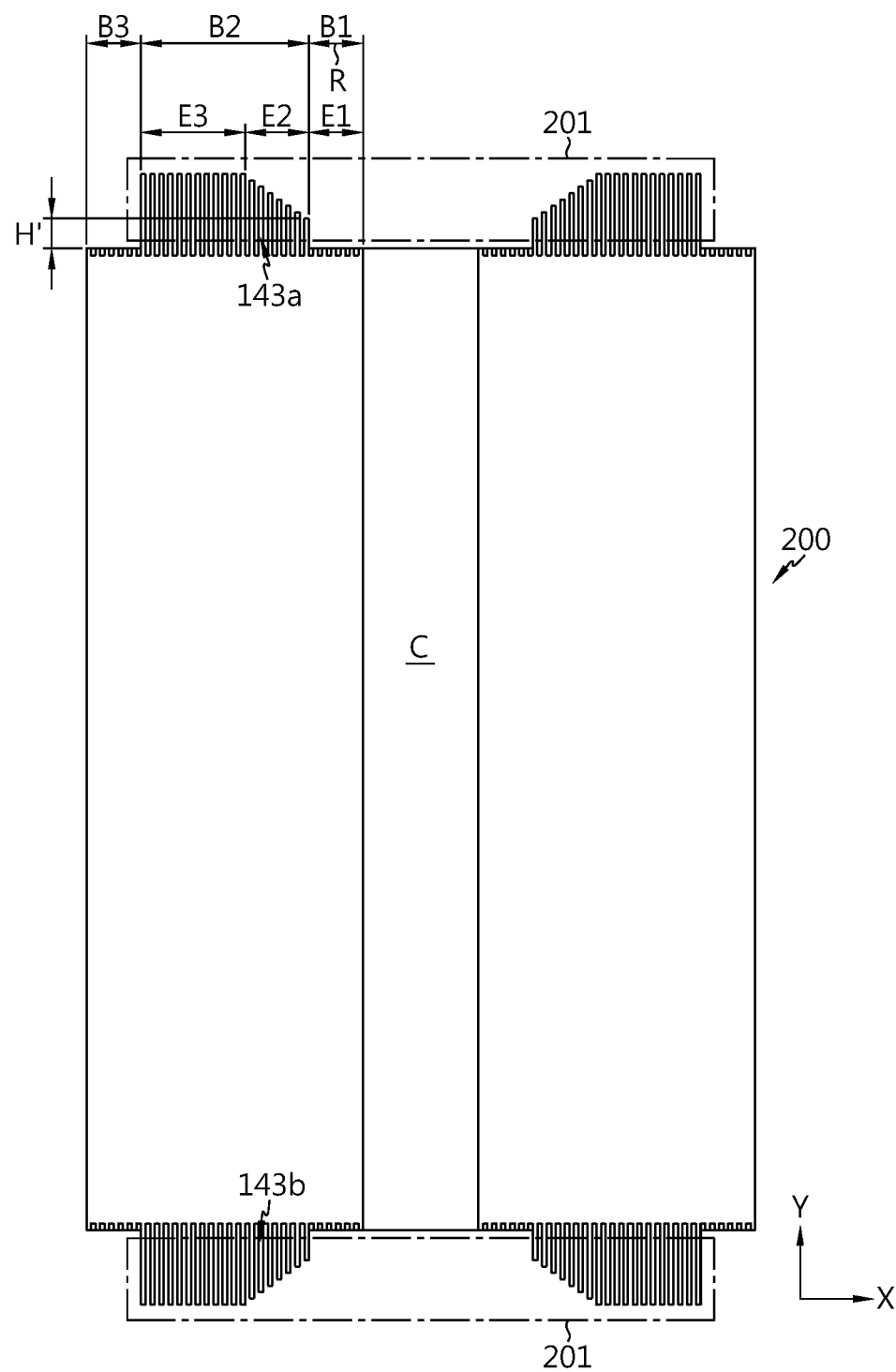
FIG. 22 is a cross-sectional view of a jelly-roll type electrode assembly in which any one of electrodes of a fifth embodiment and a sixth embodiment (modified examples thereof) is applied to a positive electrode and a negative electrode, cut along the Y-axis direction (winding axis direction).

FIG. 22 is a cross-sectional view of a jelly-roll type electrode assembly in which any one of electrodes of a fifth embodiment and a sixth embodiment (modified examples thereof) is applied to a positive electrode and a negative electrode, cut along the Y-axis direction (winding axis direction).

Referring to FIG. 22, the positive electrode uncoated portion 143a includes a first portion B1 adjacent to the core of the electrode assembly 200, a second portion B3 adjacent to an outer circumferential surface of the electrode assembly 200, and a third portion B2 interposed between the first portion B1 and the second portion B3.

The height of the first portion B1 is relatively smaller than the height of the third portion B2. In addition, the bending length of the innermost positive electrode uncoated portion 143a in the third portion B2 is equal to or smaller than the radial length R of the first portion B1. The bending length H' corresponds to a distance from a point where the positive electrode uncoated portion 143a is bent to the upper end of the positive electrode uncoated portion 143a. In a modification, the bending length H' may be smaller than the sum of the radial length R of the first portion B1 and 10% of the radius of the core C.

Therefore, even when the third portion B2 is bent, the core C of the electrode assembly 200 is opened to the outside by 90% or more of its diameter. The core C is at the center of the electrode assembly 200 and has a cavity. If the cavity of the core C is not blocked, there is no difficulty in the electrolyte injection process, and the electrolyte injection efficiency is improved. In addition, by inserting a welding jig through the core C, the welding process between the current collector plate on the negative electrode (or positive electrode) side and the battery housing (or electrode terminal) may be easily performed.

The height of the second portion B3 is relatively smaller than the height of the third portion B2. Therefore, it is possible to prevent the occurrence of an internal short circuit while the beading portion and the second portion B3 are in contact with each other in a process where the beading portion of the battery housing is pressed near the second portion B3.

The negative electrode uncoated portion 143b has the same structure as the positive electrode uncoated portion 143a. In a modification, the negative electrode uncoated portion 143b may have a conventional electrode structure or an electrode structure of other embodiments (modified examples).

In a modification, the height of the second portion B3 may be reduced gradually or in stages, unlike that illustrated in FIG. 22. In addition, in FIG. 22, the height of the third portion B2 is the same on the outer circumferential side, but the height of the third portion B2 may increase gradually or in stages from the boundary between the first portion B1 and the third portion B2 to the boundary between the third portion B2 and the second portion B3. When the third portion B2 is divided into a plurality of segment pieces, a section in which the height of the positive electrode uncoated portion 143a changes corresponds to the height variable section E2 of the segment pieces.

In more detail, the electrode assembly 200, sequentially along the radial direction based on a cross section along the winding axis direction, includes a segment pieces omission section E1 where no segment pieces is present, a height variable section E2 where the height of the segment pieces is variable, and a height uniform section E3 where the height of the segment pieces is uniform.

The ends 201 of the positive electrode uncoated portion 143a and the negative electrode uncoated portion 143b may be bent in a radial direction of the electrode assembly 200, for example, from the outer circumferential side to the core. At this time, the first portion B1 and the second portion B3 are not bent.

The plurality of segment pieces 161, 161' described above are disposed in the height variable section E2 and the height uniform section E3, and are bent along the radial direction of the electrode assembly 200 to form a bent surface region (F in FIG. 21). Since a structure in which a current collector plate is welded to a large area may be applied to the bent surface region F formed by bending the segment pieces 161, 161', energy density of the electrode assembly 200 including the same may be improved and resistance may be reduced.

When the third portion B2 includes a plurality of segment pieces, bending stress is relieved to prevent the positive electrode uncoated portion 143a and the negative electrode uncoated portion 143b near the bending point from being torn or abnormally deformed. In addition, when the width and/or height and/or spacing pitch of the segment pieces 161, 161' are adjusted according to the numerical range of the above-described embodiment, the segment pieces 161, 161' are bent toward the core C and overlapped in multiple layers enough to ensure sufficient welding strength, and do not form hollow holes (voids) in the bent surface region.

In the present embodiment, the segment pieces omission section E1 corresponds to the first portion B1.

Meanwhile, a modified example in which the height variable section E2 is omitted in the electrode assembly 200 is also possible.

Figure 23:
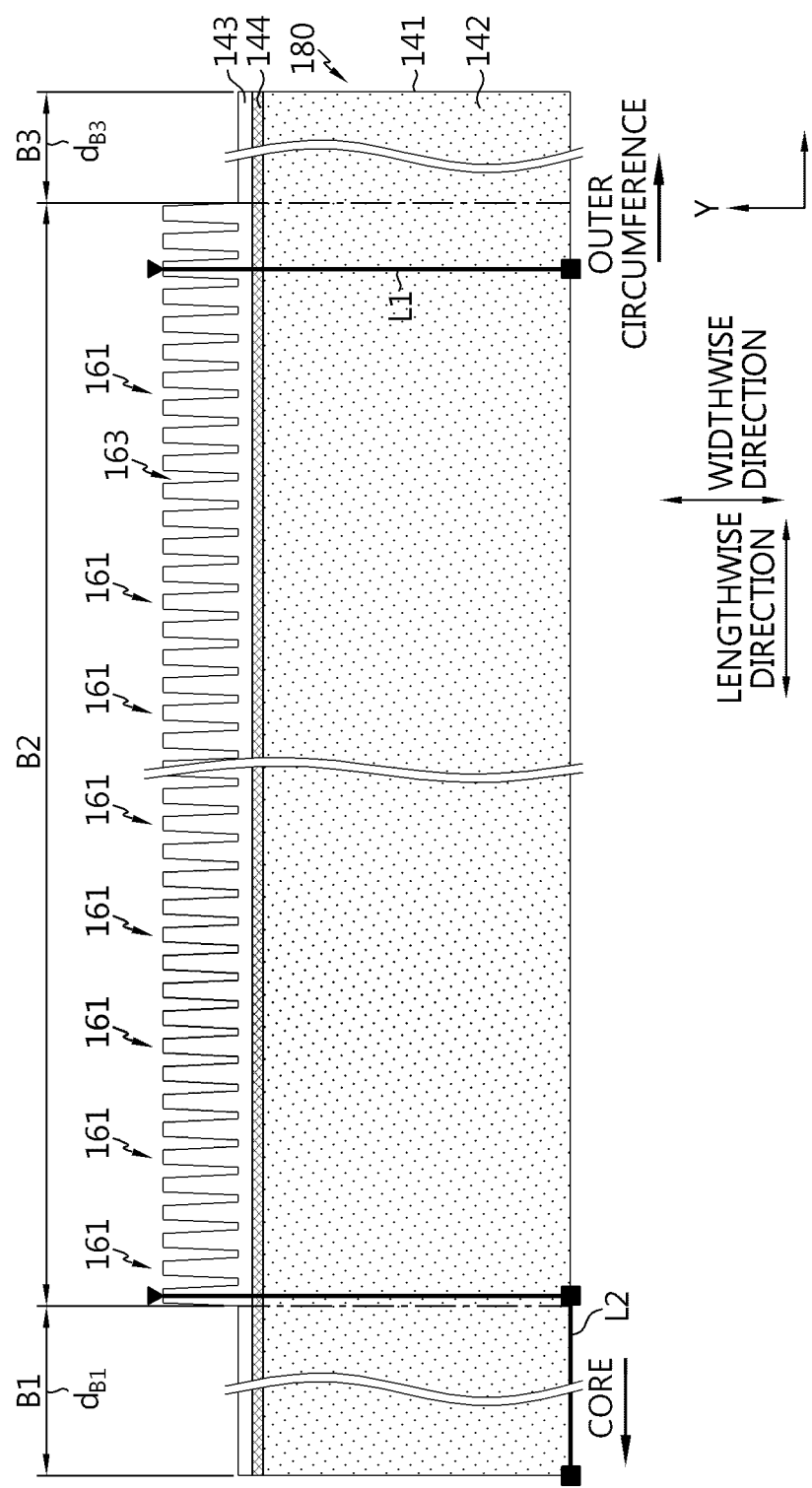
FIG. 23 is a plan view illustrating a deformed structure of an electrode according to a fifth embodiment of the present disclosure.

FIG. 23 is a plan view illustrating a deformed structure of an electrode according to a fifth embodiment of the present disclosure.

In FIG. 23, the electrode 180 of the modified example has a uniform height of the segment pieces 161, and thus the rest of the configuration is substantially the same except that only the segment pieces omission section E1 and the height uniform section E3 are included without the height variable section E2 when the electrode assembly 200 is manufactured as shown in FIG. 22. Therefore, unless otherwise stated, the configuration of the fifth embodiment may be equally applied to this modified example. In addition, the second portion B3 is not divided into segment pieces, and the height of the first portion B1 and the height of the second portion B3 are the same.

FIG. 23 shows L1 and L2 of the maximum current path (the connection positions of the first path and the second path are marked with a triangle, and an end point of the electrode is marked with a square).

In the electrode 180 having the structure as shown in FIG. 23, secondary batteries of Examples and Comparative Examples were obtained by changing the length $d_{B1}$ of the first portion B1, and then AC resistance, DC resistance, low temperature cycle, and fast charge cycle were tested. The number of segment pieces 161 was 115, the width of the segment pieces 161 was 8 mm at the widest width, and the height of the segment pieces 161 was 6 mm. The negative electrode current collector was copper and had a thickness of 10 μm, and the positive electrode current collector was aluminum and had a thickness of μm. In each current collector, the short side length almost close to L1 was 65 mm and the long side length was 4 m. The positive electrode active material included lithium composite transition metal oxide, and the negative electrode active material included graphite. The separator was a polyolefin separator. The electrolyte was prepared by dissolving 1.4 M LiPF$_6$ in a solvent in which ethylene carbonate (EC), dimethyl carbonate (DMC), and ethylmethyl carbonate (EMC) were mixed at a volume ratio of 20:70:10.

For example, AC resistance evaluation may be measured by applying an AC with a frequency of 1 kHz using a commonly used AC impedance analyzer. In this experiment, after formation with 200 mA current (0.1 C) was performed, CC/CV charge under a condition of 4.2 V 666 mA (0.3 C, 0.05 C cut-off) and CC discharge under a condition of 2.5 V 666 mA (0.3 C) were repeated 3 times. Thereafter, AC resistance was measured in the range of 10 mHz to 100 kHz using a multi impedance analyzer (Biologic, model name: VMP3) at a temperature of 25° C. and under 50% state of charge (SOC).

For example, DC resistance evaluation may be measured by placing a probe on the electrode surface using a commonly used DC resistance measuring instrument and allowing current to flow only through the electrode surface. In this experiment, the voltage drop generated when a fully charged secondary battery was discharged to 50% SOC at room temperature and discharged at a current of 0.5 C for 10 seconds was recorded and DC resistance (DC-IR) value calculated using Ohm's Law (R=V/I) was measured (discharge pulse (0.5 C pulse is applied for 10 seconds), DC-IR=(V0-V1)/I, V0 is the voltage before the discharge pulse, and V1 is the voltage after the discharge pulse is applied).

In the low-temperature cycle performance (evaluation of low-temperature life characteristics), after formation with 200 mA current (0.1 C) was performed, CC/CV charge under a condition of 4.2 V 666 mA (0.3 C, 0.05 C cut-off) and CC discharge under a condition of 2.5V 666 mA (0.3 C) were repeated at 10° C. for 300 cycles. Thereafter, with the first discharge capacity as the initial capacity, the 300th discharge capacity was compared with the initial capacity, and the capacity retention rate was calculated in %. To measure the discharge capacity, a device such as PNE-0506 charger/discharger (manufacturer: PNE Solution, 5 V, 6 A) may be used.

For the rapid cycle performance, the process of fast charge for 25 minutes from 10% SOC to 80% SOC and discharging to 10% SOC was repeated 500 times. All charging and discharging were performed by CC. After 500 cycles, the rate of change in charge capacity was calculated in %.

The length $d_{B1}$ of the first portion B1 determining L2 was 556 mm in the secondary battery of Example 1, the length $d_{B1}$ of the first portion B1 was 680 mm in the secondary battery of Comparative Example 1, and the length $d_{B1}$ of the first portion B1 was 920 mm in the secondary battery of Comparative Example 2. In Example 1, the length $d_{B1}$ of the first portion B1 is 556 mm, thereby satisfying the length of 660 mm or less of the electrode tab undefined section 143a2 confirmed through simulation. In Comparative Examples 1 and 2, the length $d_{B1}$ of the first portion B1 is greater than the length 660 mm of the electrode tab undefined section 143a2 confirmed through simulation.

Table 1 summarizes the conditions and experimental results of Example 1, Comparative Example 1, and Comparative Example 2.

TABLE 1

| | Number of segment pieces (electrode tab) | Length $d_{B1}$ of the first portion B1 (mm) | Resistance AC (mΩ) | Resistance DC (mΩ) | Performance Low temperature cycle (4.2 V-2.5 V, 0.3/ 0.3 C@10° C.) | Performance Fast charge cycle (SOC10~80%, 25 min) |
|---|---|---|---|---|---|---|
| Ex. 1 | 115 | 556 | 1.5 | 3.6 | 82%@300 cycle | 87%@500 cycle |
| Com. Ex. 1 | 115 | 680 | 1.7 | 3.9 | 76%@300 cycle | 83%@500 cycle |
| Com. Ex. 2 | 115 | 920 | 2 | 4.3 | 58%@300 cycle | 64%@500 cycle |

Referring to Table 1, in the case of Example 1, it was measured that AC resistance was 1.5 mΩ and DC resistance was 3.6 mΩ. As shown in the simulation results, AC resistance satisfies 2 mΩ or less, and DC resistance also satisfies the minimum resistance requirements of the secondary battery (DC resistance is 4 mΩ or less and AC resistance is 3 mΩ or less).

The DC resistance measured in Comparative Example 1 was 3.9 mΩ and the AC resistance was 1.7 mΩ, which satisfies the minimum resistance requirement of the secondary battery, but the low temperature cycle was 76% and the fast charge cycle was 83%, thereby exhibiting inferior performance compared to Example 1 in which the low temperature cycle was 82% and the fast charge cycle was 87%. In particular, it can be seen that the length $d_{B1}$ of the first portion B1 should be 660 mm or less advantageously as in Example 1 from the viewpoint of the fast charge cycle.

The DC resistance measured in Comparative Example 2 was 4.3 mΩ, which did not satisfy the minimum resistance requirement of the secondary battery, and the low temperature cycle was 58% and the fast charge cycle was 64%, thereby exhibiting inferior performance compared to Comparative Example 1. That is, it can be seen that as the length $d_{B1}$ of the first portion B1 increases beyond 660 mm (680 mm→920 mm), the resistance increases, and the low temperature cycle and fast charge cycle performance deteriorate.

As described above, when the length $d_{B1}$ of the first portion B1 is set within a predetermined range and the current path ratio L2/L1 is 11 or less according to an embodiment of the present disclosure, it can be seen that it is possible to design a low resistance cell satisfying the minimum resistance requirement of the secondary battery and having excellent performance in terms of a low temperature cycle and a fast charge cycle, thereby being suitable for manufacturing as a cylindrical secondary battery with an increased form factor for application to an electric vehicle.

Various electrode assembly structures according to an embodiment of the present disclosure may be applied to a cylindrical secondary battery.

Preferably, the cylindrical secondary battery may be, for example, a cylindrical secondary battery having a form factor ratio (defined as a value obtained by dividing a diameter of a cylindrical secondary battery by a height, that is, a ratio of a diameter 1 to a height H) greater than approximately 0.4.

Preferably, the diameter of the cylindrical secondary battery may be 40 mm to 50 mm, and the height may be 60 mm to 130 mm. The form factor of the cylindrical secondary battery according to an embodiment may be, for example, 46110, 4875, 48110, 4880, or 4680. In the numerical figures indicating the form factor, the first two numbers indicate the diameter of the secondary battery, and the remaining numbers indicate the height of the secondary battery.

When an electrode assembly having a tab-less structure is applied to a cylindrical secondary battery having a form factor ratio of more than 0.4, the stress applied in the radial direction at the time of bending the uncoated portion is large, and thus the uncoated portion may be easily torn. Also, in order to sufficiently ensure welding strength and lower resistance when welding the current collector to the bent surface region of the uncoated portion, the number of stacks of the uncoated portion in the bent surface region should be sufficiently increased. This requirement may be achieved by the electrode and the electrode assembly according to the embodiments (modifications) of the present disclosure. In particular, this requirement may be achieved while satisfying the condition that the current path ratio L2/L1 is 11 or less, so that a low resistance design is possible.

The secondary battery according to an embodiment of the present disclosure has a substantially cylindrical shape, and may be a cylindrical secondary battery having a diameter of approximately 46 mm, a height of approximately 110 mm, and a form factor ratio of 0.418.

The secondary battery according to another embodiment has a substantially cylindrical shape, and may be a cylindrical secondary battery having a diameter of approximately 48 mm, a height of approximately 75 mm, and a form factor ratio of 0.640.

The secondary battery according to still another embodiment has a substantially cylindrical shape, and may be a cylindrical secondary battery having a diameter of approximately 48 mm, a height of approximately 110 mm, and a form factor ratio of 0.436.

The secondary battery according to still another embodiment has a substantially cylindrical shape, and may be a cylindrical secondary battery having a diameter of approximately 48 mm, a height of approximately 80 mm, and a form factor ratio of 0.600.

The secondary battery according to still another embodiment has a substantially cylindrical shape, and may be a cylindrical secondary battery having a diameter of approximately 46 mm, a height of approximately 80 mm, and a form factor ratio of 0.575.

Conventionally, secondary batteries having a form factor ratio of approximately 0.4 or less have been used. That is, conventionally, for example, an 18650 secondary battery, a 21700 secondary battery, or the like has been used. In the case of the 18650 secondary battery, the diameter is approximately 18 mm, the height is approximately 65 mm, and the form factor ratio is 0.277. In the case of the 21700 secondary battery, the diameter is approximately 21 mm, the height is approximately 70 mm, and the form factor ratio is 0.300.

Hereinafter, a cylindrical secondary battery according to an embodiment of the present disclosure will be described in detail.

Figure 24:
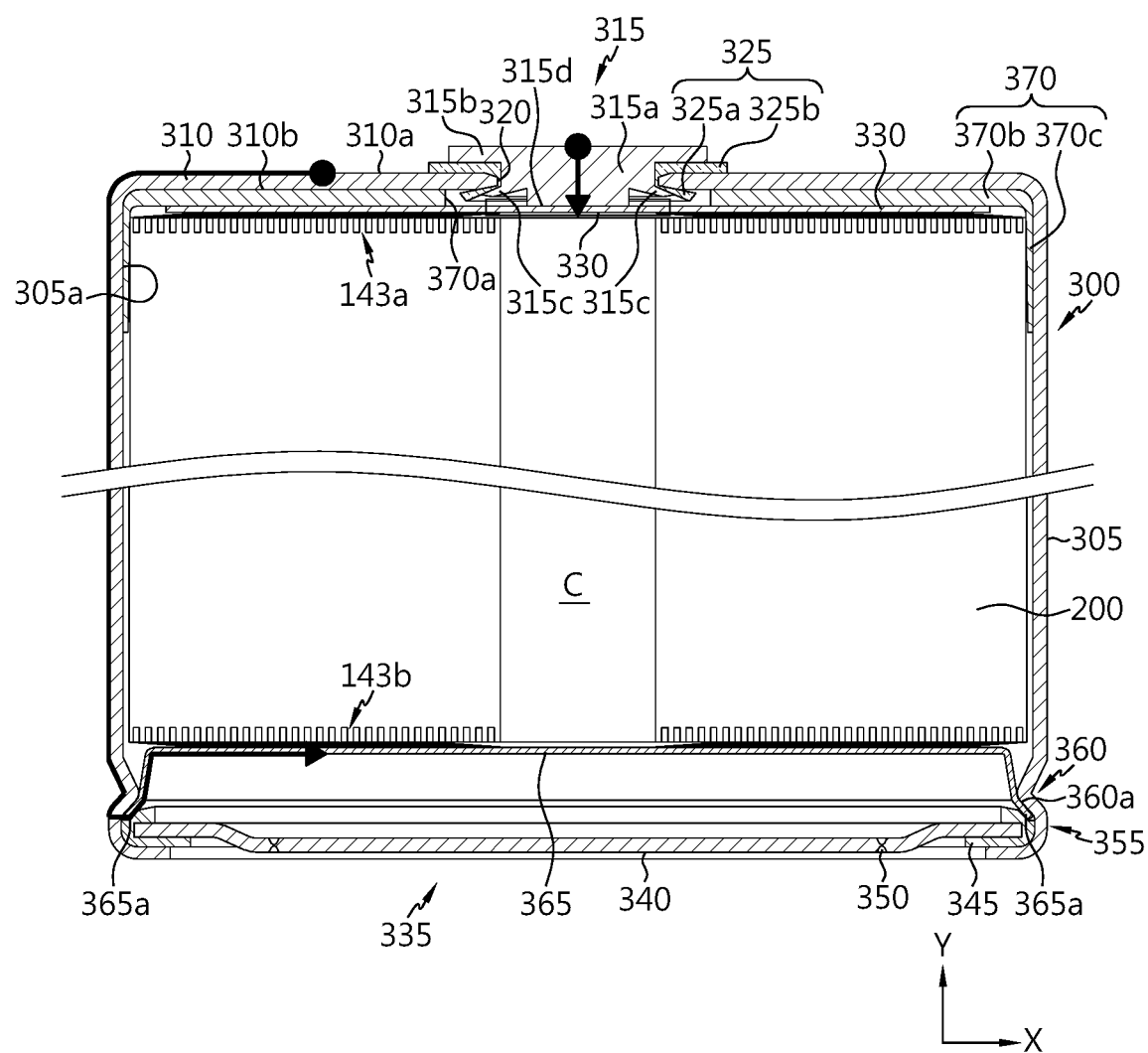
FIG. 24 is a cross-sectional view of a cylindrical secondary battery according to an embodiment of the present disclosure.

FIG. 24 is a cross-sectional view of a cylindrical secondary battery according to an embodiment of the present disclosure. The secondary battery 300 of FIG. 24 includes an electrode assembly 200 that is a jelly-roll type electrode assembly in which any one of the electrodes of the fifth and sixth embodiments (modified examples thereof) is applied to the positive electrode and the negative electrode. FIG. 24 is a cross-sectional view of the secondary battery 300 taken along the winding axis direction.

Referring to FIG. 24, in the electrode assembly 200, the positive electrode uncoated portion 143*a* and the negative electrode uncoated portion 143*b* are disposed in opposite directions. Also, the positive electrode uncoated portion 143*a* and the negative electrode uncoated portion 143*b* are exposed to the outside of the separator (refer to 60 in FIG. 7). In the electrode assembly 200, only a part of the positive electrode uncoated portion 143*a* and the negative electrode uncoated portion 143*b* may be defined and used as electrode tabs. For example, only a part of the positive electrode uncoated portion 143*a* may be used as a positive electrode tab, and only a part of the negative electrode uncoated portion 143*b* may be used as a negative electrode tab.

The secondary battery 300 also includes a cylindrical battery housing 305 accommodating the electrode assembly 200 and connected to the negative electrode uncoated portion 143*b*. The battery housing 305 is made of a conductive metal material. In one example, the battery housing 305 may be made of iron, nickel-plated iron, or stainless steel (SUS), and may be a battery can, but the present disclosure is not limited thereto.

Preferably, one side (lower portion in this embodiment) of the battery housing 305 is open to form an opening. The opposite side of the opening in the battery housing 305 is a closed portion. In this embodiment, the closed portion is the bottom 310 of the battery housing 305. The bottom 310 of the battery housing 305 is circular. The side (outer circumferential surface) and the bottom 310 of the battery housing 305 may be integrally formed. The bottom 310 of the battery housing 305 has an approximately flat shape. The battery housing 305 accommodates the electrode assembly 200 through the opening, and also accommodates an electrolyte. The side surface of the battery housing 305 extends from the bottom 310 by a predetermined length.

The bottom 310 of the battery housing 305 has a structure in which the positive electrode terminal 315 is riveted to the through hole 320 through a caulking process. Also, the secondary battery 300 may include a rivet gasket 325 interposed between the positive electrode terminal 315 and the through hole 320.

The positive electrode terminal 315 is made of a conductive metal material. In one example, the positive electrode terminal 315 may be made of a material containing aluminum as a main component, but the present disclosure is not limited thereto. The positive electrode terminal 315 may be made of a 10-series aluminum alloy that is easy to rivet and has low resistance. A portion of the positive electrode terminal 315 is inserted into the battery housing 305, and the other portion is exposed to the outside of the battery housing 305.

The rivet gasket 325 may be made of a polymer resin having insulation and elasticity. In one example, the rivet gasket 325 may be made of polypropylene, polybutylene terephthalate, polyethylene fluoride, or the like, but the present disclosure is not limited thereto.

The secondary battery 300 includes a positive electrode current collector plate 330 connected to the positive electrode uncoated portion 143*a*. The connection between the positive electrode uncoated portion 143*a* and the positive electrode current collector plate 330 may be performed by welding. The positive electrode current collector plate 330 is connected to the electrode tab defined section of the positive electrode uncoated portion 143*a*. The positive current collector plate 330 is also connected to the positive electrode terminal 315. The positive electrode current collector plate 330 and the positive electrode terminal 315 are connected by laser welding. The positive electrode current collector plate 330 may be made of the same metal as the positive electrode current collector and/or the positive electrode terminal 315, or may be made of a material that is easily welded thereto. For example, the positive electrode current collector plate 330 may be made of a material containing aluminum as a main component, and may be iron, nickel-plated iron, SUS, or the like. The positive electrode terminal 315 is connected to the positive electrode uncoated portion 143*a* through the positive current collector plate 330.

The secondary battery 300 may also include a sealing body 335 that seals the opening of the battery housing 305 to be insulated from the battery housing 305. Preferably, the sealing body 335 may include a cap plate 340 having no polarity and a sealing gasket 345 interposed between the edge of the cap plate 340 and the opening of the battery housing 305.

The cap plate 340 may be made of a conductive metal material such as aluminum, iron, nickel-plated iron, SUS, or the like. In addition, the sealing gasket 345 may be made of polypropylene, polybutylene terephthalate, polyethylene fluoride, or the like, all of which have insulation and elasticity. However, the present disclosure is not limited to the materials of the cap plate 340 and the sealing gasket 345. The cap plate 340 may cover the opening of the battery housing 305. Even when the cap plate 340 is made of a conductive metal, it does not have polarity. Having no polarity may mean that the cap plate 340 is not connected to the electrode assembly 200. Also, it may mean that it is electrically insulated from the battery housing 305 and the positive electrode terminal 315. Since it has no polarity, the cap plate 340 does not function as an electrode terminal. The cap plate 340 does not need to be connected to the electrode assembly 200 and the battery housing 305, and its material does not necessarily have to be a conductive metal.

The cap plate 340 may include a vent notch 350 that is ruptured when the pressure inside the battery housing 305 exceeds a threshold value. The vent notch 350 may be formed on one or both surfaces of the cap plate 340. The vent notch 350 may form a continuous or discontinuous circular pattern, a straight pattern, or other patterns on the surface of the cap plate 340. For example, the vent notch 350 may be formed in an approximately circular ring shape having a predetermined width. This circular ring-shaped vent notch 350 may have the same center as the center of the cap plate 340 and has a smaller radius than the radius of the cap plate 340.

The breaking pressure of the battery housing 305 may be controlled by controlling the depth and width of the vent notch 350. For example, the vent notch 350 may be set to be ruptured when the pressure inside the battery housing 305 is in the range of 15 to 35 kgf/cm$^2$. The vent notch 350 may be formed by partially reducing the thickness of the battery housing 305 by notching. The vent notch 350 may have a thickness gradient. The thickness gradient means that the bent notch 350 is formed by inclining at a predetermined angle based on a predetermined horizontal plane when the cross-section thereof is checked. The vent notch 350 is broken when the pressure inside the battery housing 305 is abnormally increased, thereby discharging all the internal gas to the outside.

The battery housing 305 may include a crimping portion 355 that extends and is bent toward the inside of the battery housing 305, and that surrounds and fixes the edge of the cap plate 340 together with the sealing gasket 345, to fix the sealing body 335. Preferably, the lower surface of the cap plate 340 may be positioned above the lower end of the crimping portion 355. Then, a vent space is formed in the lower portion of the cap plate 340, and thus gas may be smoothly discharged when the vent notch 350 is ruptured.

The battery housing 305 may further include a beading portion 360 press-fitted toward the inside of the battery housing 305 in a region adjacent to the opening. The beading portion 360 is recessed into the battery housing 305. The beading portion 360 supports the edge of the sealing body 335, particularly the outer circumferential surface of the seal gasket 345, when the sealing body 335 is fixed by the crimping portion 355.

The secondary battery 300 may further include a negative electrode current collector plate 365 connected to the negative electrode uncoated portion 143b. The connection between the negative electrode uncoated portion 143b and the negative electrode current collector plate 365 may be performed by welding. The negative electrode current collector plate 365 is connected to the electrode tab defined section of the negative electrode uncoated portion 143b. The negative electrode current collector plate 365 may be made of the same type of metal as the negative electrode current collector, or may be made of a material that is easily welded thereto. For example, it may be copper or a copper alloy, nickel or a nickel alloy, iron, SUS, or a composite material thereof. Preferably, in the negative electrode current collector plate 365, at least a portion 365a of an edge not in contact with the negative electrode uncoated portion 143b is interposed between the beading portion 360 and the sealing gasket 345, and may be fixed by the crimping portion 355. Optionally, at least a portion 365a of the edge of the negative electrode current collecting plate 365 may be fixed to the inner circumferential surface 360a of the beading portion 360 adjacent to the crimping portion 355 by welding. Accordingly, the negative electrode current collector plate 365 is also connected to the battery housing 305, and the battery housing 305 is connected to the negative electrode uncoated portion 143b through the negative electrode current collector plate 365. In addition, the negative electrode current collector plate 365 may include a current collector plate hole (not shown) at the center thereof. The current collector plate hole does not block the cavity of the core C. The negative electrode current collector plate 365 includes the current collector plate hole, through which a laser beam passes in the step of welding the positive electrode current collector plate 330 to the positive electrode terminal 315, so that the laser beam may reach the positive electrode current collector plate 330.

Each of the current collector plates 330, 365 induces a current generated in each electrode of the electrode assembly 200 to the positive electrode terminal 315 and the battery housing 305. Each of the current collector plates 330, 365 is a component connected to draw current from the positive electrode uncoated portion 143a and the negative electrode uncoated portion 143b, which are the ends of each electrode. Since it is a structure in which current is drawn out by directly connecting the current collector plates 330, 365 to the positive electrode uncoated portion 143a and the negative electrode uncoated portion 143b by welding or the like, a separate current collecting tab is unnecessary. Therefore, the installation process of the current collecting tab is unnecessary, thereby improving productivity. In addition, since the space for accommodating the current collecting tab may be reduced, the entire battery structure becomes compact and space utilization is improved.

In addition, the secondary battery 300 has a structure in which the remaining regions excluding the region occupied by the positive electrode terminal 315 among the positive electrode terminal 315 and the outer surface 310a of the battery housing 305 may be used as the positive electrode and negative electrode terminals, respectively. That is, it has a structure in which most of the surface opposite to the opening of the battery housing 305 may be used as the negative electrode terminal. Therefore, there is an advantage in that it is possible to secure a sufficient area to weld components for connection such as a bus bar for electrical wiring.

By the positive electrode terminal 315, the space efficiency in the battery housing 305 may be increased. Therefore, it is possible to lower the internal resistance of the secondary battery 300 including the same and increase the energy density. The positive electrode terminal 315 may be improved to enlarge the cross-sectional area of the current path. Accordingly, in the secondary battery 300 including the same, the internal heat generation problem that occurs during fast charge is improved.

The positive electrode terminal 315 may include a body portion 315a inserted into the through hole 320, an outer flange portion 315b extending along the outer surface 310a from the circumference of one side of the body portion 315a exposed through the outer surface 310a of the bottom 310 of the battery housing 305, an inner flange portion 315c extending from the circumference of the other side of the body portion 315a exposed through the inner surface 310b of the bottom 310 of the battery housing 305 toward the inner surface 310b, and a flat portion 315d provided inside the inner flange portion 315c.

Preferably, at least a portion of the positive electrode current collector plate 330 may be coupled to the flat portion 315d of the positive electrode terminal 315 by laser welding. Preferably, the flat portion 315d and the inner surface 310b of the bottom 310 of the battery housing 305 may be parallel to each other. Here, 'parallel' means substantially parallel when visually observed.

The flat portion 315d may have a diameter of 3 mm to 14 mm. The flat portion 315d may determine the size of the weldable region. If the diameter of the weldable region is smaller than 3 mm, it may be difficult to secure an appropriate welding strength. When the diameter of the weldable region exceeds 14 mm, the diameter of the outer flange portion 315b of the positive electrode terminal 315 becomes excessively large, and thus it is difficult to sufficiently ensure the area of the outer surface 310a of the bottom 310 of the battery housing 305 to be used as the negative electrode terminal.

Laser welding is used to connect the flat portion 315d to the positive electrode current collector plate 330. Laser welding may be performed while the opening of the battery housing 305 is open in a state where the electrode assembly 200 is inserted through the opening of the battery housing 305. During laser welding, the laser beam may pass through the cavity in the core C of the electrode assembly 200 to reach the welding region of the positive electrode current collector plate 330. When the positive electrode current collector plate 330 is welded to the flat portion 315d of the positive electrode terminal 315, the positive electrode terminal 315 may support the welding region of the positive electrode current collector plate 330. In addition, since the flat portion 315d of the positive electrode terminal 315 has a large area, a welding region may also be secured widely. Accordingly, the internal resistance of the secondary battery 300 may be lowered by lowering the contact resistance of the welding region. The face-to-face welding structure of the riveted positive electrode terminal 315 and the positive electrode current collector plate 330 is very useful for fast charge. This is because the current density per unit area may be lowered in the cross section in the direction where the current flows, thereby lowering the amount of heat generated in the current path as compared to the related art.

In addition, the secondary battery 300 to which the riveting structure of the positive electrode terminal 315 is applied may perform electrical wiring in one direction. In the secondary battery 300, the cap plate 340 of the sealing body 335 has no polarity. Instead, since the negative electrode current collector plate 365 is connected to the battery housing 305, the outer surface 310a of the bottom 310 of the battery housing 305 has a polarity opposite to that of the positive electrode terminal 315. Accordingly, when the plurality of secondary batteries 300 are connected, both the positive electrode and the negative electrode may be connected in one direction, thereby simplifying the connection structure. Therefore, when a plurality of secondary batteries 300 are connected in series and/or in parallel for manufacturing a battery pack, wiring such as bus bar connection may be performed at the upper portion of the secondary battery 300 using the outer surface 310a of the bottom 310 of the battery housing 305, and the positive electrode terminal 315. Accordingly, energy density may be improved by increasing the number of secondary batteries that can be mounted in the same space, and electrical wiring may be easily performed. Therefore, the space efficiency is good and the efficiency of the electrical wiring is high, so that there is a significant work improvement effect in the assembly process of the electric vehicle and the assembly and maintenance of the battery pack.

In addition, the electrical wiring is performed at a side where the outer surface 310a of the bottom 310 of the battery housing 305 and the positive electrode terminal 315 are located, and may not be placed on the cap plate 340 located on the opposite side, thereby maximizing the effect of the vent notch 350 formed in the cap plate 340. Also, if a heat sink, a cooling plate, a tray, or the like are positioned toward the cap plate 340, it is possible to effectively achieve the purpose of assembly and cooling regardless of an electrical wiring connection part. In addition, by assembling the vent notch 350 to be placed downward, the gas emitted from the inside of the secondary battery is discharged downward. Normally, secondary batteries are mounted at a lower position than occupants of a vehicle such as an EV, and thus, when gas is discharged upward from the secondary batteries, it may harm the occupants. The secondary battery 300 of the present disclosure enables to effectively discharge the high-pressure gas inside the secondary battery, is safe regardless of the upper electrical wiring connection part, and furthermore, does not harm the occupants by discharging the gas downward when it is emitted due to the rupture of the vent notch 350, thereby greatly improving the safety.

The secondary battery 300 may further include an insulator 370 interposed between the closed portion of the battery housing 305 and the positive electrode current collector 330. The insulator 370 may be interposed between the positive electrode current collector plate 330 and the inner surface 310b of the bottom 310 of the battery housing 305, and between the inner circumferential surface 305a of the sidewall of the battery housing 305 and the electrode assembly 200.

Preferably, the insulator 370 may include a welding hole 370a exposing the flat portion 315d of the positive electrode terminal 315 toward the positive electrode current collector plate 330. Also, the welding hole 370a may expose the inner flange portion 315c and the inner gasket 325b together with the flat portion 315d of the electrode terminal. Preferably, the welding hole 370a does not block the cavity of the core C. Therefore, when a large amount of gas is generated due to an abnormality in the secondary battery, the movement of the gas to move toward the cap plate 340 through the cavity of the core C is not hindered. Accordingly, when a large amount of gas is generated, the vent notch 350 may smoothly control the internal pressure of the battery. The cap plate 340 also includes the welding hole 370a, so that in the step of welding the positive electrode current collector plate 330 to the positive electrode terminal 315, the laser beam may pass through the welding hole 370a to reach the positive electrode current collector plate 330.

Preferably, the insulator 370 may cover at least a surface of the positive electrode current collector plate 330 and one (upper) edge of the electrode assembly 200. Accordingly, it is possible to prevent the positive electrode current collector plate 330 having a polarity different from that of the battery housing 305 and the positive electrode uncoated portion 143a from contacting each other.

Preferably, the insulator 370 is made of an insulating resin, and may include an upper plate 370b and a side sleeve 370c. In one example, the upper plate 370b and the side sleeve 370c may be integrally formed by injection molding. Alternatively, the side sleeve 370c may be replaced with an insulating tape or the like. The insulating tape may cover the outer edge of the positive electrode current collector plate 330 together with the positive electrode uncoated portion 143a exposed through the outer circumferential surface of the electrode assembly 200.

Preferably, the insulator 370 and the inner surface 310b of the bottom 310 of the battery housing 305 may be in close contact with each other. Here, 'close' means that there is no space (gap) identified visually. In order to eliminate the space (gap), the distance from the inner surface 310b of the bottom 310 of the battery housing 305 to the flat portion 315d of the positive electrode terminal 315 may be equal to or slightly smaller than the thickness of the insulator 370.

Meanwhile, FIG. 24 shows a path (first path) from the module bus bar welding position to the positive electrode uncoated portion 143a and the negative electrode uncoated portion 143b, which are electrode tabs of each electrode 140 (the current starting point is marked with a circle, and the connection position is marked with a triangle). The current starting points are located at the positive electrode terminal 315 and the negative electrode terminal. The negative electrode terminal is the battery housing 305. The module bus bar welding position is located at the upper end of the secondary battery 300. A current path starting from the positive electrode terminal 315 and connected to the positive electrode uncoated portion 143a is formed, and a current path starting from the negative electrode terminal and connected to the negative electrode uncoated portion 143b is formed.

When compared with the conventional cylindrical secondary battery shown in FIG. 2, the first paths are similar to each other, but the second path in the electrode 140 constituting the electrode assembly 200 is significantly different from the conventional second path described with reference to FIG. 3 and the virtual second path described with reference to FIG. 8, as also shown in FIG. 15. Also, there is a feature of the present disclosure that the current path ratio L2/L1 is set to 11 or less, and to this end, the length of the electrode tab undefined section, for example, the length $d_{B1}$ of the first portion B1 is set in a range.

In the present disclosure, unlike the conventional electrode structure described with reference to FIGS. 1 to 3, based on the unfolded state before the electrode is wound, the current hardly moves along the lengthwise direction of the electrode by forming the uncoated electrode tab on the long side of the electrode, and the current path may be minimized by allowing movement along the widthwise direction, thereby reducing the resistance. All the while, a partial section of the uncoated portion is set as an electrode tab undefined section, so that deformation does not occur when the welding region of the uncoated portion is bent and the cavity in the core of the electrode assembly is not blocked. In the meantime, in manufacturing a jelly-roll type electrode assembly and a cylindrical secondary battery including the same using an electrode having the above-described structure, the length of the electrode tab undefined section or the interval between adjacent segment pieces is adjusted, and thus the current path ratio L2/L1 in the maximum current path was set to 11 or less, as described above.

The cylindrical secondary battery according to the above-described embodiments (modified examples) may be used to manufacture a battery pack.

Figure 25:
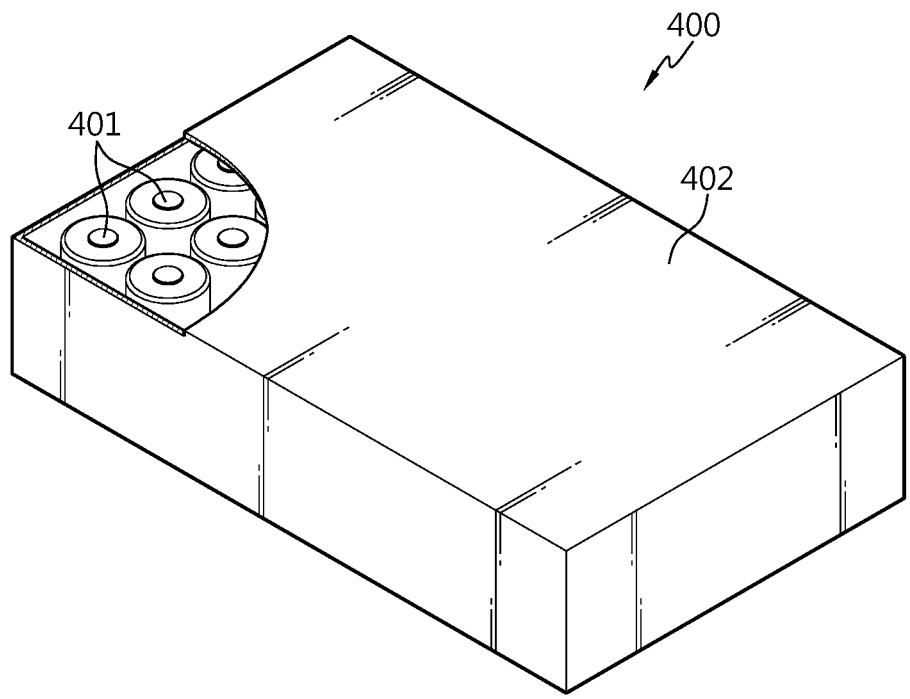
FIG. 25 is a view schematically illustrating a configuration of a battery pack according to an embodiment of the present disclosure.

FIG. 25 is a view schematically illustrating a configuration of a battery pack according to an embodiment of the present disclosure.

Referring to FIG. 25, a battery pack 400 according to an embodiment of the present disclosure includes an assembly to which secondary batteries 401 are electrically connected and a pack housing 402 accommodating it. The secondary battery 401 may be any one of secondary batteries according to the above-described embodiments (modified examples). In the drawings, for convenience of illustration, components such as a bus bar, a cooling unit, and an external terminal for electrical connection of the secondary batteries 401 are omitted.

The battery pack 400 may be mounted in a vehicle. The vehicle may be, for example, an electric vehicle, a hybrid vehicle, or a plug-in hybrid vehicle. The vehicle includes a four-wheeled vehicle or a two-wheeled vehicle.

Figure 26:
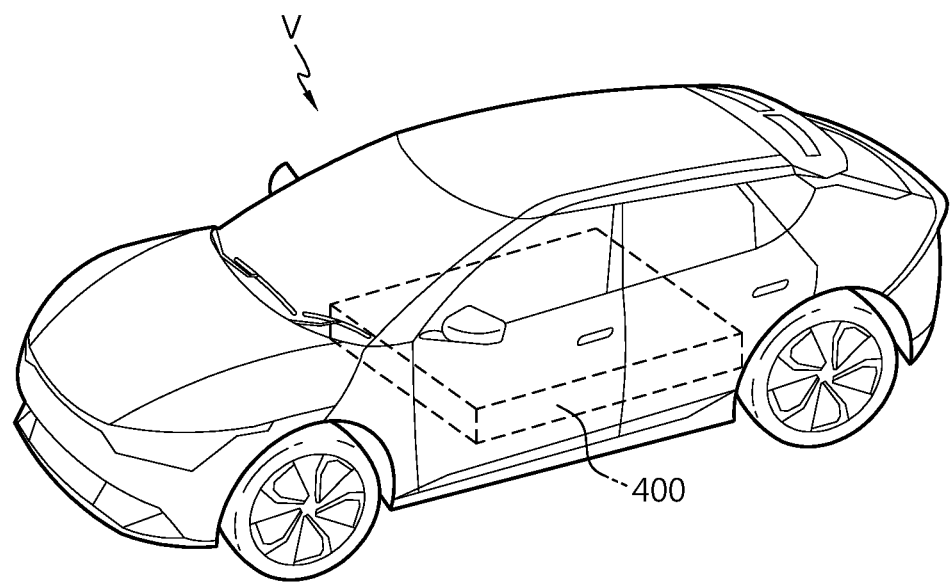
FIG. 26 is a view for describing a vehicle including the battery pack of FIG. 25.

FIG. 26 is a view for describing a vehicle including a battery pack 400 of FIG. 25.

Referring to FIG. 26, a vehicle V according to an embodiment of the present disclosure includes a battery pack 400 according to an embodiment of the present disclosure. The vehicle V is operated by receiving power from the battery pack 400 according to an embodiment of the present disclosure.

While the present disclosure has been hereinabove described with regard to a limited number of embodiments and drawings, the present disclosure is not limited thereto and it is obvious to those skilled in the art that a variety of modifications and changes may be made thereto within the technical aspects of the present disclosure and the equivalent scope of the appended claims.

REFERENCE SIGNS

100, 200: electrode assembly
140, 150, 160, 170, 180: electrode
141: current collector
142: active material layer
143: uncoated portion
143*a*: positive electrode uncoated portion
143*b*: negative electrode uncoated portion
161, 161': segment pieces
164: segment pieces omission section
166: independent region
300, 401: secondary battery
305: battery housing
315: positive electrode terminal
330: positive electrode current collector plate
335: sealing body
340: cap plate
345: sealing gasket
365: negative electrode current collector plate
400: battery pack

What is claimed is:

1. An electrode assembly defining a core and an outer circumferential surface by winding a positive electrode, a negative electrode, and a separator interposed therebetween around a winding axis,
    wherein the positive electrode or the negative electrode comprises a current collector having a sheet-shape that has a long side and a short side, the current collector further having an uncoated portion at an end of the long side,
    wherein the uncoated portion comprises an electrode tab defined section used as an electrode tab by itself and at least one electrode tab undefined section not used as an electrode tab,
    wherein a maximum current path for the at least one electrode tab undefined section comprises a widthwise direction current path along the short side of the current collector and a lengthwise direction current path along the long side of the current collector, and a current path ratio L2/L1 is approximately 2.57 to approximately 8.5 when lengths of the lengthwise direction current path and the widthwise direction current path are L2 and L1, respectively,
    wherein the uncoated portion comprises a second portion adjacent to the outer circumferential surface, and
    wherein a height of the second portion is gradually decreased toward the outer circumferential surface.

2. The electrode assembly according to claim 1,
    wherein a height of the at least one electrode tab undefined section is smaller than that of the electrode tab defined section.

3. The electrode assembly according to claim 1,
    wherein a maximum value of a length of the at least one electrode tab undefined section is approximately 4% to 23% of lengths of the positive electrode and the negative electrode.

4. The electrode assembly according to claim 1,
    wherein a maximum value of a length of the at least one electrode tab undefined section is approximately 2.5 to 11 times of widths of the positive electrode and the negative electrode.

5. The electrode assembly according to claim 1,
    wherein the uncoated portion further comprises a first portion adjacent to the core and a third portion between the first portion and the second portion, and
    wherein the first portion has a height smaller than that of the third portion in a winding axis direction.

6. The electrode assembly according to claim 5,
    wherein the third portion is defined as an electrode tab in a bent state along a radial direction of the electrode assembly.

7. The electrode assembly according to claim 5,
wherein the second portion has a height equal to or smaller than that of the third portion in the winding axis direction.

8. The electrode assembly according to claim 7,
wherein the second portion and the third portion are defined as electrode tabs in a bent state along a radial direction of the electrode assembly.

9. The electrode assembly according to claim 5,
wherein the first portion corresponds to the at least one electrode tab undefined section.

10. The electrode assembly according to claim 5,
wherein the first portion is not bent along a radial direction of the electrode assembly.

11. The electrode assembly according to claim 5,
wherein the second portion is not bent along a radial direction of the electrode assembly.

12. The electrode assembly according to claim 5,
wherein a length of the third portion is longer than that of the first portion and that of the second portion in a winding direction of the electrode assembly.

13. The electrode assembly according to claim 5,
wherein the first portion starts from a short side of the core of the current collector, the height of the first portion is constant along a winding direction, and the first portion is not bent along a radial direction of the electrode assembly.

14. The electrode assembly according to claim 5,
wherein at least a partial region of the third portion is divided into a plurality of segment pieces that are independently bendable.

15. The electrode assembly according to claim 14,
wherein the plurality of segment pieces are bent and overlapped in the winding axis direction.

16. The electrode assembly according to claim 14,
wherein a thickness of the current collector is approximately 5 μm to 25 μm, and a width of the plurality of segment pieces is approximately 10 mm or less, and a height of the plurality of segment pieces is approximately 10 mm or less.

17. The electrode assembly according to claim 16,
wherein the length along the long side of the current collector in the first portion is approximately 660 mm or less and approximately 120 mm or greater.

18. The electrode assembly according to claim 14,
wherein, sequentially along a radial direction of the electrode assembly based on a cross section along the winding axis direction, the electrode assembly comprises a segment pieces omission section in which the plurality of segment pieces are not present, and a height uniform section in which a height of the plurality of segment pieces is uniform, and
wherein the plurality of segment pieces are disposed in the height uniform section and are bent along a radial direction of the electrode assembly to form a bent surface region.

19. The electrode assembly according to claim 18,
wherein the electrode assembly further comprises a height variable section in which the height of the plurality of segment pieces is variable between the segment pieces omission section and the height uniform section, wherein the plurality of segment pieces are disposed in the height variable section and the height uniform section and are bent along the radial direction of the electrode assembly to form a bent surface region.

20. The electrode assembly according to claim 18,
wherein the segment pieces omission section corresponds to the at least one electrode tab undefined section.

21. The electrode assembly according to claim 18,
wherein the second portion is not divided into the plurality of segment pieces, and the heights of the first portion and the second portion are the same.

22. The electrode assembly according to claim 14,
wherein the third portion comprises at least one segment pieces omission section in which there are no segment pieces along a winding direction of the electrode assembly among the plurality of segment pieces.

23. The electrode assembly according to claim 22,
wherein a height of the uncoated portion in the segment pieces omission section is the same as that of the first portion.

24. The electrode assembly according to claim 22,
wherein the plurality of segment pieces are positioned in at least two sectoral or polygonal regions arranged in a circumferential direction based on the core.

25. The electrode assembly according to claim 22,
wherein the segment pieces omission section corresponds to the at least one electrode tab undefined section.

26. The electrode assembly according to claim 5,
wherein a cavity is provided in the core, the third portion is defined as an electrode tab in a bent state along a radial direction of the electrode assembly, the third portion is divided into a plurality of independently bendable segment pieces, and the bent plurality of independently bendable segment pieces do not block the cavity.

27. The electrode assembly according to claim 26,
wherein a maximum value of a length along the long side of the current collector in the first portion is approximately 4% to 23% of a length of the long side of the current collector.

28. The electrode assembly according to claim 1,
wherein a maximum value of the length along the long side of the current collector in the first portion is approximately 4% to 23% of the length along the long side of the current collector.

29. The electrode assembly according to claim 1,
wherein the length along the long side of the current collector in the first portion is approximately 660 mm or less and approximately 120 mm or greater.

30. A secondary battery comprising:
the electrode assembly according to claim 1;
a cylindrical battery housing accommodating the electrode assembly through an opening formed on one side and connected to the uncoated portion of the negative electrode;
a sealing body that seals the opening of the cylindrical battery housing to be insulated from the cylindrical battery housing; and
a positive electrode terminal that is riveted through a through hole formed at a bottom of the cylindrical battery housing located on an opposite side of the opening of the cylindrical battery housing, and is connected to the uncoated portion of the positive electrode.

31. The secondary battery according to claim 30,
wherein the uncoated portion of the positive electrode is exposed to an outside of the separator, and the uncoated portion of the negative electrode is exposed to the outside of the separator in a direction opposite to the uncoated portion of the positive electrode, and
wherein the secondary battery further comprises a positive electrode current collector plate electrically connected to the uncoated portion of the positive electrode and a negative electrode current collector plate electrically connected to the uncoated portion of the negative electrode.

32. The secondary battery according to claim 31, wherein the at least one electrode tab undefined section is not connected to the negative electrode current collector plate and the positive electrode current collector plate, and is not a portion forming a current path.

33. The secondary battery according to claim 30, wherein the secondary battery has a direct current (DC) resistance of approximately 4 m$\Omega$ or less, and an alternating current (AC) resistance of approximately 3 m$\Omega$ or less.

34. The secondary battery according to claim 30, wherein the secondary battery has an alternating current (AC) resistance of approximately 2 m$\Omega$ or less.

35. The secondary battery according to claim 30, wherein the secondary battery has a ratio of a diameter to a height greater than approximately 0.4.

36. The secondary battery according to claim 30, wherein the sealing body comprises a cap plate having no polarity and a sealing gasket interposed between an edge of the cap plate and the opening of the cylindrical battery housing.

37. The secondary battery according to claim 30, wherein the positive electrode terminal comprises:
a body portion inserted into the through hole;
an outer flange portion extending along an outer surface from a circumference of one side of the body portion exposed through an outer surface of the bottom of the cylindrical battery housing;
an inner flange portion extending toward an inner surface from a circumference of another side of the body portion exposed through an inner surface of the bottom of the cylindrical battery housing; and
a flat portion provided inside the inner flange portion.

38. The secondary battery according to claim 37, further comprising a positive electrode current collector plate electrically connected to the uncoated portion of the positive electrode and a negative electrode current collector plate electrically connected to the uncoated portion of the negative electrode,
wherein the positive electrode terminal is coupled to the positive electrode current collector plate by laser welding in the flat portion.

39. A battery pack comprising a plurality of secondary batteries including the secondary battery according to claim 30.

40. The battery pack according to claim 39, wherein the plurality of secondary batteries are arranged in a predetermined number of rows, and the positive electrode terminal and an outer surface of the bottom of the battery housing of each secondary battery are disposed to face upward.

41. A vehicle comprising at least the battery pack according to claim 39.

42. The electrode assembly according to claim 1, wherein a length along the short side of the current collector is approximately 60 mm to 85 mm, and a length along the long side of the current collector is greater than 3 m to approximately 5 m.

43. The electrode assembly according to claim 1, wherein the current collector further includes an active material layer on at least one surface of the current collector, and
wherein an insulating coating layer is disposed at a boundary between the active material layer and the uncoated portion.

\* \* \* \* \*